US011450073B1

(12) United States Patent
Pusch et al.

(10) Patent No.: US 11,450,073 B1
(45) Date of Patent: *Sep. 20, 2022

(54) MULTI-USER VIRTUAL AND AUGMENTED REALITY TRACKING SYSTEMS

(71) Applicant: WorldViz, Inc., Santa Barbara, CA (US)

(72) Inventors: Matthias Pusch, Bavaria (DE); Andrew C. Beall, Santa Barbara, CA (US)

(73) Assignee: WorldViz, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/171,710

(22) Filed: Feb. 9, 2021

Related U.S. Application Data

(63) Continuation of application No. 16/292,805, filed on Mar. 5, 2019, now Pat. No. 10,922,890, which is a
(Continued)

(51) Int. Cl.
  *G09G 5/00* (2006.01)
  *G06T 19/00* (2011.01)
  (Continued)

(52) U.S. Cl.
  CPC ........ *G06T 19/006* (2013.01); *G02B 27/0172* (2013.01); *G06F 3/011* (2013.01); *G06F 3/013* (2013.01); *G06F 3/014* (2013.01); *G06F 3/016* (2013.01); *G06F 16/954* (2019.01); *G06T 7/207* (2017.01); *G06T 7/70* (2017.01); *G06T 13/40* (2013.01); *G06T 19/20* (2013.01);
  (Continued)

(58) Field of Classification Search
  CPC .................................................... G06T 19/006
  See application file for complete search history.

(56) References Cited

U.S. PATENT DOCUMENTS 6,574,352 B1  6/2003  Skolmoski
6,720,949 B1  4/2004  Pryor et al.
(Continued)

OTHER PUBLICATIONS

Ambisonic 3D Auralizer System, WorldViz, LLC, 2 pages, Sep. 27, 2014, https://web.archive.org/web/20140927060932/http:/www.worldviz.com/products/ambisonic.
(Continued)

*Primary Examiner* — Charles Tseng
(74) *Attorney, Agent, or Firm* — Knobbe, Martens, Olson & Bear LLP

(57) ABSTRACT

Systems and methods are described for virtual and augmented reality. A position of a first user and a position of a second user in a physical space are received, wherein the positions are derived from detected infrared light from a plurality of cameras. An image corresponding to the first user is rendered at a first virtual position in a display device associated with the second user, wherein the first virtual position is determined based at least in part on a position of the first user in the physical space and on a determined viewpoint of the second user. An image corresponding to the second user is rendered at a second virtual position in a display device associated with the first user, wherein the second virtual position is determined based at least in part on a position of the second user in the physical space and on a determined viewpoint of the first user.

19 Claims, 11 Drawing Sheets

Related U.S. Application Data continuation of application No. 15/496,984, filed on Apr. 25, 2017, now Pat. No. 10,242,501.

(60) Provisional application No. 62/331,296, filed on May 3, 2016.

(51) Int. Cl.
| | |
|---|---|
| *G06T 7/207* | (2017.01) |
| *G06T 7/70* | (2017.01) |
| *G06F 3/01* | (2006.01) |
| *H04N 19/43* | (2014.01) |
| *G06T 13/40* | (2011.01) |
| *G02B 27/01* | (2006.01) |
| *H04N 5/232* | (2006.01) |
| *G06T 19/20* | (2011.01) |
| *G06F 16/954* | (2019.01) |
| *H04N 5/247* | (2006.01) |
| *H04N 5/33* | (2006.01) |
| *H04N 21/81* | (2011.01) |
| *H04N 21/6587* | (2011.01) |
| *H04N 21/442* | (2011.01) |
| *H04N 7/18* | (2006.01) |
| *H04N 21/4223* | (2011.01) |

(52) U.S. Cl.
CPC ..... *H04N 5/23229* (2013.01); *H04N 5/23251* (2013.01); *H04N 5/247* (2013.01); *H04N 5/33* (2013.01); *H04N 7/181* (2013.01); *H04N 19/43* (2014.11); *H04N 21/4223* (2013.01); *H04N 21/44218* (2013.01); *H04N 21/6587* (2013.01); *H04N 21/816* (2013.01); *G06T 2200/04* (2013.01); *G06T 2219/024* (2013.01)

(56) References Cited

U.S. PATENT DOCUMENTS

| | | | |
|---|---|---|---|
| 7,719,484 | B2 | 5/2010 | Turner et al. |
| 8,472,120 | B2 | 6/2013 | Border et al. |
| 8,482,859 | B2 | 7/2013 | Border et al. |
| 8,570,378 | B2 | 10/2013 | Zalewski et al. |
| 8,806,354 | B1 | 8/2014 | Hyndman |
| 9,110,503 | B2 | 8/2015 | Beall et al. |
| 9,152,305 | B2 | 10/2015 | Xu |
| 9,153,195 | B2 | 10/2015 | Geisner |
| 9,159,168 | B2 | 10/2015 | Elber |
| 9,183,807 | B2 | 11/2015 | Small |
| 9,213,405 | B2 | 12/2015 | Perez |
| 9,541,634 | B2 | 1/2017 | Beall et al. |
| 9,595,298 | B2 | 3/2017 | Lee |
| 9,792,491 | B1 | 10/2017 | Ramaswamy |
| 9,792,714 | B2 | 10/2017 | Li |
| 2002/0036617 | A1 | 3/2002 | Pryor |
| 2004/0130566 | A1 | 7/2004 | Banerjee |
| 2008/0219566 | A1 | 9/2008 | Teoh |
| 2008/0310714 | A1 | 12/2008 | Stern |
| 2010/0070859 | A1 | 3/2010 | Shuster |
| 2010/0185124 | A1 | 7/2010 | Bisbee, III |
| 2010/0311512 | A1 | 12/2010 | Lock et al. |
| 2012/0092328 | A1 | 4/2012 | Flaks |
| 2012/0156652 | A1 | 6/2012 | Lane et al. |
| 2012/0178054 | A1 | 7/2012 | Jomander et al. |
| 2012/0194419 | A1 | 8/2012 | Osterhout et al. |
| 2012/0194420 | A1 | 8/2012 | Osterhout et al. |
| 2012/0194549 | A1 | 8/2012 | Osterhout et al. |
| 2012/0194551 | A1 | 8/2012 | Osterhout et al. |
| 2012/0194552 | A1 | 8/2012 | Osterhout |
| 2012/0200601 | A1 | 8/2012 | Osterhout et al. |
| 2012/0206334 | A1 | 8/2012 | Osterhout et al. |
| 2012/0212406 | A1 | 8/2012 | Osterhout et al. |
| 2012/0212499 | A1 | 8/2012 | Haddick |
| 2013/0050426 | A1 | 2/2013 | Sarmast |
| 2013/0063054 | A1 | 3/2013 | Ogawa et al. |
| 2013/0100255 | A1 | 4/2013 | Ohba |
| 2013/0223679 | A1 | 8/2013 | Russ |
| 2013/0271457 | A1 | 10/2013 | Haswell |
| 2014/0064552 | A1 | 3/2014 | Miyagi |
| 2014/0152550 | A1 | 6/2014 | Beall |
| 2014/0247343 | A1 | 9/2014 | Chen |
| 2014/0361956 | A1 | 12/2014 | Mikhailov |
| 2015/0193018 | A1 | 7/2015 | Venable et al. |
| 2015/0235426 | A1 | 7/2015 | Barzuza |
| 2015/0235434 | A1 | 8/2015 | Miller |
| 2015/0302651 | A1 | 10/2015 | Shpigelman |
| 2015/0331666 | A1 | 11/2015 | Bucsa |
| 2016/0129346 | A1 | 5/2016 | Mikhailov |
| 2016/0140930 | A1 | 5/2016 | Pusch et al. |
| 2016/0189429 | A1 | 6/2016 | Mallinson |
| 2016/0239472 | A1 | 8/2016 | Kasahara |
| 2016/0262608 | A1 | 9/2016 | Krueger |
| 2016/0266644 | A1 | 9/2016 | Yamamoto |
| 2016/0321841 | A1 | 11/2016 | Christen |
| 2017/0038829 | A1 | 2/2017 | Lanier |
| 2017/0094197 | A1 | 3/2017 | Beall et al. |
| 2017/0330362 | A1 | 11/2017 | Sumner |
| 2018/0306898 | A1 | 10/2018 | Pusch |
| 2018/0314323 | A1 | 11/2018 | Mikhailov |

OTHER PUBLICATIONS

Augmented Reality, WorldViz, LLC, 3 pages, Sep. 27, 2014, https://web.archive.org/web/20140927061320/http:/www.worldviz.com/products/augmented-reality.

Head Mounted Displays, WorldViz, LLC, 2 pages, Sep. 26, 2014 https://web.archive.org/web/20140926011241/http://www.worldviz.com/products/head-mounted-displays.

Motion Tracking, World Viz, 4 pages, 2012.

Other VR Hardware, WorldViz, LLC, 15 pages, Sep. 27, 2014, https://web.archive.org/web/20140927061334/http://www.worldviz.com/products/other-vr-hardware.

Precision Position Tracking for Virtual Reality, WorldViz, LLC, 2 pages, Oct. 24, 2014, https://web.archive.org/web/20141024142530/http:/www.worldviz.com/products/ppt.

"The WorldViz wireless 6Dof Wand controller is used to navigate in and interact within the 3D model," architecture interactive, 2 pages, 2012.

Vizard Virtual Reality Software Toolkit, 2 pages, Sep. 26, 2014, https://web.archive.org/web/20140924064245/http:/www.worldviz.com/products/vizard.

MULTI-USER VIRTUAL AND AUGMENTED REALITY TRACKING SYSTEMS

INCORPORATION BY REFERENCE TO ANY PRIORITY APPLICATIONS

Any and all applications for which a foreign or domestic priority claim is identified in the Application Data Sheet as filed with the present application, are hereby incorporated by reference in their entirety under 37 CFR 1.57.

COPYRIGHT RIGHTS

A portion of the disclosure of this patent document contains material that is subject to copyright protection. The copyright owner has no objection to the reproduction by any one of the patent document or the patent disclosure, as it appears in the patent and trademark office patent file or records, but otherwise reserves all copyright rights whatsoever.

FIELD OF THE INVENTION

The present invention relates to systems and methods for determining a position and identity of infrared tracking markers used in association with virtual reality and/or augmented reality simulations.

BACKGROUND

Virtual Reality (VR) comprises a computer simulated environment that can simulate a physical presence in places in the real world or imagined worlds. Conventionally, virtual reality environments are primarily visual experiences, displayed on a screen (e.g., and viewed by a user using 3D glasses) or through special stereoscopic display head gear. The simulated environments can be similar to the real world in order to create lifelike experiences or it differs significantly from reality, such as in VR games.

Augmented Reality (AR) generally refers to a computer simulated environment combined with the real world. Conventionally, the elements of the real world are augmented with computer generated graphics. Often, translucent stereoscopic headsets are worn by the user in AR simulations to enable a wearer to view the real world through the headset while also being able to view computer generated graphics.

Movement of participants and/or objects in interactive VR and AR simulations are optionally tracked using various methods and devices.

Multi-user environments greatly expand the potential of virtual environments by allowing users to inhabit the same virtual world. As such, people can socialize, negotiate, play games, work together or otherwise interact in an entirely digital context. Moreover, a user can be in a completely different part of the planet and still experience the "physical" presence of another participant.

SUMMARY OF THE INVENTION

An aspect of the disclosure relates to an example marker identification and position tracking system configured to interface and work in conjunction with a marker device and camera system and to provide high fidelity tracking of user and object motion in a virtual and/or augmented reality experience.

An aspect of the disclosure relates to an example computing system configured to interface and work in conjunction with a tracking system and/or certain sensors, to provide a high quality, interactive, multi-user, virtual reality, and/or augmented reality experience. Optionally, the example computing system enables use case scenarios in which certain detected tracking and/or sensor data is provided to an operator/user and not provided to or restricted to other participants of the virtual and/or augmented reality experience. Optionally, the receipt of additional or enhanced detected tracking and/or sensor data optionally informs the operator/user regarding a one or more participant's experience during or subsequent to the session.

DETAILED DESCRIPTION

Figure 1:
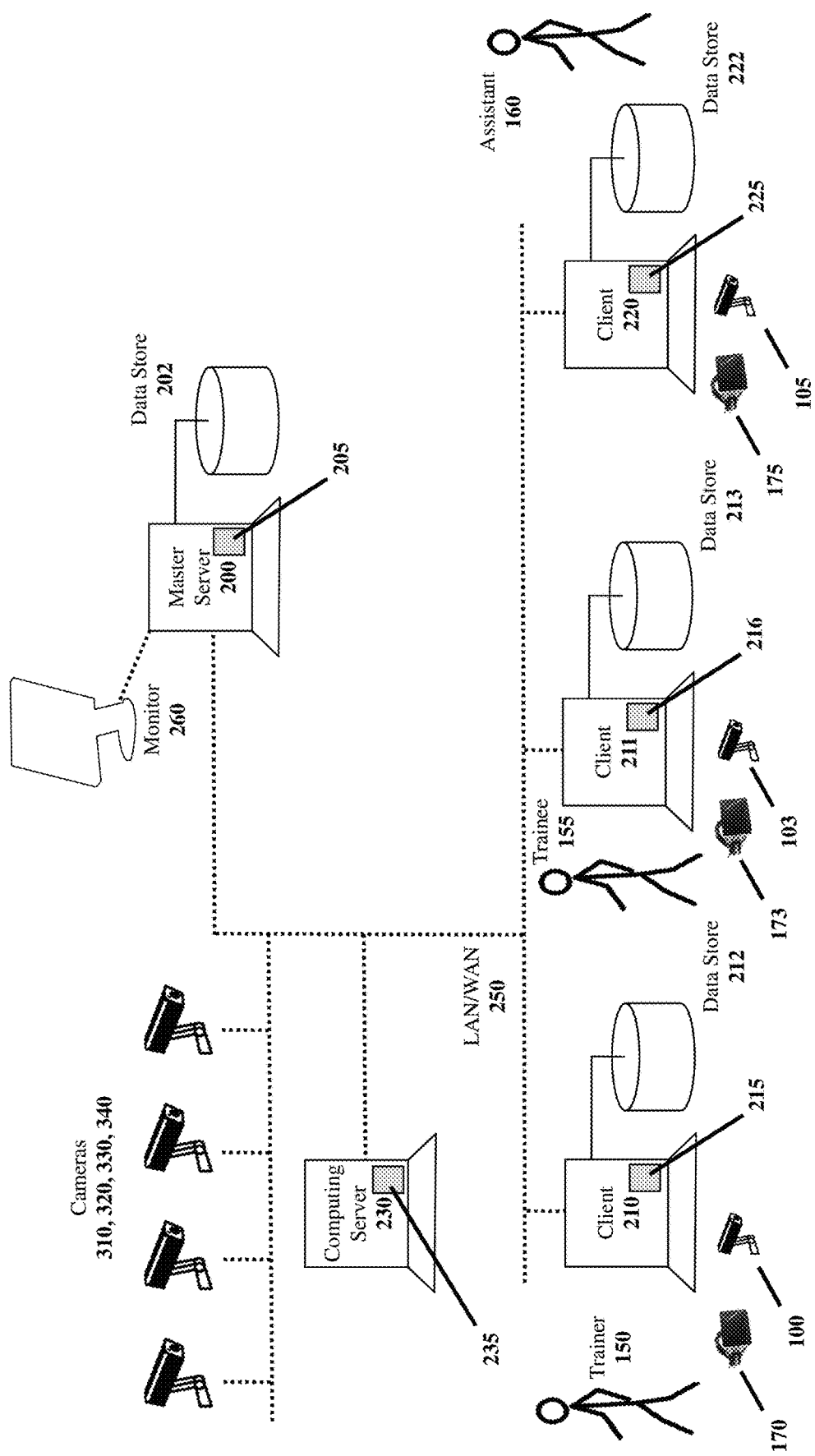
FIG. 1 illustrates an example operating environment.

An aspect of this disclosure relates generally to devices and methods for enabling an interactive, multi-user virtual or augmented reality experience, and in particular, to a computing system which works in conjunction with sensory detection and motion capture and tracking input devices.

Other example embodiments of a multi-user virtual or augmented reality experience that may be utilized with the systems and processed described herein are described in U.S. patent application Ser. No. 14/971,720, titled "MULTI-USER VIRTUAL REALITY PROCESSING", the contents of which are incorporated herein in their entirety by reference.

Advantageously, virtual/augmented reality and/or simulated environments as described herein can optionally be used in a number of application areas including but not limited to: real estate, architecture, product design, human behavior analysis, user training, gaming, product and marketing evaluation, design verification, data visualization, teleoperation, and telepresence or any physical environment that for reasons of, for example, cost or potential harm to a user can be simulated rather than directly experienced. In addition, virtual reality as described herein may also be used in augmented reality environments, including for examples, in an automotive, construction, and assembly virtual reality environments.

Recently, multi-user VR environments/worlds have been created which enable users to collaborate and share a virtual world experience. Motion tracking is a crucial component of most virtual reality systems. By tracking the position and orientation of each user, the computing system can control the simulation's viewpoint such that the user may navigate through the virtual world just as naturally as they would navigate through the physical world. In addition, tracked movements of a user in the physical world may be mapped onto certain movements of an avatar representation of the user in the virtual/augmented world as viewed by one or more participants/operator of the simulation session. Thus, in a multi-user virtual/augmented reality session, each user has a view of the virtual/augmented world/scene (from the user's unique viewpoint and/or position in the virtual/augmented reality world/scene) and one or more avatars representing each session participants in the scene. Optionally, the computing system further enables one or more operators/observers to view a multi-user virtual/augmented reality session via one or more monitors from one or more positions in the virtual/augmented reality world. Optionally, a one or more operators/observers may observe the virtual/augmented reality session from the viewpoint of one or more of the session participants. Conventionally, a session participant's movement may be tracked, for example, via motion tracking cameras and tracking devices (e.g., via tracking devices affixed to a user) or other means (e.g., haptic gloves, etc.). Optionally, virtual world sound effects and each user's voice are broadcast to other session participants and/or session observers/operators. Optionally, other perceptional senses may be provided to other session participants and/or session observers/operators including the sense of smell, touch, and taste to enable a fully immersive and interactive experience.

Certain marker identification systems used in virtual and augmented reality tracking systems use infrared light. Advantageously, infrared light is invisible to human eyes and, thus, is not distracting to simulation participants and/or operators. Further, infrared light is relatively easy to record and the emitted and/or reflected light can be distinguished (e.g., via image processing) in recorded images. However, other wavelengths/colors and light types may be used. Conventionally, infrared marker identification systems used in virtual and augmented reality environments use reflective or active markers.

With respect to the use of reflective markers, a given camera may have an infrared light emitting strobe attached to or integrated with an infrared sensitive camera. The infrared light emitted from the strobe reflects off one or markers attached to or associated with a subject or object and is received at the camera.

To track an object, markers may be placed (e.g., with adhesive, clip, tape, magnets, snaps, sewn on, or otherwise placed/affixed) on an object to be tracked. For example, three markers or more markers may be utilized in order to track an object in 6 degrees of freedom, x-axis, y-axis, z-axis, pitch, yaw, roll. If more than one subject (wherein the subject may be a moveable object) is to be tracked in a given tracking area, the plurality of markers may be placed in unique patterns on the subject, if each marker in a set of markers is not by itself distinguishable from the rest of the markers. A unique reflected pattern recorded in the video images enables the system via certain calculations and/or algorithms to determine at a given moment (e.g., video frame or set of frames) the location and/or orientation of the subject to which the markers are attached.

With respect to the active marker system, pulsed light (e.g., infrared light) is emitted from a given active marker as to provide tracking and identification information. Advantageously, a given marker in a tracking field may optionally be configured to emit a unique identifier wherein the identifier is defined by a unique pattern of pulsed light. Thus, for example, an active marker using an 8-bit binary encoding can encode 256 markers, a 5-bit binary encoding can encode 32 markers, etc. Other active marker systems may also be used, including, for example, a marker system in which only a single marker in a set of markers is emitting light at any given time period (e.g., a video frame or a set of frames). This optional active marker systems may have reduced tracking smoothness relative to the active marker with integrated marker identification, as the camera system may need to record each marker binary encoded pattern (e.g., one marker identification per frame or frame set) in the system of markers before returning to the first marker.)

While both an infrared light reflecting system of markers and an infrared light emitting system of markers can be used in certain virtual/augmented reality simulations, an infrared light emitting tracking system may have certain advantageous over a reflective system when tracking multiple subjects in a tracking area. For example, the reflective systems may need to track a larger number of markers and may need to further track patterns, increasing the likelihood of two or more marker patterns traversing across each other when the markers are in close proximity to each other causing marker confusion (e.g., marker swapping). In addition, in a reflective marker system, as the number of subject/objects in a tracking area increase, the number of markers needed to create distinguishable patterns may increase. Having several markers in a cluster in close proximity to each other can decrease tracking quality as the tracking cameras may not see each marker clearly in a cluttered marker environment.

An aspect of this disclosure relates generally to devices and methods for enabling one or more virtual and/or augmented reality session users/operators to receive certain additional or enhanced sensor and/or position tracking data associated with a participant not available and/or disclosed to other participants/operators/observers of the simulation. Optionally, the computing system applies certain data analysis techniques to the enhanced sensor and/or position tracking data in order to derive certain inferences. Optionally, this additional computational processing and data enables a user, operator, and/or observer to draw certain conclusions regarding the simulation session and/or to alter aspects of the session (e.g., a presentation, training, simulation scenes, etc.) during or subsequent to the session. This enhanced and/or additional displayed and recorded data are now described. For clarity, the description herein may refer to virtual reality, which is intended to encompass both virtual reality and augmented reality, unless the context indicates otherwise. Similarly, the description herein may refer to an operator, which is intended to encompass either a system operator or system administrator responsible for among other things configuring and initiating a simulation session, unless the context indicates otherwise.

FIG. 1 illustrates an example system architecture. As described herein, the illustrated system architecture can be used to facilitate a virtual and/or augmented reality experience, and in particular, a multi-user virtual and/or augmented reality experience with enhanced sensor tracking. The system may be configured to perform some or all of the following: image capture and tracking functions (including enhanced tracking as further described herein), video/image processing, speech processing, pattern matching, data mining, marker identification (e.g., LED marker identification), user/object position calculations, action synchronization, and/or dynamic rendering of virtual worlds in an optimized (e.g., in substantially real-time and/or minimal rendering delays) manner to create a lifelike experience.

As illustrated in FIG. 1, a master server computing device 200 (e.g., a general purpose computer, a tablet computer, a cloud-based server, a smart phone, a graphics processing unit, etc.) is coupled to a plurality of client computing devices 210, 220 over a data network 250 (e.g., a local area network, a wide-area network, the Internet, a private network, a public network, etc.). Optionally, the master server 200 may be coupled to a one or more local participant sensors 110 (e.g., a wearable heart rate monitor), cameras 100, and/or microphones 120 (as further described herein) which enables said local participant device outputs to be received by the master server 200. Optionally, the various local participant sensor, camera, and microphone outputs are connected wirelessly or via direct cabling to the master server 200. Optionally, the local participant sensor 110, camera 100, and/or microphone 120 interface (e.g., wirelessly) to a local computing device 130 of the local participant (e.g., a smartwatch, smart phone, tablet computing device, etc.). Optionally, the local participant raw sensor/camera/microphone data is sent to the master server 200. Optionally, the local participant computing device 130 performs certain local computational operations with respect to the received sensor/camera/microphone data prior to sending the raw data and/or local processed output (e.g., a determined heart rate, a determined positional gaze, etc.) Optionally, the master server 200 may be directly connected to a console/monitor 260 (or over the data network 250 to a console/monitor 260) which displays a user interface via master server software 200 for a user/participant or operator to provision, designate, and/or configure the master server 200 (e.g., download and/or upgrade software, provision data communication interfaces, configure accounts, administer security, edit files, etc.). Optionally, the master server 200 also provides a computing platform for compiling and/or executing certain programs and/or programmatic scripts (e.g., simulations), receiving and sending certain communications, performing video/image processing tasks, performing math computations, displaying/rendering certain images (e.g., rendering virtual worlds), providing client synchronization, hosting a client application, etc.

Figure 2:
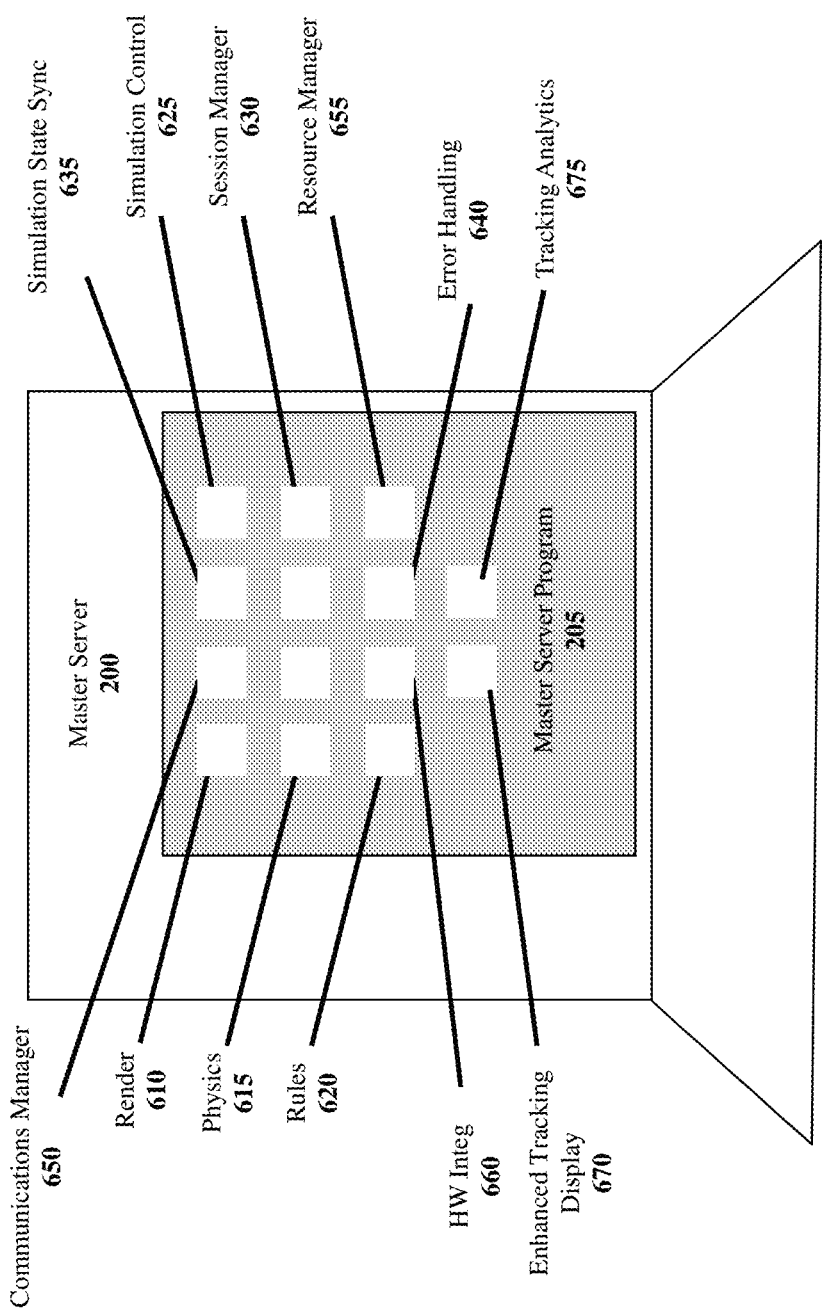
FIG. 2 illustrates an example operating environment of a precision positioning tracking motion capture system.

A given computing device 200, 210, and 220 may be further configured with a data store 202, 212, and 222, respectively, enabling the server to store in memory data associated with the VR session, simulations, models, objects, images, certain parameters, executable scripts/code, local event logs, error logs, sensor data, speech, video, etc. Thus, for example, the master server computing device 200 may host a master server software program 205, as illustrated in FIG. 2, comprising a single software program or a plurality of software programs or software modules including, for example, a render engine 610 configured to render and/or enable the rendering of VR scenes, a physics engine 615 (e.g., that provides a simulation of physical systems, such as rigid and soft body dynamics, collision detection, and fluid dynamics, and that provides an interface that hides the low-level details of the physics needed in virtual reality applications to enable application/game developers to focus on the higher-level functionalities of the application), a rules engine 620, a simulation control engine 625 (that coordinates simulation execution), a session manager 630, a simulation state synchronizer engine 635 (that, for example, synchronizes associated client viewpoints) and/or an error handling 640, a client-server communications manager 650 (that, for example, manages client server communications including over a data communication network (e.g., a low latency data communication network)), resource manager 655 (that, for example, manages resources, including shared resources (e.g., simulation objects, scenes, etc.), speech-to-text conversion module 670, sensor analytics and inference module 675, video compression module 680, virtual reality tracking and marker identification software 660 (e.g., the Vizard VR™ toolkit and PPT Studio software from WorldViz LLC of Santa Barbara) by way of example, enhanced tracking sensor output processing and display 670, enhanced tracking analytics 675.

The master server computing device 200 may include cluster nodes (e.g., companion computing devices) that handle gameplay/simulation logic, tracking software, and one or more additional servers that process communications from client computing device. The master server computing device 200 may include a login server, including a client/user identity and access authentication engine, that manages login sessions with client computing devices, validates client computing devices (e.g., by checking password and device identifiers), and if the client computing devices are validated, enables the devices to access the master computing device 200 and/or cluster nodes. The data store 202 associated with the master server computing device 200 may store user account information such as password information, user/device identifiers, status of game/simulation play which may be stored upon a user suspending a game/simulation or other virtual/augmented reality activity and which may be accessed and utilized when the activity is restarted to provide a continuous experience, user usage information (e.g., time and duration of virtual/augmented reality activity), other users the user may be linked to (e.g., other users the user has interacted with when engaging in virtual/augmented reality activities), etc.

The master server computing device 200 may further comprise multiple servers distributed over a broad geographic area to reduce latency with respect to interactions with client server devices, wherein a given server (or servers) may serve client computing devices in its geographical area. The various master server computing devices may include network interfaces and may be interconnected via high speed data networks to further reduce latencies. The cluster nodes may include dedicated high speed graphic processors to process virtual/augmented reality graphic tasks. The master server computing device 200 may include one or more administrator terminals.

Similarly, as illustrated in FIG. 1, one or more client computing devices 210, 220 (e.g., a general purpose computer, a tablet computer, a cloud-based server, a smart phone, a graphics processing unit, a game console, etc.) are coupled to the master server 200 over a data network 250 (e.g., a local area network, a wide-area network, the Internet, a private network, a public network, etc.). Optionally, each client device 210, 220 can connect with other client devices via the data network 250 (e.g., in a peer-to-peer manner). Optionally, a given client computing device 210, 220 may be connected directly or over a network to a console which displays a user interface via client software 215, 225 to a user/participant or operator and which can be used to provision, designate, and configure the given client computing device 210, 220 (e.g., download and/or upgrade software, provision data communication interfaces, configure accounts, administer security, edit files, etc.). Optionally, each client device 210, 220 may be coupled to a one or more local participant sensors 110 (e.g., a wearable heart rate monitor), cameras 100, and/or microphones 120 (as further described herein) which enables said local participant device outputs to be received by each client device 210, 220. Optionally, the various local participant sensor, camera, and microphone outputs are connected wirelessly or via direct cabling to each client device 210, 220. Optionally, the local participant sensor 110, camera 100, and/or microphone 120 interface (e.g., wirelessly) to a local computing device 130 of the local participant (e.g., a smartwatch, smart phone, tablet computing device, etc.). Optionally, the local participant raw sensor/camera/microphone data is sent to the master server 200. Optionally, the local participant computing device 130 performs certain local computational operations with respect to the received sensor/camera/microphone data prior to sending the raw data and/or local processed output (e.g., a determined heart rate, a determined positional gaze, etc.) Optionally, enhanced tracking sensor/camera/microphone data (either raw data and/or locally processed output) of a local participant may be provided to the master server 200 via the LAN/WAN 250. Optionally, a given client computing device 210, 220 provides a computing platform for compiling and/or executing certain programs and/or programmatic scripts, receiving and sending certain communications, performing video/image processing tasks, performing speech processing including speech-to-text, performing sensor/camera/microphone output software analytics, identifying distinct markers from recorded infrared light, calculating marker positions in space, performing math computations, enabling the displaying/rendering of certain images (e.g., rendering virtual worlds or augmented images), etc. For example, a given client computing device 210, 220 may include a 3D rendering engine, a 3D sound engine, a virtual reality execution engine, an avatar engine, a simulation state synchronizer engine, a session manager engine and/or a network interface. Optionally, the client computing device 210, 220 may access one or more external data stores 290 (e.g., a cloud-based data store, a network-based server, etc.) over the LAN/WAN 250.

Figure 3:
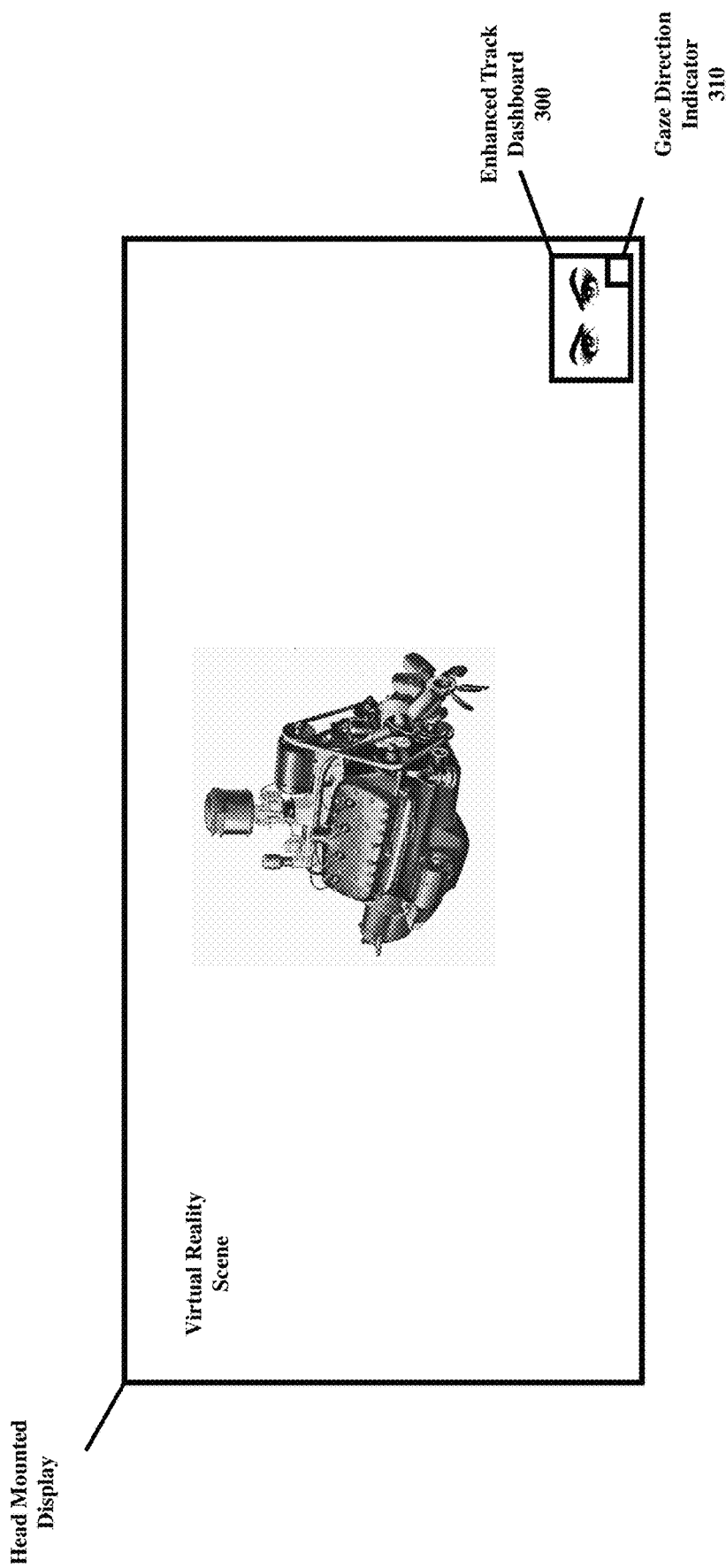
FIG. 3—illustrates a process of an example embodiment of an enhanced tracking virtual reality system.

FIG. 1 also illustrates an optional element of the cluster system, a plurality of motion capture cameras 310, 320, 330, and 340. Motion tracking is a crucial component of most virtual reality systems. By tracking the position and orientation of the user, the cluster system can control the simulation's viewpoint such that the user can navigate through the virtual world just as naturally as they would navigate through the physical world. In addition, tracked movements of an individual in the physical world may be mapped onto certain movements of an avatar in the virtual world. Optionally, these motion capture cameras 310-340 are connected physically via cabling or wirelessly to the data network 250 and/or directly to the master server 200, client 210, and/or client 220. Optionally, the video output and/or detected marker identities and marker positions are streamed from the cameras 310-340 to the master server computing device 200 and/or the client computing devices 210,220. Optionally, a plurality of motion capture cameras are positioned above and/or reside within a staging area in which VR session users participate in a simulation. FIG. 3 illustrates an example camera positioning in a simulation. By way of example, multiple (e.g., 2, 4, 6, 8, 9, 10, 11, 12) tracking cameras (e.g., precision position tracking (PPT) cameras, such as the PPT X™ precision motion tracking cameras from WorldViz LLC of Santa Barbara) may stream live video to a master server computing device 200, or a client computing device 210, 220, which are provisioned with virtual reality tracking software (e.g., the Vizard VR™ toolkit or PPT Studio from WorldViz LLC of Santa Barbara; dll for Windows; C source library for Linux) capable of image processing live video images in substantially real-time.

Optionally in addition or instead, a dedicated computing device 230 (e.g., a laptop, PC, smartphone, server, etc.) may be optionally provisioned with virtual reality software (e.g., Vizard VR and/or PPT Studio from WorldViz LLC of Santa Barbara) capable of processing received live camera output stream in substantially real-time. Optionally, the motion capture cameras record image data including emitted infrared light in a tracking area. Optionally, the recorded image data is provided (e.g., streamed) to the computing device 230 or other computing device via a data network (e.g., 250). Optionally, the computing device receiving the image data has certain software (e.g., PPT Studio software from WorldViz LLC of Santa Barbara) capable of determining from the image data, a position and identity for each infrared marker in the field of view/tracking area of the motion capture cameras.

Optionally, the calculated/determined/derived marker position and identity information (e.g., tracking data) may be used (e.g., by the computing device) to render a change in a scene or orientation of a scene as viewed by a user (e.g., in a head mounted display or other display). For example, infrared markers may comprise light emitting devices (LED) which may be configured to be attached to or mounted on an item worn by the user (e.g., headgear). Optionally, a marker device can be attached to articles of clothing and/or strapped or otherwise attached to or physically associated with a user. Optionally, an infrared marker tracking device includes two or more light emitting components attached to one or more items worn by the user and the system tracks the light source in three dimensions to determine the user's movements in time. Optionally, head movement tracking data is collected in substantially real-time and can be used, for example, in a virtual reality display in which some or all of the displayed images are modified coincident with the tracked movement of the user. For example, if the tracking system detects sideways movement of the user, the perspective and/or the displayed image viewed by the user may be modified to simulate the sideways movement of the user (e.g., displaying an image behind a tree which was obstructing the user's view prior to the user's sideways movement).

Virtual Reality software may include a hardware integration module 660 which may incorporate a visual tool for configuring devices that the VR software supports, including displays (e.g., head-mounted displays, multi-screen projection walls, consumer 3D monitors), trackers (head trackers, gloves, full body motion capture), and input devices (e.g., wands, steering wheels, gamepads, joysticks, etc.)), feedback devices (e.g., haptic feedback devices that simulate the sensation of force, pressure and/or resistance by using electric actuators, pneumatics hydraulics, and/or neuromuscular stimulators).

The VR software may enable editing of transform nodes (e.g., position, rotation, scale), clone/copy nodes, rename nodes, delete nodes, insert new group/transform nodes, and add/remove/modify descriptors. The VR rendering software 610 may enable the layout of a virtual scene by combining and arranging multiple independent 3D models. The VR software may enable a given virtual reality scene or objects to react to a user's natural body motions. Thus, for example, the VR software may enable a user to interact with head, hands, and feet with virtual objects in a manner similar to real objects to provide a convincing sensation of telepresence. The VR software optionally provides full body motion capture technology that delivers full human presence for both first person point of view and third person points of view experiences. The VR software optionally enables the integration of live full feature avatars.

An optional aspect of an interactive, multi-user, virtual reality session is the utilization of one or more motion tracking cameras that record emitted infrared light pulses from tracking emitter devices. Motion tracking camera video output may be received by the computing devices of the system directly or via various wired or wireless networks or peripheral interfaces/buses. Optionally, motion tracking camera video output may be received via direct cabling (e.g., a local simulation participant's camera output connected to the computing system), via a local area network (e.g., a local simulation participant camera output directed to a computing device and with the computing device connected to the computing system over a local area network), via a wireless network (e.g., a local simulation participant camera output to a wireless router associated with the computing system), and/or via a data network such as the Internet (e.g., a geographically remote simulation participant). Optionally, motion tracking camera video output may be directed to or received by a computing device (e.g., a smartphone, a networked server, etc.) local to the simulation participant but which may be remote from the computing system. Optionally, the local computing device determines in whole or in part, for example using tracking software, head location/position coordinates and location/position changes and only transmits head tracking location/position coordinate data to the computing system (e.g., via access to shared networked storage, sent via a data network, etc.) and not the camera video output, thereby reducing the amount of data sent over a data network from a remote site and so reducing network bandwidth utilization. This approach may reduce the need to have complex high performance networks.

For clarity, the description herein may refer to a user/operator which may receive enhanced tracking data, which is intended to encompass any user, operator, observer, participant, etc. which may be computing system configured to (or default automatically configured to) receive enhanced tracking data, unless the context indicates otherwise. In addition, the descriptions herein may refer to the receipt of enhanced tracking data associated with a participant. Optionally, the enhanced tracking data may be associated with a plurality of participants. In which case the system may associate respective identifiers with the plurality of participants, and, for example, may display the participant identifier in association with a one or more conditions (e.g., a participant's eye's closing, a participant's veering from an element of the scene, etc.) on active displayed monitors. Optionally, in a multi-participant simulation, an alarm/indicator/notifier may be triggered and/or displayed to a user/operator when a configurable threshold, such as a configurable number (e.g., a count of participants) or percentage of participant's in the simulation, trigger a condition (e.g., a count of 2 out of 4 participants in a presentation are not directing their gaze at the virtual slide screen or the presenter/operator/user). As further described herein, a participant's physiology and/or actions may be data mined and/or stored for substantially real-time analysis and/or post analysis. Optionally, the data is stored with participant identifiers.

Head Tracking

An optional aspect of an interactive, multi-user, virtual reality session is the utilization of one or more motion tracking cameras that record emitted infrared light pulses from tracking emitter devices associated with one or more virtual reality participants. An example tracking device which emits trackable infrared light signatures is a wireless Precision Position Tracking (PPT) device, PPT Eyes™, from WorldViz LLC of Santa Barbara. PPT Eyes is a motion tracker mountable to 3D glasses or virtual reality head mounted displays which provides wide-area tracking and can be integrated with or attached to display headgear enabling the tracking of a user's head movements when combined with virtual reality tracking software and one or motion tracking cameras, although other tracking devices may be used. Local and/or remote participants in a virtual reality simulation session may be associated with passive and/or active head tracking components/devices and one or motion tracking cameras that track the user (and the user's head motions) and/or head tracking components/devices. Data corresponding to tracked head movements is optionally used by the virtual reality tracking software to cause scene renderings in a viewpoint of the user, and for displaying the movement of one or more other participants in the simulation in corresponding viewed avatars. Advantageously, an aspect of the computing system optionally enables an operator or a configured user to receive additional or enhanced head tracking data in substantially real-time (e.g., monitored head position relative to a target, head position changes as viewed from a position directly above the participant, etc.) including head position changes (e.g., small changes in head positions, or changes in head position that may not be easily viewable from certain viewpoints) which may not be easily discernable by a configured user and/or operator viewing an avatar representation of a participant. Optionally, motion tracking camera video output may be received by the computing system directly or via various wired or wireless networks or peripheral interfaces/buses. Optionally, motion tracking camera video output may be received via direct cabling (e.g., a local simulation participant's camera output connected to the computing system), via a local area network (e.g., a local simulation participant camera output directed to a computing device and with the computing device connected to the computing system over a local area network), via a wireless network (e.g., a local simulation participant camera output to a wireless router associated with the computing system), via a data network such as the Internet (e.g., a geographically remote simulation participant). Optionally, motion tracking camera video output may be directed to or received by a computing device (e.g., a smartphone, a networked server, etc.) local to the simulation participant but which may be remote from the computing system. Optionally, the local computing device determines in whole or in part, for example using tracking software, head location/position coordinates and location/position changes and only transmits head tracking location/position coordinate data to the computing system (e.g., via access to shared networked storage, sent via a data network, etc.) and not the camera video output, thereby reducing the amount of data sent over a data network from a remote site and so reducing network bandwidth utilization. This approach may reduce the need to have complex high performance networks. A further aspect of the computing system enables an operator or a configured user to be presented with, for example, a visual head position dashboard wherein the dashboard is displayable in a portion of an operator's/user's display (e.g., head mounted display). Optionally, the dashboard displays aspects of the participant's head position, the participant's viewpoint, and/or certain inferences based upon an analysis of the head position data by itself and/or in association with aspects of the simulation and/or receipt of other enhanced monitoring/tracking data. A further aspect of the computing system enables an operator or a configured user to select one or more participants, via a user interface control, from which enhanced head tracking data may be received. Optionally, the system automatically provides enhanced head tracking data to all users/operators/observers, and a user interface control is optionally provided to disable the presentation of the tracking data. Optionally, the head tracking dashboard is visually presented in a portion of the screen in conjunction with audio cues or exclusively via audio cues (e.g., using an audio alert tone indicating a monitored head position is no longer directed at a target).

Optionally, received head tracking position data is first analyzed and/or compared against stored position data or head tracking cues/signals in order to generate certain inferences as further described below before being made available to the operator or configured user. Optionally, received position data (including movement as determined from position data over a period of time) and or head tracking cues/signals are analyzed and/or compared by accessing internal or external data stores. Optionally, inferences are derived from a comparison of stored head position state changes and/or associated state change patterns from stored historical simulations, generalized head tracking analysis (including non-virtual reality simulation environments), and/or other heuristic head tracking research results. A further optional aspect of the system enables the operator/user/developer to define certain targets of interest in a simulation via a set of user interface controls which may condition a set of signals associated with a tracked head position of a participant.

With respect to identifying participants in which enhanced head tracking may be received, optionally, a user interface control may be presented on a display of an operator/user, for example in response to a control selection by the user/operator. Optionally, in an enhanced head tracking selection mode state, all the participants in a simulation may be presented (e.g., by name, alias, and/or avatar) on the display and a user/operator may select a participant presented on the user/operator display. For example, the user/operator may select a participant via a mouse-like wand control, a head movement directed at a target user visible on the user/operator display (e.g., by a user/operator centering a session participant in a target on their screen and then selecting a control), a pull-down list of participants, by speaking the participant's name, using voice command(s), or other user interface control selection. Optionally, the computing system automatically defaults enhanced head tracking to an operator/administrator (e.g. a user initiating the simulation, a server user/administrator in a client-server configuration, a local user (versus a remote user), etc.).

With respect to the presentation of head tracking data in a display format, optionally, a dashboard or window display is projected on a portion of user/operator monitor (e.g., a head mounted display, computer monitor, etc.) of the user/operator which may displays certain head tracking data. Optionally, the user/operator may select a control to expand or shrink the size of the dashboard display. Optionally, the size of the dashboard display may increase or decrease in response to certain conditions detected by the computing system. Optionally, the display dashboard/window size (e.g., in the vertical and horizontal dimensions, or just in the vertical dimension, or just in the horizontal dimension) may be automatically increased at least partly in response to a detection of an increase in a subject's head movement relative to the subject's mean head movement activity. Optionally, the display dashboard/window size may be automatically increased at least partly in response to a detection that a participant's line of sight veers from or off a designated target of interest. Optionally, the display window size may be increased at least partly in response to detection of certain state changes of a designated target (e.g., an action of or associated with a designated target). Optionally, the display window size may be increased or decreased at least partly in response to the occurrence of certain timed events or lack of head tracking activity. Optionally, at least partly in response to a combination of one or more conditions and/or one or more timed events, the display window size may be increased or decreased. For example, the detection of a subject's head veering from a designated target condition for a fixed period of time may cause the display window size to be increased. Certain state changes of the simulation itself may be visually taxing or may require more attention of the user/operator, and in response to detecting the foregoing, the computing system may decrease the window display size (e.g., automatically). Optionally, a user interface control may be provided which enables the user to instruct that the display window is to be moved to different areas of the monitor. Optionally, the display window may be minimized in response to a user interface control selection, condition(s), and/or time period expiration. Optionally, head tracking audio cues may be presented to a user whether the dashboard display is minimized or not. Optionally, the user interface controls described herein include but are not limited to one or more of the following: a hand gesture (e.g., a hand/limb gesture detected by a tracking device), a hand selection by the user/operator of a control (e.g., a touch screen control, a wireless wand control, a computing device keyboard, etc.), a voice utterance control (e.g., an audio signal such as a whistle, grunt, etc.), a spoken word control (e.g., using a specific voice command such as "smaller" or "minimize"), a facial gesture (e.g., a wink or two consecutive winks, open mouth, etc.), etc. Optionally, audio/voice control commands are optionally muted in response to the user selecting or speaking a mute signal (by speaking the word "mute"), thereby preventing other simulation participants from hearing spoken commands from the user. Optionally, the computing system is configured with a configurable audio communication delay enabling the system to detect a control shift keyword (e.g., "Mute") before streaming speech from a user/operator over a communication channel with other simulation participants. Optionally, the system provides a whisper mode, wherein detection of whispered commands or spoken audio below a specified or determined volume threshold causes the system to prevent such whispered commands or spoken audio from being transmitted to other participants of the simulation.

Optionally, head tracking information is presented substantially in real-time to a user/operator in the form of a status indicator light. For example, if a simulation session participant is in a training session from which enhanced head tracking data is being received, a small red indicator light may be presented (e.g., in a portion of the user/operator's display) to a user in response to detecting that the subject's (e.g. simulation participant's) head is no longer directed at a designated target of interest. Optionally, visual indicator cues may be provided by the computing system only in response to detecting certain specified target configuration variances and/or in the absence of certain target configuration variances. For example, in the use case above, the computing system may display a continuous visual cue, such as a green light indicator, in response to detecting that the participant's head is directed at a configured target of interest, and a red indicator may be displayed in response to detecting that the participant's head is directed elsewhere.

With respect to head tracking audio cues, optionally, an audio alert may be generated in response to a head tracking state change. For example, in reference to the use case above, the system may generate a variance audio tone or whisper when a participant's head is directed away from a configured target. Optionally, a periodic (e.g., every 10 sec, 20 sec, 30 sec, 1 min, etc.) compliance audio cue/signal is played to the user/operator as long as the subject's head is directed at a configured target.

As described herein, the computing system optionally monitors head state changes of a participant and subject to certain configured constraints/limitations the user/operator is alerted. For example, a user/operator may be alerted in substantially real-time in response to determining that the participant's head position and/or action is no longer in an expected state. For example, if it detected that a participant's head begins to nod or nod repeatedly (as in nod off) during a presentation, the user/operator may be alerted to such activity. Optionally, head action is continually compared against a knowledge base which may enable the computing system to infer certain characteristics/attributes of the participant's emotional state or state-of-mind. For example, in a training use case, detected up and down nods during a presentation may infer the session participant is in agreement with points being made by the presenter. Alternatively, detected side-to-side movements may indicate a session participant is in disagreement with aspects of the presentation. Optionally, head action tracking is recorded during an entire simulation session. Optionally, head action tracking is only recorded during certain visual and/or audio events and/or conditions (e.g., in response to a state change in the simulation, an introduction of an element into the simulation, in response to a participant's head position change of state, etc.)

Optionally, enhanced head tracking data is recorded, stored, and data mined/analyzed subsequent to the simulation session. Optionally, participants are interviewed subsequent to the simulation session to determine state-of-mind, reactions, attitudes, physiological, and other psychological criteria to create a knowledge base of head actions in different contextual virtual reality simulations. Optionally, the head actions and/or head action attributes (e.g., yes/no nods and/or count of yes/no nods, period of time head is directed to an object of the simulation, period of time a participant's head is direct towards the user/operator, head leanings forward or back, rapid head actions (e.g., in response to a simulation scene), etc.) may be integrated into a data store to create a knowledge base of head actions corresponding to a simulation or other simulations. This knowledge base may be used to make certain direct inferences from head tracking data or indirect inferences when head tracking data is combined with other aspects of the simulation (e.g., a likelihood of a product or service sale, expected social media feedback, etc.) Optionally, a created knowledge base from virtual reality enhanced head tracking and/or general research related to head tracking may be used to score a session wherein the score is associated with the likelihood the session participant may take a certain action (e.g., purchase a good or service). Optionally, the computing system records/logs related information associated with or at a time of a participant's head action. In association with a detected participant's head action, the system may record some or all of the following information: the time and date, a continuous voice snippet/phrase spoken prior to or during the head movement by the participant or other user/participant in the simulation, a recorded frame of the target, other sensory detected attributes associated with the participant (e.g., heart rate, body temperature, perspiration, etc. as further described below), other body and limb action and/or muscular reactions, etc. Optionally, the computing system converts received/recorded speech into text enabling improved data mining including search and compare. Optionally, the computing system stores in computer memory recorded speech and/or converted speech into text in association with a user/operator or participant identifier (e.g., a user name, account number, etc.)

Optionally, certain audio and/or visual information and/or cues may be provided to a user/operator if a selected participant's detected head action is determined by the system to veer from or veer to a designated target of interest. An optional aspect of the computing system enables a user/operator to designate an element of the simulation (including during the session) as a target of interest in which monitored feedback may be recorded and/or provided to the user/operator in substantially real-time. Optionally, a simulation is developed with specific target elements/objects in which tracking may be associated (e.g., automatically). Optionally, the user/operator is presented with a list of target elements/objects prior to or at the launch of the simulation and may select a target via a user interface control (e.g., a pull down menu of likely target elements/objects). Optionally, said target may include a real-world object in an augmented reality scenario. Optionally, a participant and/or user/operator may be chosen as a target. Optionally, the user/operator may remove a target (selected, preselected and/or predefined target) via a user interface control of the computing system.

Optionally, each participant (or a subset of participants) in a multi-user, virtual reality simulation session performs an initial calibration step. The computer system may utilize the calibration to determine an initial head orientation (e.g., a user head facing forward) from which the user's/participant's/subject's head position is tracked throughout the simulation session.

Eye Tracking

An optional aspect of an interactive, multi-user, virtual reality session is the utilization of eye tracking data of one or more participants that may be collected via the utilization of one or more cameras or an eye tracking device, the latter which may provide a higher degree of precision then a camera or one or more cameras. Optionally, an eye tracking device may include a light source (conventionally infrared) and a camera. The light source may be directed towards the eye(s) of the participant and the camera may record the reflection of the light source along with visible ocular features such as the pupil. A computing device in association with the camera or eye tracking device may determine the direction of gaze or the eye position and may store the gaze and/or eye position or data corresponding to eye tracked movements and/or position to computer memory. Advantageously, an aspect of the computing system optionally enables an operator or a configured user to receive eye tracking data in substantially real-time (e.g., monitored eye position relative to a target) including eye position changes (e.g., small changes in eye position) which may not be presented in association with an avatar or easily discernable by a configured user and/or operator viewing an avatar representation of a participant. Optionally, the one or more cameras and/or eye tracking device is integrated into or affixed to a head mounted display of the user/participant. Optionally, motion tracking camera video output/eye tracking device output may be received by the computing system via direct cabling (e.g., a local simulation participant's camera or eye tracking device output connected to the computing system), via a local area network (e.g., a local simulation participant camera output directed to a local computing device and with the computing device connected to the computing system over a local area network), via a wireless network (e.g., a local simulation participant camera output to a wireless router associated with the computing system), via a data network including the Internet (e.g., a remote simulation participant). Optionally, for example, the camera video output and/or eye tracking device output may be directed to a computing device (e.g., a smartphone, a networked server, etc.) local to the simulation participant but which may be remote from the computing system. Optionally, the local computing device determines from the captured video or eye tracking output in whole or in part, for example using tracking software, eye/gaze position data and only transmits said eye/gaze position data to the computing system (e.g., via access to shared networked storage, sent via a data network, etc.) thereby reducing the amount of data sent over the data network from the remote site and so reducing network bandwidth utilization. This approach may reduce the need to have complex high performance networks. For clarity, the description herein may refer to an eye, which is intended to encompass an entire eye or one or more elements of the eye (e.g., pupil), unless the context indicates otherwise.

As similarly described above with respect to head tracking, an aspect of the computing system enables an operator/configured user to receive eye tracking data in substantially real-time which may not be provided and/or easily discernable by the operator/user viewing an avatar representation of a participant. A aspect of the computing system enables an operator or a configured user to be presented with, for example, a visual eye/gaze tracking dashboard displayable in a portion of an operator's/user's display (e.g., head mounted display). Optionally, the dashboard displays aspects of the participant's eye position and/or gaze, the participant's eye position data, and/or certain inferences based upon an analysis of the eye position and/or eye movement data in conjunction with aspects of the simulation and/or receipt of other enhanced monitoring data. A further aspect of the computing system enables an operator or a configured user to select a participant, via a user interface control, in which eye/gaze position data may be received or only received. Optionally, the system automatically provides eye tracking data to all users/operators/observers, and a user interface control may be optionally provided whereby each user may disable the presentation of the enhanced tracking data. Optionally, the eye tracking dashboard is visually presented in a portion of the screen to the user/operator with audio cues or exclusively via audio cues (e.g., using an audio tone indicating a participant may have fallen asleep). Optionally, received eye tracking position data is first data analyzed and/or compared against stored position data or eye tracking cues/signals in order to generating certain inferences as further described below before being made available to the operator or configured user. Optionally, received eye/gaze data analysis involves accessing historical eye/gaze data and/or eye/gaze pattern data from one or more internal or external data stores including over wide-area data networks such as the Internet. Optionally, inferences are derived from a comparison of stored eye/gaze position states and/or eye/gaze state changes/patterns from stored historical simulations, generalized eye/gaze tracking analysis (including non-virtual reality simulation environments), and/or other heuristic eye/gaze tracking research results. A further optional aspect of the system enables the operator and/or user via a set of user interface controls to configure certain eye tracking target options.

With respect to identifying participants in which enhanced eye/gaze tracking may be received, optionally, a user interface control may be presented on a display of an operator/user, for example in response to a control selection by the user/operator. Optionally, in an enhanced eye/gaze tracking selection mode state, all the participants in a simulation may be presented (e.g., by name, alias, and/or avatar) on the display and a user/operator may select a participant presented on the user/operator display. For example, the user/operator may select a participant via a mouse-like wand control, a head movement directed at a target user visible on the user/operator display (e.g., by a user/operator centering a session participant in a target on their screen and then selecting a control), a pull-down list of participants, by speaking the participant's name, using voice command(s), or other user interface control selection. Optionally, the computing system automatically defaults enhanced eye/gaze tracking to an operator/administrator (e.g. a user initiating the simulation, a server user/administrator in a client-server configuration, a local user (versus a remote user), etc.).

With respect to the presentation of eye/gaze tracking data in a display format, optionally, a dashboard or window display is projected on a portion of user/operator's display (e.g., a head mounted display, computer monitor, etc.) of the user/operator which may displays certain eye/gaze tracking data. Optionally, the user/operator may select a control to expand or shrink the size of the dashboard display. Optionally, the size of the dashboard display may increase or decrease in response to certain conditions detected by the computing system. Optionally, the display dashboard/window size (e.g., in the vertical and horizontal dimensions, or just in the vertical dimension, or just in the horizontal dimension) may be automatically increased at least partly in response to a detection of an increase in a subject's eye/gaze movement relative to the subject's mean eye/gaze movement activity. Optionally, the display dashboard/window size may be automatically increased at least partly in response to a detection that a participant's line of sight veers from or off a designated target(s) of interest. Optionally, the display window size may be increased at least partly in response to detection of certain state changes of a designated target (e.g., an action of or associated with a designated target). Optionally, the display window size may be increased or decreased at least partly in response to the occurrence of certain timed events or lack of eye/gaze tracking activity. Optionally, at least partly in response to a combination of one or more conditions and/or one or more timed events, the display window size may be increased or decreased. For example, the detection of a subject's eye/gaze veering from a designated target condition for a fixed period of time may cause the display window size to be increased. Certain state changes of the simulation itself may be visually taxing or may require more attention of the user/operator, and in response to detecting the foregoing, the computing system may decrease the window display size (e.g., automatically). Optionally, a user interface control may be provided which enables the user to instruct that the display window is to be moved to different areas of the monitor. Optionally, the display window may be minimized in response to a user interface control selection, condition(s), and/or time period expiration. Optionally, eye/gaze tracking audio cues may be presented to a user whether the dashboard display is minimized or not. Optionally, the user interface controls described herein include but are not limited to one or more of the following: a hand gesture (e.g., a hand/limb gesture detected by a tracking device), a hand selection by the user/operator of a control (e.g., a touch screen control, a wireless wand control, a computing device keyboard, etc.), a voice utterance control (e.g., an audio signal such as a whistle, grunt, etc.), a spoken word control (e.g., using a specific voice command such as "smaller" or "minimize"), a facial gesture (e.g., a wink or two consecutive winks, open mouth, etc.), etc. Optionally, audio/voice control commands are optionally muted in response to the user selecting or speaking a mute signal (by speaking the word "mute"), thereby preventing other simulation participants from hearing spoken commands from the user. Optionally, the computing system is configured with a configurable audio communication delay enabling the system to detect a control shift keyword (e.g., "Mute") before streaming speech from a user/operator over a communication channel with other simulation participants. Optionally, the system provides a whisper mode, wherein detection of whispered commands or spoken audio below a specified or determined volume threshold causes the system to prevent such whispered commands or spoken audio from being transmitted to other participants of the simulation.

Optionally, eye/gaze tracking information is presented substantially in real-time to a user/operator in the form of a status indicator light. For example, if a simulation session participant(s) is in a training session from which enhanced eye/gaze tracking data is being received, a small red indicator light may be presented (e.g., in a portion of the user/operator's display) to a user in response to detecting that the subject's (e.g. simulation participant's) eye/gaze is no longer directed at a designated target of interest. Optionally, visual indicator cues may be provided by the computing system only in response to detecting certain specified target configuration variances and/or in the absence of certain target configuration variances. For example, in the use case above, the computing system may display a continuous visual cue, such as a green light indicator, in response to detecting that the participant's eye/gaze is directed at a configured target of interest, and a red indicator may be displayed in response to detecting that the participant's eye/gaze is directed elsewhere.

With respect to eye/gaze tracking audio cues, optionally, an audio alert may be generated in response to an eye/gaze tracking state change. For example, in reference to the use case above, the system may generate a variance audio tone or whisper when a participant's eye/gaze is directed away from a configured target. Optionally, a periodic (e.g., every 10 sec, 20 sec, 30 sec, 1 min, etc.) compliance audio cue/signal is played to the user/operator as long as the subject's eye/gaze is directed at a configured target.

As described herein, the computing system optionally monitors eye/gaze state changes of a participant and subject to certain configured constraints/limitations the user/operator is alerted. For example, a user/operator may be alerted in substantially real-time in response to determining that the participant's eye/gaze position and/or action is no longer in an expected state. For example, if it detected that a participant eye's are partially closed or closed during a presentation, the user/operator may be alerted to such activity. Optionally, eye/gaze action is continually compared against a knowledge base which may enable the computing system to infer certain characteristics/attributes of the participant's emotional state or state-of-mind. For example, in a training use case, an increased eye opening during a presentation may infer the session participant is in agreement with points being made by the presenter. Alternatively, detected eye squinting may indicate a session participant is in disbelief with aspects of the presentation. Optionally, eye/gaze action tracking is recorded during an entire simulation session. Optionally, eye/gaze action tracking is only recorded during certain visual and/or audio events and/or conditions (e.g., in response to a state change in the simulation, an introduction of an element into the simulation, in response to a participant's eye/gaze position change of state, etc.)

Optionally, enhanced eye/gaze tracking data is recorded, stored, and data mined/analyzed subsequent to the simulation session. Optionally, participants are interviewed subsequent to the simulation session to determine state-of-mind, reactions, attitudes, physiological, and other psychological criteria to create a knowledge base of eye/gaze actions in different contextual virtual reality simulations. Optionally, the eye/gaze actions and/or eye/gaze action attributes (e.g., eye lid closure and/or count of eye lid closures, period of time eye/gaze is directed to an object of the simulation, period of time a participant's eye/gaze is direct towards the user/operator, number and rate of blinks, rapid eye/gaze actions (e.g., in response to a simulation scene), etc.) may be integrated into a data store to create a knowledge base of eye/gaze actions corresponding to a simulation or other simulations. This knowledge base may be used to make certain direct inferences from eye/gaze tracking data or indirect inferences when eye/gaze tracking data is combined with other aspects of the simulation (e.g., a likelihood of a product or service sale, expected social media feedback, etc.) Optionally, a created knowledge base from virtual reality enhanced eye/gaze tracking and/or general research related to eye/gaze tracking may be used to score a session wherein the score is associated with the likelihood the session participant may take a certain action (e.g., purchase a good or service). Optionally, the computing system records/logs related information associated with or at a time of a participant's eye/gaze action. In association with a detected participant's eye/gaze action, the system may record some or all of the following information: the time and date, a continuous voice snippet/phrase spoken prior to or during the eye/gaze movement by the participant or other user/participant in the simulation, a recorded frame of the target, other sensory detected attributes associated with the participant (e.g., heart rate, body temperature, perspiration, etc. as further described below), other body and limb action and/or muscular reactions, etc. Optionally, the computing system converts received/recorded speech into text enabling improved data mining including search and compare. Optionally, the computing system stores in computer memory recorded speech and/or converted speech into text in association with a user/operator or participant identifier (e.g., a user name, account number, etc.)

Optionally, certain audio and/or visual information and/or cues may be provided to a user/operator if a selected participant's detected eye/gaze action is determined by the system to veer from or veer to a designated target of interest. An optional aspect of the computing system enables a user/operator to designate an element of the simulation (including during the session) as a target of interest in which monitored feedback may be recorded and/or provided to the user/operator in substantially real-time. Optionally, a simulation is developed with specific target elements/objects in which tracking may be associated (e.g., automatically). Optionally, the user/operator is presented with a list of target elements/objects prior to or at the launch of the simulation and may select a target via a user interface control (e.g., a pull down menu of likely target elements/objects). Optionally, said target may include a real-world object in an augmented reality scenario. Optionally, a participant and/or user/operator may be chosen as a target. Optionally, the user/operator may remove a target (selected, preselected and/or predefined target) via a user interface control of the computing system.

As previously described herein, the presentation of eye/gaze tracking data is projected on a portion of user/operator's display (e.g., a head mounted display, computer monitor, etc.) of the user/operator. Optionally, for example to give the user/operator visibility into the directional gaze of the participant, the presentation is an image display of a designated participant's eyes as recorded by a camera associated with the participant. Optionally, the displayed presentation is a representation of a designated participant's eyes as illustrated in FIG. 3. Optionally, if there are two or more participant eye displays, a participant identifier is displayed in association with the eye displays. Optionally, a display of participant's eyes is directed at the eyes of the user/operator when the participant's gaze is determined to be directed at the user/operator or a target element of the scene of the simulation. Optionally, an initial calibration step is performed to establish participant eye alignment with a user/operator and/or target element of the scene.

Optionally, each participant (or a subset of participants) in a multi-user, virtual reality simulation session performs an initial calibration step. The computer system may utilize the calibration to determine an initial eye/gaze orientation (e.g., a user eye/gaze facing forward) from which the user's/participant's/subject's eye/gaze position is tracked throughout the simulation session.

Facial Expressions

An optional aspect of an interactive, multi-user, virtual reality simulation is the utilization of facial expression tracking data of one or more participant that may be collected via the utilization of one or more cameras, or other facial expression capture devices. Facial expressions communicate certain nonverbal aspects of a user/participant's state of mind and/or emotional state. Conventionally, emotional states fall into six states of angry, happy, sad, fearful, surprised, and disgusted. However, recent research into facial expression analysis has tied certain consistent facial muscle movement into additional emotional states including, for example, "happily disgusted" or "sadly angry." Advantageously, the computing system may derive certain inferences from a facial expression state and/or facial expression state changes (e.g., reactions to certain simulation events) which may be provided to a user/operator/observer during and subsequent to the virtual reality simulation. A computing device in association with the camera may capture facial expressions of the virtual reality participant including any changes to a participant's facial expressions and may store the actual recorded facial expressions to computer memory or data corresponding to detected facial expressions. Advantageously, an aspect of the computing system optionally enables an operator or a configured user to receive facial expression data or an inferred emotional state in substantially real-time (e.g., a smile or the corresponding indicative emotion "happy") including facial expression changes (e.g., a neutral expression to a smile) which may not be presented in association with an avatar or easily discernable by a configured user and/or operator viewing an avatar representation of a participant. Optionally, the one or more cameras are integrated into or affixed to a head mounted display of the user/participant. Optionally, the facial expression camera output may be received by the computing system via direct cabling (e.g., a local simulation participant's camera output connected to the computing system), via a local area network (e.g., a local simulation participant camera output directed to a local computing device connected to the computing system over a local area network), via a local wireless network (e.g., a local simulation participant camera output to a wireless router associated with the computing system), via a data network including the Internet (e.g., a remote simulation participant). Optionally, for example, the camera output may be directed to a computing device (e.g., a smartphone, a networked server, etc.) local to the simulation participant but which may be remote from the computing system. Optionally, the local computing device determines from the captured video, facial expression output in whole or in part, for example using facial expression software analytics, and only transmits said expression data analysis to the computing system (e.g., via access to shared networked storage, sent via a data network, etc.) thereby reducing the amount of data sent over the data network from the remote site and so reducing network bandwidth utilization. This approach may reduce the need to have complex high performance networks. For clarity, the description herein may refer to a face or facial, which is intended to encompass an entire face or one or more elements of the face (e.g., lips, mouth, nose, muscles under skin of the face, nose, forehead, eyebrows, eyes, ears, etc.), unless the context indicates otherwise.

As similarly described above with respect to head tracking, an aspect of the computing system enables an operator/configured user to receive facial expression data in substantially real-time which may not be provided and/or easily discernable by the operator/user viewing an avatar representation of a participant. An aspect of the computing system enables an operator or a configured user to be presented with, for example, a visual facial expression state dashboard displayable in a portion of an operator's/user's display (e.g., head mounted display). Optionally, the dashboard displays aspects of the participant's facial expressions, the participant's facial expression data, and/or certain inferences based upon an analysis of the participant's face data in conjunction with aspects of the simulation and/or receipt of other enhanced monitoring data. Optionally, the dashboard display includes an image display of a designated participant's face as recorded by a camera associated with the participant. Optionally, the displayed presentation is a representation of a designated participant's face. Optionally, if there are two or more participant facial displays, a participant identifier is displayed in association with the facial displays. An example of a facial expression inference is inferring that a participant is pleased in response to the computing system determining that the participant is smiling. A further aspect of the computing system enables an operator or a configured user to select a participant, via a user interface control, in which facial expression data may be received. Optionally, the system automatically provides facial expression data to all users/operators/observers, and a user interface control may be optionally provided whereby each user may disable the presentation of the enhanced tracking data. Optionally, the facial expression dashboard is visually presented in a portion of the screen to the user/operator with audio cues or exclusively via audio cues (e.g., using an audio tone indicating a participant may have fallen asleep). Optionally, received facial expression position data is first data analyzed and/or compared against stored position data or eye tracking cues/signals in order to generating certain inferences as further described below before being made available to the operator or configured user. Optionally, the received expression data analysis involves accessing historical data or expression template data from one or more internal or external data stores including over wide-area data networks such as the Internet. Optionally, inferences are derived from a comparison of stored facial expressions and/or facial expression state changes and/or associated state change patterns from stored historical simulations, generalized facial expression tracking analysis (including non-virtual reality simulation environments), and/or other heuristic facial expression tracking research results. A further optional aspect of the system enables the operator and/or user via a set of user interface controls to detect certain facial expression state options.

With respect to identifying participants in which enhanced facial expression monitoring may be received, optionally, a user interface control may be presented on a display of an operator/user, for example in response to a control selection by the user/operator. Optionally, in an enhanced facial expression monitoring selection mode state, all the participants in a simulation may be presented (e.g., by name, alias, and/or avatar) on the display and a user/operator may select a participant presented on the user/operator display. For example, the user/operator may select a participant via a mouse-like wand control, a head movement directed at a target user visible on the user/operator display (e.g., by a user/operator centering a session participant in a target on their screen and then selecting a control), a pull-down list of participants, by speaking the participant's name, using voice command(s), or other user interface control selection. Optionally, the computing system automatically defaults enhanced facial expression monitoring to an operator/administrator (e.g. a user initiating the simulation, a server user/administrator in a client-server configuration, a local user (versus a remote user), etc.).

With respect to the presentation of facial expression monitoring data in a display format, optionally, a dashboard or window display is projected on a portion of user/operator display (e.g., a head mounted display, computer monitor, etc.) of the user/operator which may displays certain facial expression monitoring data. Optionally, the user/operator may select a control to expand or shrink the size of the dashboard display. Optionally, the size of the dashboard display may increase or decrease in response to certain conditions detected by the computing system. Optionally, the display dashboard/window size (e.g., in the vertical and horizontal dimensions, or just in the vertical dimension, or just in the horizontal dimension) may be automatically increased at least partly in response to a determination of a certain type of expression which may indicate, for example, a certain emotional state. Optionally, the display window size may be increased at least partly in response to detection of certain expression state changes corresponding to an action of a target. Optionally, the display window size may be increased or decreased at least partly in response to the occurrence of certain timed events or lack of certain facial expression monitoring activity. Optionally, at least partly in response to a combination of one or more conditions and/or one or more timed events, the display window size may be increased or decreased. For example, the detection of a subject's expression not changing for a fixed period of time may cause the display window size to be increased. Certain state changes of the simulation itself may be visually taxing or may require more attention of the user/operator, and in response to detecting the foregoing, the computing system may decrease the window display size (e.g., automatically). Optionally, the dashboard may display a real-time view of the participant's face. Optionally, the dashboard may only display a real-time view of the participant's face in response to a condition, such as an expression state change. Optionally, a user interface control may be provided which enables the user to configure the conditions (e.g., change of inferred emotion change, happy, sad, angry, confused, etc.) when a view of the participant's face may be displayed and for how long. Optionally, a user interface control may be provided which enables the user to instruct that the display window is to be moved to different areas of the monitor. Optionally, the display window may be minimized in response to a user interface control selection, condition(s), and/or time period expiration. Optionally, facial expression monitoring audio cues may be presented to a user whether the dashboard display is minimized or not. Optionally, the user interface controls described herein include but are not limited to one or more of the following: a hand gesture (e.g., a hand/limb gesture detected by a tracking device), a hand selection by the user/operator of a control (e.g., a touch screen control, a wireless wand control, a computing device keyboard, etc.), a voice utterance control (e.g., an audio signal such as a whistle, grunt, etc.), a spoken word control (e.g., using a specific voice command such as "smaller" or "minimize"), a facial gesture (e.g., a wink or two consecutive winks, open mouth, etc.), etc. Optionally, audio/voice control commands are optionally muted in response to the user selecting or speaking a mute signal (by speaking the word "mute"), thereby preventing other simulation participants from hearing spoken commands from the user. Optionally, the computing system is configured with a configurable audio communication delay enabling the system to detect a control shift keyword (e.g., "Mute") before streaming speech from a user/operator over a communication channel with other simulation participants. Optionally, the system provides a whisper mode, wherein detection of whispered commands or spoken audio below a specified or determined volume threshold causes the system to prevent such whispered commands or spoken audio from being transmitted to other participants of the simulation.

Optionally, facial expression monitoring information is presented substantially in real-time to a user/operator in the form of a status indicator light. For example, if a simulation session participant is in a training session from which enhanced facial expression monitoring data is being received, a small red indicator light may be presented (e.g., in a portion of the user/operator's display) to a user in response to the computing system determining that the subject's (e.g. simulation participant's) expression indicates a certain emotional state, for example, anger or disappointment. Optionally, visual indicator cues may be provided by the computing system only in response to detecting certain specified expression variances and/or in the absence of certain expression variances. For example, in the use case above, the computing system may display a continuous visual cue, such as a green light indicator, in response to determining that a participant's expression may indicate the participant may be in a relaxed and/or happy state, and a red indicator may be displayed in response to determining that the participant's expression may be indicative of a tense or angry state.

With respect to facial expression monitoring audio cues, optionally, an audio alert may be generated in response to a facial expression monitoring state change. For example, in reference to the use case above, the system may generate a variance audio tone or whisper when the computing system determines a participant's expression may have changed from an indication of a participant's relaxed state to a tense or angry state. Optionally, a periodic (e.g., every 10 sec, 20 sec, 30 sec, 1 min, etc.) compliance audio cue/signal is played to the user/operator as long as the subject's expression may indicate, for example, a relaxed or happy state.

As described herein, the computing system optionally monitors expression state changes of a participant and subject to certain configured constraints/limitations the user/operator is alerted. For example, a user/operator may be alerted in substantially real-time in response to determining that the participant's facial expression is no longer in an expected state. For example, if it is determined that a participant expressions are indicative of an unhappy or disappointed state during a presentation, the user/operator may be alerted to such state of the participant. Optionally, expression data is continually compared against a knowledge base which may enable the computing system to infer certain characteristics/attributes of the participant's emotional state or state-of-mind. For example, in a training use case, a smile during a presentation may infer the session participant is in agreement with points being made by the presenter or liked a joke. Alternatively, detected pursed lips may indicate a session participant is in disbelief with aspects of the presentation. Optionally, facial expression monitoring may be recorded during an entire simulation session. Optionally, facial expression monitoring may only be recorded during certain visual and/or audio events and/or conditions (e.g., in response to a state change in the simulation, an introduction of an element into the simulation, in response to a participant's expression change of state, etc.)

Optionally, enhanced facial expression monitoring data is recorded, stored, and data mined/analyzed subsequent to the simulation session. Optionally, participants are interviewed subsequent to the simulation session to determine state-of-mind, reactions, attitudes, physiological, and other psychological criteria to create a knowledge base of expressions in different contextual virtual reality simulations. Optionally, the expressions actions and/or expressions attributes (e.g., lip movements, cheek movements, eye brow movements, etc.) may be integrated into a data store to create a knowledge base of expression and/or expression attributes corresponding to a participant's state-of-mind and/or emotion during a simulation or other simulations. This knowledge base may be used to make certain direct inferences from facial expression monitoring data or indirect inferences when facial expression monitoring data may be combined with other aspects of the simulation (e.g., a likelihood of a product or service sale, expected social media feedback, etc.) Optionally, a created knowledge base from virtual reality enhanced facial expression monitoring and/or general research related to facial expression monitoring may be used to score a session wherein the score is associated with the likelihood the session participant may take a certain action (e.g., purchase a good or service). Optionally, the computing system records/logs related information associated with or at a time of a participant's expression change of state. In association with a detected participant's expression change of state, the system may record some or all of the following information: the time and date, a continuous voice snippet/phrase spoken prior to or during the expression by the participant or other user/participant in the simulation, other sensory detected attributes associated with the participant (e.g., heart rate, body temperature, perspiration, etc. as further described below), other body and limb action and/or muscular reactions, etc. Optionally, the computing system converts received/recorded speech into text enabling improved data mining including search and compare. Optionally, the computing system stores in computer memory recorded speech and/or converted speech into text in association with a user/operator or participant identifier (e.g., a user name, account number, etc.)

Optionally, certain audio and/or visual information and/or cues may be provided to a user/operator if a selected participant's detected expression (or emotional state) is determined by the system to change from a configured state. An optional aspect of the computing system enables a user/operator to designate an emotional state of a participant in which monitored feedback may be recorded and/or provided to the user/operator in substantially real-time. Optionally, a simulation is developed with specific emotional state in which tracking may be associated (e.g., automatically). Optionally, the user/operator is presented with a list of emotional states prior to or at the launch of the simulation and may select an emotional state via a user interface control (e.g., a pull down menu of likely emotional states). Optionally, the user/operator may remove said selected options via a user interface control of the computing system.

Optionally, each participant (or a subset of participants) in a multi-user, virtual reality simulation session performs an initial calibration step. The computer system may utilize the calibration to determine facial orientation, facial attributes, facial position, etc. from which the user's/participant's/subject's facial expression monitoring is tracked throughout the simulation session.

Monitors—Heart

An optional aspect of an interactive, multi-user, virtual reality simulation is the utilization of heart data of a participant collected using a heart sensor. The tracked heart data of a participant may be used by itself or in combination with other monitored factors (e.g., facial expressions) to determine aspects of the participant including, for example, the emotional state of the participant. For example, a detected and/or determined increased heart rate may indicate anxiety, apprehension, excitement, etc. of a participant in a portion of the simulation in which the increased heart rate was detected and/or determined. Advantageously, the computing system may derive certain inferences from a heart state and/or heart state changes (e.g., reactions to certain simulation events) which may be displayed to a user/operator/observer during and/or subsequent to a virtual reality simulation. A computing device in association with a heart sensor of the virtual reality participant may record aspects of the participant's heart activity and/or any changes and may store the actual sensor recordings to computer memory or data corresponding to the participant's sensor output. Advantageously, an aspect of the computing system optionally enables an operator or a configured user to receive heart data or inferences corresponding to the heart data in substantially real-time (e.g., the likelihood of an answer being truthful) including heart changes (e.g., an increase in a participant's heart rate) which may not be presented in association with an avatar or easily discernable by a configured user and/or operator viewing an avatar representation of a participant. Optionally, the heart sensor may be integrated into or affixed to a head mounted display of the user/participant. Optionally, the heart sensor may be worn in the form of a chest or wrist strap. Optionally, heart sensor data may be received by the computing system wirelessly to a computing device of the user/participant (e.g., a smartwatch, smartphone, etc.) Optionally, heart sensor data may be received by the computing system via direct cabling (e.g., a local simulation participant sensor output connected to the computing system), via a local area network (e.g., a local simulation participant sensor output directed to a local computing device (e.g., a computing device of the user) connected to the computing system over a local area network), via a local wireless network (e.g., a local simulation participant sensor output to a wireless router associated with the computing system), via a wide-area data network including the Internet (e.g., receipt of sensor data from a remote participant's computing device (or a computing device of the computing system) wherein the sensor data is wirelessly transmitted to a local computing device of the participant). Optionally, the local computing device determines certain heart activity-based inferences from the captured sensor data output in whole or in part, for example using heart sensor software analytics, and only transmits said data inferences to the computing system (e.g., via access to shared networked storage, sent via a data network, etc.) thereby reducing the amount of data sent over the data network from the remote site and so reducing network bandwidth utilization. This approach may reduce the need to have complex high performance networks. For clarity, the description herein may refer to a heart sensor, which is intended to encompass the detection/determination of a participant's heart activity including but not limited to a simple heart beat rate, blood pressure, electrical activity of the heart (conventionally referred to as electrocardiography or EKG, ECG) etc., unless the context indicates otherwise.

As similarly described above with respect to head tracking, an aspect of the computing system enables an operator/configured user to receive participant heart data in substantially real-time which may not be provided to the operator/user. An aspect of the computing system enables an operator or a configured user to be presented with, for example, a heart state dashboard displayable in a portion of an operator's/user's display (e.g., head mounted display). Optionally, the dashboard displays aspects of the participant's heart activity, and/or certain inferences based upon an analysis of the participant's heart activity data in conjunction with aspects of the simulation and/or receipt of other enhanced monitoring data. Optionally, the dashboard display includes a representative display of a pumping heart. Optionally, if there are two or more participant heart activity displays, a participant identifier is displayed in association with the facial displays. An example of a heart activity inference is inferring that a participant is pleased in response to determining from the sensor that the heart rate is low. A further aspect of the computing system enables an operator or a configured user to select a participant, via a user interface control, in which heart data may be received. Optionally, the system automatically provides heart data to all users/operators/observers, and a user interface control may be optionally provided whereby each user may disable the presentation of the enhanced tracking data. Optionally, the heart dashboard is visually presented in a portion of the screen to the user/operator with audio cues or exclusively via audio cues (e.g., using an audio tone indicating a participant's heart rate may have increased above a threshold or deviated from a recorded average of the participant). Optionally, received heart data is first data analyzed and/or compared against stored heart activity data or heart activity tracking cues/signals/patterns in order to generating certain inferences as further described below before being made available to the operator or configured user. Optionally, received heart data analysis involves accessing historical data and/or heart activity pattern data from one or more internal or external data stores including over wide-area data networks such as the Internet. Optionally, inferences are derived from a comparison of stored heart state and/or heart state changes/patterns from stored historical simulations, generalized heart tracking analysis (including non-virtual reality simulation environments), and/or other heuristic heart tracking research results. A further optional aspect of the system enable the operator and/or user via a set of user interface controls to detect certain heart state target options or patterns.

With respect to identifying participants in which enhanced heart monitoring may be received, optionally, a user interface control may be presented on a display of an operator/user, for example in response to a control selection by the user/operator. Optionally, in an enhanced heart monitoring selection mode state, all the participants in a simulation may be presented (e.g., by name, alias, and/or avatar) on the display and a user/operator may select a participant presented on the user/operator display. For example, the user/operator may select a participant via a mouse-like wand control, a head movement directed at a target user visible on the user/operator display (e.g., by a user/operator centering a session participant in a target on their screen and then selecting a control), a pull-down list of participants, by speaking the participant's name, using voice command(s), or other user interface control selection. Optionally, the computing system automatically defaults enhanced heart monitoring to an operator/administrator (e.g. a user initiating the simulation, a server user/administrator in a client-server configuration, a local user (versus a remote user), etc.).

With respect to the presentation of heart monitoring data in a display format, optionally, a dashboard or window display is projected on a portion of user/operator display (e.g., a head mounted display, computer monitor, etc.) of the user/operator which may displays certain heart monitoring data. Optionally, the user/operator may select a control to expand or shrink the size of the dashboard display. Optionally, the size of the dashboard display may increase or decrease in response to certain conditions detected by the computing system. Optionally, the display dashboard/window size (e.g., in the vertical and horizontal dimensions, or just in the vertical dimension, or just in the horizontal dimension) may be automatically increased at least partly in response to a determination of a certain type of heart rate activity pattern which may indicate, for example, a certain emotional state. Optionally, the display window size may be increased at least partly in response to detection of certain heart activity state changes corresponding to an action of a target. Optionally, the display window size may be increased or decreased at least partly in response to the occurrence of certain timed events or lack of certain heart monitoring activity. Optionally, at least partly in response to a combination of one or more conditions and/or one or more timed events, the display window size may be increased or decreased. For example, the detection of a subject's heart rate activity not changing for a fixed period of time may cause the display window size to be increased. Certain state changes of the simulation itself may be visually taxing or may require more attention of the user/operator, and in response to detecting the foregoing, the computing system may decrease the window display size (e.g., automatically). Optionally, the dashboard may display a real-time view, for example, of the participant's heart rate as a number and in association with a continuous graph of heart beats. Optionally, the dashboard may only display a real-time view of the participant's heart activity in response to a condition, such as a heart activity state change. Optionally, a user interface control may be provided which enables the user to configure the conditions (e.g., heart rate greater than mean, heart rate less than mean, heart rate greater than a threshold or less than a threshold rate, etc.) when a view of the participant's heart activity may be displayed and for how long. Optionally, a user interface control may be provided which enables the user to instruct that the display window is to be moved to different areas of the monitor. Optionally, the display window may be minimized in response to a user interface control selection, condition(s), and/or time period expiration. Optionally, heart monitoring audio cues may be presented to a user whether the dashboard display is minimized or not. Optionally, the user interface controls described herein include but are not limited to one or more of the following: a hand gesture (e.g., a hand/limb gesture detected by a tracking device), a hand selection by the user/operator of a control (e.g., a touch screen control, a wireless wand control, a computing device keyboard, etc.), a voice utterance control (e.g., an audio signal such as a whistle, grunt, etc.), a spoken word control (e.g., using a specific voice command such as "smaller" or "minimize"), a facial gesture (e.g., a wink or two consecutive winks, open mouth, etc.), etc. Optionally, audio/voice control commands are optionally muted in response to the user selecting or speaking a mute signal (by speaking the word "mute"), thereby preventing other simulation participants from hearing spoken commands from the user. Optionally, the computing system is configured with a configurable audio communication delay enabling the system to detect a control shift keyword (e.g., "Mute") before streaming speech from a user/operator over a communication channel with other simulation participants. Optionally, the system provides a whisper mode, wherein detection of whispered commands or spoken audio below a specified or determined volume threshold causes the system to prevent such whispered commands or spoken audio from being transmitted to other participants of the simulation.

Optionally, heart monitoring information is presented substantially in real-time to a user/operator in the form of a status indicator light. For example, if a simulation session participant is in a training session from which enhanced heart monitoring data is being received, a small red indicator light may be presented (e.g., in a portion of the user/operator's display) to a user in response to the computing system determining that the subject's (e.g. simulation participant's) heart activity is above a certain range or indicates a certain emotional state, for example, anger or excitement. Optionally, visual indicator cues may be provided by the computing system only in response to detecting certain specified heart activity variances and/or in the absence of certain heart rate activity variances. For example, in the use case above, the computing system may display a continuous visual cue, such as a green light indicator, in response to determining that a participant's heart activity may indicate the participant may be in a relaxed and/or happy state, and a red indicator may be displayed in response to determining that the participant's heart activity may be indicative of a tense or angry state.

With respect to heart monitoring audio cues, optionally, an audio alert may be generated in response to a heart monitoring state change. For example, in reference to the use case above, the system may generate a variance audio tone or whisper when the computing system determines a participant's heart activity may have changed from an indication of a participant's relaxed state to a tense or angry state. Optionally, a periodic (e.g., every 10 sec, 20 sec, 30 sec, 1 min, etc.) compliance audio cue/signal is played to the user/operator as long as the subject's heart activity may indicate, for example, a relaxed or happy state.

As described herein, the computing system optionally monitors heart activity state changes of a participant and subject to certain configured constraints/limitations the user/operator is alerted. For example, a user/operator may be alerted in substantially real-time in response to determining that the participant's body temperature is no longer in an expected state. For example, it may be determined that a participant heart activity are indicative of an unhappy or disappointed state during a presentation, the user/operator may be alerted to such state of the participant. Optionally, heart activity may be continually compared against a knowledge base which may enable the computing system to infer certain characteristics/attributes of the participant's emotional state or state-of-mind. For example, in a training use case, a low heart rate activity during a presentation may infer the session participant is relaxed and in general agreement with points being made by the presenter or may be bored. Alternatively, a high activity heart rate may indicate a session participant is in disbelief with aspects of the presentation, excited and/or angry. As the foregoing two examples illustrate, the heart activity may be combined with other monitored activity (e.g., facial expressions) to determine the participant's emotional state or state-of-mind (e.g., a high heart activity combined with pursed lips may indicate disbelief in certain aspects of a presentation). Optionally, heart monitoring may be recorded during an entire simulation session. Optionally, heart monitoring may only be recorded during certain visual and/or audio events and/or conditions (e.g., in response to a state change in the simulation, an introduction of an element into the simulation, in response to a change in a participant's heart activity, etc.)

Optionally, enhanced heart monitoring data is recorded, stored, and data mined/analyzed subsequent to the simulation session. Optionally, participants are interviewed subsequent to the simulation session to determine state-of-mind, reactions, attitudes, physiological, and other psychological criteria to create a knowledge base of heart activity in different contextual virtual reality simulations. Optionally, the heart activity patterns and/or heart activity attributes (e.g., heart rate, blood pressure readings, heart electrical activity, etc.) may be integrated into a data store to create a knowledge base of heart activity and/or heart activity attributes corresponding to a participant's state-of-mind and/or emotion during a simulation or other simulations. This knowledge base may be used to make certain direct inferences from heart monitoring data or indirect inferences when heart monitoring data may be combined with other aspects of the simulation (e.g., a likelihood of a product or service sale, expected social media feedback, etc.) Optionally, a created knowledge base from virtual reality enhanced heart monitoring and/or general research related to heart monitoring may be used to score a session wherein the score is associated with the likelihood the session participant may take a certain action (e.g., purchase a good or service). Optionally, the computing system records/logs related information associated with or at a time of a participant's heart activity change of state. In association with a detected participant's heart activity change of state, the system may record some or all of the following information: the time and date, a continuous voice snippet/phrase spoken prior to or during the heart activity change by the participant or other user/participant in the simulation, other sensory detected attributes associated with the participant (e.g., expression, body temperature, perspiration, etc. as further described herein), other body and limb action and/or muscular reactions, etc. Optionally, the computing system converts received/recorded speech into text enabling improved data mining including search and compare. Optionally, the computing system stores in computer memory recorded speech and/or converted speech into text in association with a user/operator or participant identifier (e.g., a user name, account number, etc.)

Optionally, certain audio and/or visual information and/or cues may be provided to a user/operator if a selected participant's detected heart activity is determined by the system to change from a configured state. An optional aspect of the computing system enables a user/operator to designate a heart activity level (e.g., a heart rate range of 80-95 beats per minute) of a participant in which monitored feedback may be recorded and/or provided to the user/operator in substantially real-time. Optionally, a simulation is developed with specific heart activity states in which tracking may be associated (e.g., automatically). Optionally, the user/operator is presented with a list of heart activity tracking states/ranges prior to or at the launch of the simulation and may select a heart activity range and/or state via a user interface control (e.g., a pull down menu of likely heart activity ranges and/or states). Optionally, the user/operator may remove said selected options via a user interface control of the computing system.

Optionally, each participant (or a subset of participants) in a multi-user, virtual reality simulation session performs an initial calibration step. The computer system may utilize the calibration to determine heart activity baselines, heart rate activity attributes, etc. from which the user's/participant's/subject's heart monitoring is tracked throughout the simulation session.

Monitors—Body Temperature

An optional aspect of an interactive, multi-user, virtual reality simulation is the utilization of body temperature data of a participant collected using a body temperature sensor. The tracked body temperature of a participant may be used by itself or in combination with other monitored factors (e.g., facial expressions) to determine aspects of the participant including, for examples, the emotional state, state-of-mind, and/or general well-being of a participant. For example, a detected and/or determined increased body temperature may indicate a participant may be under stress in a portion of the simulation in which the increased body temperature was detected and/or determined. Advantageously, the computing system may derive certain inferences from a body temperature state and/or body temperature state changes (e.g., reactions to certain simulation events) which may be displayed to a user/operator/observer during and/or subsequent to a virtual reality simulation. A computing device in association with a body temperature sensor of a virtual reality participant may record aspects of the participant's body temperature and/or any changes and may store the actual sensor recordings to computer memory or data corresponding to the participant's sensor output. Advantageously, an aspect of the computing system optionally enables an operator or a configured user to receive body temperature data or inferences corresponding to the body temperature data in substantially real-time (e.g., whether the participant is relaxed and comfortable) including body temperature changes (e.g., an increase in a participant's body temperature) which may not be presented in association with an avatar or easily discernable by a configured user and/or operator viewing an avatar representation of a participant. Optionally, the body temperature sensor may be integrated into or affixed to a head mounted display of the user. Optionally, the body temperature sensor may be worn in the form of a strap or other mechanism attached to the participant's body in a manner of recording bodily temperature. Optionally, body temperature sensor data may be received by the computing system wirelessly via a computing device of the user/participant (e.g., a smartwatch, smartphone, etc.) Optionally, body temperature sensor data may be received by the computing system via direct cabling (e.g., a local simulation participant sensor output connected to the computing system), via a local area network (e.g., a local simulation participant sensor output directed to a local computing device (e.g., a computing device of the user) connected to the computing system over a local area network), via a local wireless network (e.g., a local simulation participant sensor output to a wireless router associated with the computing system), via a wide-area data network including the Internet (e.g., receipt of sensor data from a remote participant's computing device (or a computing device of the computing system) wherein the sensor data is wirelessly transmitted to a local computing device of the participant). Optionally, the local computing device determines certain body temperature-based inferences from the captured sensor data output in whole or in part, for example using body temperature sensor software analytics, and only transmits said data inferences to the computing system (e.g., via access to shared networked storage, sent via a data network, etc.) thereby reducing the amount of data sent over the data network from the remote site and so reducing network bandwidth utilization. This approach may reduce the need to have complex high performance networks.

As similarly described above with respect to head tracking, an aspect of the computing system enables an operator/configured user to receive participant body temperature data in substantially real-time which may not be provided to the operator/user. An aspect of the computing system enables an operator or a configured user to be presented with, for example, a body temperature state dashboard displayable in a portion of an operator's/user's display (e.g., head mounted display). Optionally, the dashboard displays aspects of the participant's body temperature and/or certain inferences based upon an analysis of the participant's body temperature data in conjunction with aspects of the simulation and/or receipt of other enhanced monitoring data. Optionally, the displayed presentation is a representation of a temperature monitor (e.g., a displayed thermometer). Optionally, if there are two or more participant temperature displays, a participant identifier is displayed in association with the temperature displays. An example of a heart activity inference may be inferring that a participant is pleased in response to determining from the sensor that the body temperature is within a normal range. A further aspect of the computing system enables an operator or a configured user to select a participant, via a user interface control, in which body temperature data may be received. Optionally, the system automatically provides body temperature data to all users/operators/observers, and a user interface control may be optionally provided whereby each user may disable the presentation of the enhanced tracking data. Optionally, the body temperature dashboard is visually presented in a portion of the screen to the user/operator with audio cues or exclusively via audio cues (e.g., using an audio tone indicating a participant's body temperature may have increased above a threshold or deviated from a recorded average of the participant). Optionally, received body temperature data is first data analyzed and/or compared against stored body temperature data or heart activity tracking cues/signals/patterns in order to generating certain inferences as further described below before being made available to the operator or configured user. Optionally, received body temperature data analysis involves accessing historical body temperature data and/or body temperature pattern data from one or more internal or external data stores including over wide-area data networks such as the Internet. Optionally, inferences are derived from a comparison of stored body temperature state and/or body temperature state changes/patterns from stored historical simulations, generalized body temperature tracking analysis (including non-virtual reality simulation environments), and/or other heuristic body temperature tracking research results. A further optional aspect of the system enable the operator and/or user via a set of user interface controls to detect certain body temperature state target options or patterns.

With respect to identifying participants in which enhanced body temperature monitoring may be received, optionally, a user interface control may be presented on a display of an operator/user, for example in response to a control selection by the user/operator. Optionally, in an enhanced body temperature monitoring selection mode state, all the participants in a simulation may be presented (e.g., by name, alias, and/or avatar) on the display and a user/operator may select a participant presented on the user/operator display. For example, the user/operator may select a participant via a mouse-like wand control, a head movement directed at a target user visible on the user/operator display (e.g., by a user/operator centering a session participant in a target on their screen and then selecting a control), a pull-down list of participants, by speaking the participant's name, using voice command(s), or other user interface control selection. Optionally, the computing system automatically defaults enhanced body temperature monitoring to an operator/administrator (e.g. a user initiating the simulation, a server user/administrator in a client-server configuration, a local user (versus a remote user), etc.).

With respect to the presentation of body temperature monitoring data in a display format, optionally, a dashboard or window display is projected on a portion of user/operator display (e.g., a head mounted display, computer monitor, etc.) of the user/operator which may displays certain body temperature monitoring data. Optionally, the user/operator may select a control to expand or shrink the size of the dashboard display. Optionally, the size of the dashboard display may increase or decrease in response to certain conditions detected by the computing system. Optionally, the display dashboard/window size (e.g., in the vertical and horizontal dimensions, or just in the vertical dimension, or just in the horizontal dimension) may be automatically increased at least partly in response to a determination of a certain pattern of body temperature which may indicate, for example, a certain emotional state or comfort level of a participant. Optionally, the display window size may be increased at least partly in response to detection of certain body temperature state changes corresponding to an action of a target. Optionally, the display window size may be increased or decreased at least partly in response to the occurrence of certain timed events or lack of certain body temperature changes. Optionally, at least partly in response to a combination of one or more conditions and/or one or more timed events, the display window size may be increased or decreased. For example, the detection of a subject's body temperature not changing for a fixed period of time may cause the display window size to be increased. Certain state changes of the simulation itself may be visually taxing or may require more attention of the user/operator, and in response to detecting the foregoing, the computing system may decrease the window display size (e.g., automatically). Optionally, the dashboard may display a real-time view, for example, of the participant's body temperature as a number and in association with a continuous graph of body temperature. Optionally, the dashboard may only display a real-time view of the participant's body temperature activity in response to a condition, such as a body temperature state change. Optionally, a user interface control may be provided which enables the user to configure the conditions (e.g., an increase or decrease of body temperature from a mean body temperature of the participant, body temperature greater than a threshold or less than a threshold, etc.) when a view of the participant's body temperature activity may be displayed and for how long. Optionally, a user interface control may be provided which enables the user to instruct that the display window is to be moved to different areas of the monitor. Optionally, the display window may be minimized in response to a user interface control selection, condition(s), and/or time period expiration. Optionally, body temperature monitoring audio cues may be presented to a user whether the dashboard display is minimized or not. Optionally, the user interface controls described herein include but are not limited to one or more of the following: a hand gesture (e.g., a hand/limb gesture detected by a tracking device), a hand selection by the user/operator of a control (e.g., a touch screen control, a wireless wand control, a computing device keyboard, etc.), a voice utterance control (e.g., an audio signal such as a whistle, grunt, etc.), a spoken word control (e.g., using a specific voice command such as "smaller" or "minimize"), a facial gesture (e.g., a wink or two consecutive winks, open mouth, etc.), etc. Optionally, audio/voice control commands are optionally muted in response to the user selecting or speaking a mute signal (by speaking the word "mute"), thereby preventing other simulation participants from hearing spoken commands from the user. Optionally, the computing system is configured with a configurable audio communication delay enabling the system to detect a control shift keyword (e.g., "Mute") before streaming speech from a user/operator over a communication channel with other simulation participants. Optionally, the system provides a whisper mode, wherein detection of whispered commands or spoken audio below a specified or determined volume threshold causes the system to prevent such whispered commands or spoken audio from being transmitted to other participants of the simulation.

Optionally, body temperature monitoring information is presented substantially in real-time to a user/operator in the form of a status indicator light. For example, if a simulation session participant is in a training session from which enhanced body temperature monitoring data is being received, a small red indicator light may be presented (e.g., in a portion of the user/operator's display) to a user in response to the computing system determining that the subject's (e.g. simulation participant's) body temperature activity is above a certain range or indicates a certain emotional state, for example, anger or excitement. Optionally, visual indicator cues may be provided by the computing system only in response to detecting certain specified body temperature variances and/or in the absence of certain body temperature variances. For example, in the use case above, the computing system may display a continuous visual cue, such as a green light indicator, in response to determining that a participant's body temperature may indicate the participant may be in a relaxed and/or happy state, and a red indicator may be displayed in response to determining that the participant's body temperature may be indicative of a tense or angry state.

With respect to body temperature monitoring audio cues, optionally, an audio alert may be generated in response to a body temperature monitoring state change. For example, in reference to the use case above, the system may generate a variance audio tone or whisper when the computing system determines a participant's body temperature may have changed from an indication of a participant's relaxed state to a tense or angry state. Optionally, a periodic (e.g., every 10 sec, 20 sec, 30 sec, 1 min, etc.) compliance audio cue/signal is played to the user/operator as long as the subject's body temperature may indicate, for example, a relaxed or happy state.

As described herein, the computing system optionally monitors body temperature state changes of a participant and subject to certain configured constraints/limitations the user/operator is alerted. For example, a user/operator may be alerted in substantially real-time in response to determining that the participant's body temperature is no longer in an expected state. For example, it may be determined that a participant body temperature are indicative of an unhappy or disappointed state during a presentation, the user/operator may be alerted to such state of the participant. Optionally, body temperature may be continually compared against a knowledge base which may enable the computing system to infer certain characteristics/attributes of the participant's emotional state or state-of-mind. For example, in a training use case, a low body temperature during a presentation may infer the session participant is relaxed and in general agreement with points being made by the presenter or may be bored. Alternatively, a high body temperature may indicate a session participant is in disbelief with aspects of the presentation, excited and/or angry. As the foregoing two examples illustrate, the body temperature may be combined with other monitored activity (e.g., facial expressions) to determine the participant's emotional state or state-of-mind (e.g., a high body temperature combined with pursed lips may indicate disbelief in certain aspects of a presentation). Optionally, body temperature monitoring may be recorded during an entire simulation session. Optionally, body temperature monitoring may only be recorded during certain visual and/or audio events and/or conditions (e.g., in response to a state change in the simulation, an introduction of an element into the simulation, in response to a body temperature change of the participant's, etc.)

Optionally, enhanced body temperature monitoring data is recorded, stored, and data mined/analyzed subsequent to the simulation session. Optionally, participants are interviewed subsequent to the simulation session to determine state-of-mind, reactions, attitudes, physiological, and other psychological criteria to create a knowledge base of body temperature in different contextual virtual reality simulations. Optionally, the body temperature readings may be integrated into a data store to create a knowledge base of body temperature and/or body temperature attributes corresponding to a participant's state-of-mind and/or emotion during a simulation or other simulations. This knowledge base may be used to make certain direct inferences from body temperature monitoring data or indirect inferences when body temperature monitoring data may be combined with other aspects of the simulation (e.g., a likelihood of a product or service sale, expected social media feedback, etc.) Optionally, a created knowledge base from virtual reality enhanced body temperature monitoring and/or general research related to body temperature monitoring may be used to score a session wherein the score is associated with the likelihood the session participant may take a certain action (e.g., purchase a good or service). Optionally, the computing system records/logs related information associated with or at a time of a participant's body temperature change of state. In association with a detected participant's body temperature change of state, the system may record some or all of the following information: the time and date, a continuous voice snippet/phrase spoken prior to or during the body temperature change by the participant or other user/participant in the simulation, other sensory detected attributes associated with the participant (e.g., expression, heart activity, perspiration, etc. as further described herein), other body and limb action and/or muscular reactions, etc. Optionally, the computing system converts received/recorded speech into text enabling improved data mining including search and compare. Optionally, the computing system stores in computer memory recorded speech and/or converted speech into text in association with a user/operator or participant identifier (e.g., a user name, account number, etc.)

Optionally, certain audio and/or visual information and/or cues may be provided to a user/operator if a selected participant's detected body temperature is determined by the system to change from a configured state. An optional aspect of the computing system enables a user/operator to designate a body temperature level (e.g., a body temperature range of 98-99 degrees Fahrenheit) of a participant in which monitored feedback may be recorded and/or provided to the user/operator in substantially real-time. Optionally, a simulation is developed with specific body temperature states in which tracking may be associated (e.g., automatically). Optionally, the user/operator is presented with a list of body temperature tracking states/ranges prior to or at the launch of the simulation and may select a body temperature point or range and/or state via a user interface control (e.g., a pull down menu of likely heart activity ranges and/or states). Optionally, the user/operator may remove said selected options via a user interface control of the computing system.

Optionally, each participant (or a subset of participants) in a multi-user, virtual reality simulation session performs an initial calibration step. The computer system may utilize the calibration to determine, for example, body temperature baselines, from which the user's/participant's/subject's body temperature monitoring is tracked throughout the simulation session.

Monitors—Perspiration

An optional aspect of an interactive, multi-user, virtual reality simulation is the utilization of perspiration data of a participant collected using a wearable perspiration sensor. The amount of and/or contents of a participant's perspiration tracked during a simulation may be used by itself or in combination with other monitored factors (e.g., facial expressions) to determine aspects of the participant including, for examples, the emotional state, state-of-mind, and/or general well-being of a participant. Conventionally, for example, a detected and/or determined increase in the amount of perspiration of a participant may indicate the participant is stressed in a portion of the simulation in which the increased body temperature was detected and/or determined. Wearable perspiration detection devices with advanced sensors may be able to determine certain additional and/or more subtle states and/or state changes in a participant's emotional state via an analysis of the chemical composition of the received perspiration. Advantageously, the computing system may derive certain inferences from perspiration state and/or perspiration state changes (e.g., reactions to certain simulation events) which may be displayed to a user/operator/observer during and/or subsequent to a virtual reality simulation. A computing device in association with a perspiration sensor of the virtual reality participant may record aspects of the participant's perspiration and/or any changes and may store the actual sensor or data corresponding to the participant's sensor output to computer memory. Advantageously, an aspect of the computing system optionally enables an operator or a configured user to receive perspiration data or inferences corresponding to the perspiration data in substantially real-time (e.g., whether the participant is relaxed and comfortable) including perspiration changes (e.g., an increase in a participant's perspiration) which may not be presented in association with an avatar or easily discernable by a configured user and/or operator viewing an avatar representation of a participant. Optionally, body perspiration sensor may be integrated into or affixed to a head mounted display of the user. Optionally, the perspiration sensor may be worn in the form of a strap or other mechanism attached to the participant's body in a manner of recording bodily perspiration. Optionally, perspiration sensor data may be received by the computing system wirelessly via a computing device of the user (e.g., a smartwatch, smartphone, etc.) Optionally, perspiration sensor data may be received by the computing system via direct cabling (e.g., a local simulation participant sensor output connected to the computing system), via a local area network (e.g., a local simulation participant sensor output directed to a local computing device (e.g., a computing device of the user) connected to the computing system over a local area network), via a local wireless network (e.g., a local simulation participant sensor output to a wireless router associated with the computing system), via a wide-area data network including the Internet (e.g., receipt of sensor data from a remote participant's computing device (or a computing device of the computing system) wherein the sensor data is wirelessly transmitted to a local computing device of the participant). Optionally, the local computing device determines certain perspiration-based inferences from the captured sensor data output in whole or in part, for example using body perspiration sensor software analytics, and only transmits said data analysis to the computing system (e.g., via access to shared networked storage, sent via a data network, etc.) thereby reducing the amount of data sent over the data network from the remote site and so reducing network bandwidth utilization. This approach may reduce the need to have complex high performance networks.

As similarly described above with respect to head tracking, an aspect of the computing system enables an operator/configured user to receive participant perspiration data in substantially real-time which may not be provided to the operator/user. An aspect of the computing system enables an operator or a configured user to be presented with, for example, a perspiration state dashboard displayable in a portion of an operator's/user's display (e.g., head mounted display). Optionally, the dashboard displays aspects of the participant's body perspiration and/or certain inferences based upon an analysis of the participant's perspiration data in conjunction with aspects of the simulation and/or receipt of other enhanced monitoring data. Optionally, the displayed presentation is a representation of a perspiration monitor (e.g., a displayed human head with visible perspiration droplets corresponding to the detected amount of perspiration). Optionally, if there are two or more participant perspiration monitor displays, a participant identifier is displayed in association with the perspiration monitor displays. An example of a perspiration inference may inferring that a participant is pleased in response to determining from the sensor that the detected perspiration is within a normal range. A further aspect of the computing system enables an operator or a configured user to select a participant, via a user interface control, in which perspiration data may be received. Optionally, the system automatically provides perspiration data to all users/operators/observers, and a user interface control may be optionally provided whereby each user may disable the presentation of the enhanced tracking data. Optionally, the perspiration dashboard is visually presented in a portion of the screen to the user/operator with audio cues or exclusively via audio cues (e.g., using an audio tone indicating a participant's perspiration may have increased above a threshold or deviated from a recorded average of the participant). Optionally, received perspiration data is first data analyzed and/or compared against stored body perspiration data or body perspiration tracking cues/signals/patterns in order to generating certain inferences as further described below before being made available to the operator or configured user. Optionally, determined and/or received perspiration data analysis involves accessing historical perspiration data and/or perspiration pattern data from one or more internal or external data stores including over wide-area data networks such as the Internet. Optionally, inferences are derived from a comparison of stored perspiration state changes and/or perspiration state changes/patterns from stored historical simulations, generalized perspiration monitoring analysis (including non-virtual reality simulation environments), and/or other heuristic perspiration monitoring research results. A further optional aspect of the system enable the operator and/or user via a set of user interface controls to detect certain perspiration monitoring target options or patterns.

With respect to identifying participants in which enhanced perspiration monitoring may be received, optionally, a user interface control may be presented on a display of an operator/user, for example in response to a control selection by the user/operator. Optionally, in an enhanced perspiration monitoring selection mode state, all the participants in a simulation may be presented (e.g., by name, alias, and/or avatar) on the display and a user/operator may select a participant presented on the user/operator display. For example, the user/operator may select a participant via a mouse-like wand control, a head movement directed at a target user visible on the user/operator display (e.g., by a user/operator centering a session participant in a target on their screen and then selecting a control), a pull-down list of participants, by speaking the participant's name, using voice command(s), or other user interface control selection. Optionally, the computing system automatically defaults enhanced perspiration monitoring to an operator/administrator (e.g. a user initiating the simulation, a server user/administrator in a client-server configuration, a local user (versus a remote user), etc.).

With respect to the presentation of perspiration monitoring data in a display format, optionally, a dashboard or window display is projected on a portion of user/operator display (e.g., a head mounted display, computer monitor, etc.) of the user/operator which may displays certain perspiration monitoring data. Optionally, the user/operator may select a control to expand or shrink the size of the dashboard display. Optionally, the size of the dashboard display may increase or decrease in response to certain conditions detected by the computing system. Optionally, the display dashboard/window size (e.g., in the vertical and horizontal dimensions, or just in the vertical dimension, or just in the horizontal dimension) may be automatically increased at least partly in response to a determination of a certain pattern of perspiration which may indicate, for example, a certain emotional state or comfort level of a participant. Optionally, the display window size may be increased at least partly in response to detection of certain perspiration state changes corresponding to an action of a target. Optionally, the display window size may be increased or decreased at least partly in response to the occurrence of certain timed events or lack of certain perspiration changes. Optionally, at least partly in response to a combination of one or more conditions and/or one or more timed events, the display window size may be increased or decreased. For example, the detection of a subject's perspiration not changing for a fixed period of time may cause the display window size to be increased. Certain state changes of the simulation itself may be visually taxing or may require more attention of the user/operator, and in response to detecting the foregoing, the computing system may decrease the window display size (e.g., automatically). Optionally, the dashboard may display a real-time view, for example, of the participant's perspiration as a number and in association with a continuous graph of perspiration. Optionally, the dashboard may only display a real-time view of the participant's perspiration activity in response to a condition, such as a perspiration state change. Optionally, a user interface control may be provided which enables the user to configure the conditions (e.g., an increase or decrease of perspiration from a mean perspiration level of the participant, perspiration greater than a threshold or less than a threshold, etc.) when a view of the participant's perspiration activity may be displayed and for how long. Optionally, a user interface control may be provided which enables the user to instruct that the display window is to be moved to different areas of the monitor. Optionally, the display window may be minimized in response to a user interface control selection, condition(s), and/or time period expiration. Optionally, perspiration monitoring audio cues may be presented to a user whether the dashboard display is minimized or not. Optionally, the user interface controls described herein include but are not limited to one or more of the following: a hand gesture (e.g., a hand/limb gesture detected by a tracking device), a hand selection by the user/operator of a control (e.g., a touch screen control, a wireless wand control, a computing device keyboard, etc.), a voice utterance control (e.g., an audio signal such as a whistle, grunt, etc.), a spoken word control (e.g., using a specific voice command such as "smaller" or "minimize"), a facial gesture (e.g., a wink or two consecutive winks, open mouth, etc.), etc. Optionally, audio/voice control commands are optionally muted in response to the user selecting or speaking a mute signal (by speaking the word "mute"), thereby preventing other simulation participants from hearing spoken commands from the user. Optionally, the computing system is configured with a configurable audio communication delay enabling the system to detect a control shift keyword (e.g., "Mute") before streaming speech from a user/operator over a communication channel with other simulation participants. Optionally, the system provides a whisper mode, wherein detection of whispered commands or spoken audio below a specified or determined volume threshold causes the system to prevent such whispered commands or spoken audio from being transmitted to other participants of the simulation.

Optionally, perspiration monitoring information is presented substantially in real-time to a user/operator in the form of a status indicator light. For example, if a simulation session participant is in a training session from which enhanced perspiration monitoring data is being received, a small red indicator light may be presented (e.g., in a portion of the user/operator's display) to a user in response to the computing system determining that the subject's (e.g. simulation participant's) perspiration activity is above a certain range or indicates a certain emotional state, for example, anger or excitement. Optionally, visual indicator cues may be provided by the computing system only in response to detecting certain specified perspiration variances and/or in the absence of certain perspiration variances. For example, in the use case above, the computing system may display a continuous visual cue, such as a green light indicator, in response to determining that a participant's perspiration may indicate the participant may be in a relaxed and/or happy state, and a red indicator may be displayed in response to determining that the participant's perspiration may be indicative of a tense or angry state.

With respect to perspiration monitoring audio cues, optionally, an audio alert may be generated in response to a perspiration monitoring state change. For example, in reference to the use case above, the system may generate a variance audio tone or whisper when the computing system determines a participant's perspiration may have changed from an indication of a participant's relaxed state to a tense or angry state. Optionally, a periodic (e.g., every 10 sec, 20 sec, 30 sec, 1 min, etc.) compliance audio cue/signal is played to the user/operator as long as the subject's perspiration may indicate, for example, a relaxed or happy state.

As described herein, the computing system optionally monitors perspiration state changes of a participant and subject to certain configured constraints/limitations the user/operator is alerted. For example, a user/operator may be alerted in substantially real-time in response to determining that the participant's perspiration is no longer in an expected state. For example, it may be determined that a participant perspiration are indicative of an unhappy or disappointed state during a presentation, the user/operator may be alerted to such state of the participant. Optionally, perspiration data may be continually compared against a knowledge base which may enable the computing system to infer certain characteristics/attributes of the participant's emotional state or state-of-mind. For example, in a training use case, a low rate of perspiration during a presentation may infer the session participant is relaxed and in general agreement with points being made by the presenter or may be bored. Alternatively, a high rate of perspiration may indicate a session participant is in disbelief with aspects of the presentation, excited, uneasy, tense, and/or angry. As the foregoing two examples illustrate, the perspiration may be combined with other monitored activity (e.g., facial expressions) to determine the participant's emotional state or state-of-mind (e.g., a high perspiration combined with pursed lips may indicate disbelief in certain aspects of a presentation). Optionally, perspiration monitoring may be recorded during an entire simulation session. Optionally, perspiration monitoring may only be recorded during certain visual and/or audio events and/or conditions (e.g., in response to a state change in the simulation, an introduction of an element into the simulation, in response to a change in the participant's perspiration, etc.)

Optionally, enhanced perspiration monitoring data is recorded, stored, and data mined/analyzed subsequent to the simulation session. Optionally, participants are interviewed subsequent to the simulation session to determine state-of-mind, reactions, attitudes, physiological, and other psychological criteria to create a knowledge base of perspiration in different contextual virtual reality simulations. Optionally, the perspiration readings may be integrated into a data store to create a knowledge base of perspiration and/or perspiration attributes corresponding to a participant's state-of-mind and/or emotion during a simulation or other simulations. This knowledge base may be used to make certain direct inferences from perspiration monitoring data or indirect inferences when perspiration monitoring data may be combined with other aspects of the simulation (e.g., a likelihood of a product or service sale, expected social media feedback, etc.) Optionally, a created knowledge base from virtual reality enhanced perspiration monitoring and/or general research related to perspiration monitoring may be used to score a session wherein the score is associated with the likelihood the session participant may take a certain action (e.g., purchase a good or service). Optionally, the computing system records/logs related information associated with or at a time of a participant's perspiration change of state. In association with a detected participant's perspiration change of state, the system may record some or all of the following information: the time and date, a continuous voice snippet/phrase spoken prior to or during the perspiration change by the participant or other user/participant in the simulation, other sensory detected attributes associated with the participant (e.g., expression, heart activity, perspiration, etc. as further described herein), other body and limb action and/or muscular reactions, etc. Optionally, the computing system converts received/recorded speech into text enabling improved data mining including search and compare. Optionally, the computing system stores in computer memory recorded speech and/or converted speech into text in association with a user/operator or participant identifier (e.g., a user name, account number, etc.)

Optionally, certain audio and/or visual information and/or cues may be provided to a user/operator if a selected participant's detected perspiration is determined by the system to change from a configured state. An optional aspect of the computing system enables a user/operator to designate a perspiration characteristic (e.g., a perspiration electrolyte content range) of a participant in which monitored feedback may be recorded and/or provided to the user/operator in substantially real-time. Optionally, a simulation is developed with specific perspiration states in which tracking may be associated (e.g., automatically). Optionally, the user/ operator is presented with a list of perspiration tracking states/ranges prior to or at the launch of the simulation and may select a perspiration point or range and/or state via a user interface control (e.g., a pull down menu of likely perspiration rate and/or content ranges and/or states). Optionally, the user/operator may remove said selected options via a user interface control of the computing system.

Optionally, each participant (or a subset of participants) in a multi-user, virtual reality simulation session performs an initial calibration step. The computer system may utilize the calibration to determine, for example, perspiration rate and/ or content baselines, from which the user's/participant's/ subject's perspiration monitoring is tracked throughout the simulation session.

Monitor—Speech

An optional aspect of an interactive, multi-user, virtual reality simulation is the utilization of voice data of a participant collected using a microphone. The amount, content, inflection, tone, volume, pitch, timing, pauses, energy, etc., hereinafter referred to as speech attributes, of a participant's speech monitored during a simulation may be used by itself or in combination with other monitored factors (e.g., facial expressions) to determine aspects of the participant including, for examples, the emotional state (e.g., mood), state-of-mind, and/or general well-being of a participant. Just as a person may be able to distinguish the emotional state of another person, speech analysis using computer methods and algorithms may be able to similarly distinguish said state of a person speaking. Optionally, speech analysis may be used to determine the truthfulness of certain content spoken by a user. Optionally, recorded speech of a participant is converted into text (e.g. speech-to-text). Advantageously, an aspect of the computing system optionally enables an operator or a configured user to receive speech analysis or speech inferences corresponding to the speech data in substantially real-time (e.g., whether the participant is relaxed and comfortable) including speech analysis changes (e.g., an increase in a participant's perspiration) which may not be presented in association with an avatar or easily discernable by a configured user and/or operator viewing an avatar representation of a participant.

Advantageously, the computing system may derive certain inferences from the speech content and/or speech attributes recorded during a virtual reality simulation which may be displayed to a user/operator/observer during and subsequent to the simulation. A computing device including a microphone in association with the virtual reality participant may record the speech and/or aspects of the participant's speech and may store the actual recorded speech or aspects of the participant's speech to computer memory. Optionally, a microphone is integrated into or affixed to a head mounted display of the user. Optionally, a microphone may be worn in the form of a strap or other mechanism attached to the participant's body in a manner of recording speech. Optionally, recorded speech may be received by the computing system via direct cabling (e.g., a local simulation participant's microphone connected to the computing system), via a local area network (e.g., a local simulation participant voice output directed to a local computing device (e.g., a computing device of the user) connected to the computing system over a local area network), via a local wireless network (e.g., a local simulation participant microphone output to a wireless router associated with the computing system), via a wide-area data network including the Internet (e.g., receipt of voice data from a remote participant's computing device (or a computing device of the computing system) wherein the sensor data is wirelessly transmitted to a local computing device of the participant). Optionally, recorded speech is converted to text prior to transmission from a remote location in order to reduce the data network demands and latencies. Optionally, the local computing device determines from the microphone output in whole or in part certain speech attributes/characteristics, for example using speech software analytics, and only transmits said data analysis to the computing system (e.g., via access to shared networked storage, sent via a data network, etc.) thereby reducing the amount of data sent over the data network from the remote site and so reducing network bandwidth utilization. This approach may reduce the need to have complex high performance networks.

As similarly described above with respect to head tracking, an aspect of the computing system enables an operator/ configured user to receive participant perspiration data in substantially real-time which may not be provided to the operator/user. An aspect of the computing system enables an operator or a configured user to be presented with, for example, a voice state dashboard displayable in a portion of an operator's/user's display (e.g., head mounted display). Optionally, the dashboard displays aspects of the participant's speech based upon an analysis of the participant's voice data in conjunction with aspects of the simulation and/or other enhanced monitoring data. A further aspect of the computing system enables an operator or a configured user to select a participant, via a user interface control, in which voice data inferences may be received. Optionally, the system automatically provides voice data and/or voice inferences to all users/operators/observers, and a user interface control may be optionally provided whereby each user may disable the presentation of the enhanced monitoring data. Optionally, the voice analysis dashboard is visually presented in a portion of the screen to the user/operator with audio cues or exclusively via audio cues (e.g., using an audio tone indicating a participant's tone or keyword content may indicate a participant's likelihood of purchasing a good or service). Optionally, received voice data is first data analyzed and/or compared against stored speech analysis data or speech tracking cues/signals/patterns in order to generating certain inferences as further described below before being made available to the operator or configured user. Optionally, determined and/or received speech data/analysis involves accessing historical data and/or historical speech pattern data from one or more internal or external data stores including over wide-area data networks such as the Internet. Optionally, inferences are derived from a comparison of stored voice state changes and/or speech changes/patterns from stored historical simulations, generalized speech monitoring analysis (including non-virtual reality simulation environments), and/or other heuristic speech monitoring research results. A further optional aspect of the system enable the operator and/or user via a set of user interface controls to configure certain speech monitoring target options or patterns.

With respect to identifying participants in which enhanced speech monitoring may be received, optionally, a user interface control may be presented on a display of an operator/user, for example in response to a control selection by the user/operator. Optionally, in an enhanced speech monitoring selection mode state, all the participants in a simulation may be presented (e.g., by name, alias, and/or avatar) on the display and a user/operator may select a participant presented on the user/operator display. For example, the user/operator may select a participant via a mouse-like wand control, a head movement directed at a target user visible on the user/operator display (e.g., by a user/operator centering a session participant in a target on their screen and then selecting a control), a pull-down list of participants, by speaking the participant's name, using voice command(s), or other user interface control selection. Optionally, the computing system automatically defaults enhanced perspiration monitoring to an operator/administrator (e.g. a user initiating the simulation, a server user/administrator in a client-server configuration, a local user (versus a remote user), etc.).

With respect to the presentation of speech monitoring data in a display format, optionally, a dashboard or window display is projected on a portion of user/operator display (e.g., a head mounted display, computer monitor, etc.) of the user/operator which may displays certain speech monitoring data. Optionally, the user/operator may select a control to expand or shrink the size of the dashboard display. Optionally, the size of the dashboard display may increase or decrease in response to certain conditions detected by the computing system. Optionally, the display dashboard/window size (e.g., in the vertical and horizontal dimensions, or just in the vertical dimension, or just in the horizontal dimension) may be automatically increased at least partly in response to a determination of a certain pattern of speech which may indicate, for example, a certain emotional state or comfort level of a participant. Optionally, the display window size may be increased at least partly in response to detection of certain speech state changes in conjunction with corresponding to an action of a target. Optionally, the display window size may be increased or decreased at least partly in response to the occurrence of certain timed events or lack speech by a participant. Optionally, at least partly in response to a combination of one or more conditions and/or one or more timed events, the display window size may be increased or decreased. For example, the detection of a subject's not speaking for a fixed period of time may cause the display window size to be increased. Certain state changes of the simulation itself may be visually taxing or may require more attention of the user/operator, and in response to detecting the foregoing, the computing system may decrease the window display size (e.g., automatically). Optionally, the dashboard may display a real-time view, for example, of the participant's speech as a number and in association with a continuous graph of speech. Optionally, the dashboard may only display a real-time view of the participant's speech activity in response to a condition, such as a speech state change. Optionally, a user interface control may be provided which enables the user to configure the conditions (e.g., an increase or decrease of speech from a mean speech level of the participant, speech greater than a threshold or less than a threshold, etc.) when a view of the participant's speech activity may be displayed and for how long. Optionally, a user interface control may be provided which enables the user to instruct that the display window is to be moved to different areas of the monitor. Optionally, the display window may be minimized in response to a user interface control selection, condition(s), and/or time period expiration. Optionally, speech monitoring audio cues may be presented to a user whether the dashboard display is minimized or not. Optionally, the user interface controls described herein include but are not limited to one or more of the following: a hand gesture (e.g., a hand/limb gesture detected by a tracking device), a hand selection by the user/operator of a control (e.g., a touch screen control, a wireless wand control, a computing device keyboard, etc.), a voice utterance control (e.g., an audio signal such as a whistle, grunt, etc.), a spoken word control (e.g., using a specific voice command such as "smaller" or "minimize"), a facial gesture (e.g., a wink or two consecutive winks, open mouth, etc.), etc. Optionally, audio/voice control commands are optionally muted in response to the user selecting or speaking a mute signal (by speaking the word "mute"), thereby preventing other simulation participants from hearing spoken commands from the user. Optionally, the computing system is configured with a configurable audio communication delay enabling the system to detect a control shift keyword (e.g., "Mute") before streaming speech from a user/operator over a communication channel with other simulation participants. Optionally, the system provides a whisper mode, wherein detection of whispered commands or spoken audio below a specified or determined volume threshold causes the system to prevent such whispered commands or spoken audio from being transmitted to other participants of the simulation.

Optionally, speech monitoring information is presented substantially in real-time to a user/operator in the form of a status indicator light. For example, if a simulation session participant is in a training session from which enhanced speech monitoring data is being received, a small red indicator light may be presented (e.g., in a portion of the user/operator's display) to a user in response to the computing system determining that the subject's (e.g. simulation participant's) speech activity is indicative of a certain condition such as an emotional state (e.g., anger). Optionally, visual indicator cues may be provided by the computing system only in response to detecting certain specified speech variances and/or in the absence of certain speech variances. For example, in the use case above, the computing system may display a continuous visual cue, such as a green light indicator, in response to determining that a participant's speech may indicate the participant may be in a relaxed and/or happy state, and a red indicator may be displayed in response to determining that the participant's speech may be indicative of a tense or angry state.

With respect to speech monitoring audio cues, optionally, an audio alert may be generated in response to a speech monitoring state change. For example, in reference to the use case above, the system may generate a variance audio tone or whisper when the computing system determines a participant's speech may have changed from an indication of a participant's relaxed state to a tense or angry state. Optionally, a periodic (e.g., every 10 sec, 20 sec, 30 sec, 1 min, etc.) compliance audio cue/signal is played to the user/operator as long as the subject's speech may indicate, for example, a relaxed or happy state.

As described herein, the computing system optionally monitors speech state changes of a participant and subject to certain configured constraints/limitations the user/operator is alerted. For example, a user/operator may be alerted in substantially real-time in response to determining that the participant's speech is no longer in an expected state. For example, it may be determined that a participant speech are indicative of an unhappy or disappointed state during a presentation, the user/operator may be alerted to such state of the participant. Optionally, speech data may be continually compared against a knowledge base which may enable the computing system to infer certain characteristics/attributes of the participant's emotional state or state-of-mind. For example, in a training use case, certain verbal cues (e.g., yes) during a presentation may infer the session participant is relaxed and in general agreement with points being made by the presenter. Speech may be combined with other monitored activity (e.g., facial expressions) to determine the participant's emotional state or state-of-mind (e.g., negative verbal cues combined with pursed lips may indicate disbelief in certain aspects of a presentation). Optionally, all speech of a participant may be recorded during a simulation session. Optionally, speech monitoring may only be recorded during certain visual and/or audio events and/or conditions (e.g., in response to a state change in the simulation, an introduction of an element into the simulation, in response to a change in a participant's speech, etc.)

Optionally, enhanced speech monitoring data is recorded, stored, and data mined/analyzed subsequent to the simulation session. Optionally, participants are interviewed subsequent to the simulation session to determine state-of-mind, reactions, attitudes, physiological, and other psychological criteria to create a knowledge base of speech in different contextual virtual reality simulations. Optionally, the speech readings may be integrated into a data store to create a knowledge base of speech and/or speech attributes corresponding to a participant's state-of-mind and/or emotion during a simulation or other simulations. This knowledge base may be used to make certain direct inferences from speech monitoring data or indirect inferences when speech monitoring data may be combined with other aspects of the simulation (e.g., a likelihood of a product or service sale, expected social media feedback, etc.) Optionally, a created knowledge base from virtual reality enhanced speech monitoring and/or general speech analysis research may be used to score a session wherein the score is associated with the likelihood the session participant may take a certain action (e.g., purchase a good or service). Optionally, the computing system records/logs related information associated with or at a time of a participant's speech (e.g., content) or speech change of state. In association with a detected participant's speech or certain speech change of state, the system may record some or all of the following information: the time and date, a continuous voice snippet/phrase spoken prior to or during the speech change by the participant or other user/participant in the simulation, other sensory detected attributes associated with the participant (e.g., expression, heart activity, speech, etc. as further described herein), other body and limb action and/or muscular reactions, etc. Optionally, the computing system converts received/recorded speech into text enabling improved data mining including search and compare. Optionally, the computing system stores in computer memory recorded speech and/or converted speech into text in association with a user/operator or participant identifier (e.g., a user name, account number, etc.)

Optionally, certain audio and/or visual information and/or cues may be provided to a user/operator if a selected participant's detected speech is determined by the system to change from a configured state. An optional aspect of the computing system enables a user/operator to designate a speech characteristic (e.g., anger tone) of a participant in which monitored feedback may be recorded and/or provided to the user/operator in substantially real-time. Optionally, a simulation is developed with specific speech states in which tracking may be associated (e.g., automatically). Optionally, the user/operator is presented with a list of speech tracking states/ranges prior to or at the launch of the simulation and may select a spoken phrase and/or voice analysis state (e.g., angry) and/or detected speech analysis state change via a user interface control (e.g., a pull down menu of likely verbal cues). Optionally, the user/operator may remove said selected options via a user interface control of the computing system.

Optionally, each participant (or a subset of participants) in a multi-user, virtual reality simulation session performs an initial calibration step. The computer system may utilize the calibration to determine, for example, speech rate and/or content baselines, from which the user's/participant's/subject's speech monitoring is tracked throughout the simulation session.

Monitor Breath

An optional aspect of an interactive, multi-user, virtual reality simulation is the utilization of breath content data of a participant collected using a sensor, for example, a breath analyzer. The volume (e.g., deep or shallow), rate, pattern, and content of a participant's breath tracked during a simulation may be used by itself or in combination with other monitored factors (e.g., facial expressions) to determine aspects of the participant including, for examples, the emotional state, state-of-mind, and/or general well-being of a participant. Conventionally, for example, rapid or increased breathing of a user may be a factor indicating increased excitement and/or stress in a portion of the simulation in which the increased breathing rate is detected and/or determined. In another example, the breath content of a user may be analyzed to determine the likelihood of certain diseases such as cancer. Optionally, detection of certain trace molecules/chemicals in a breath may indicate an increase in stress for example. Wearable breath sensors may be able to determine certain additional and/or more subtle states and/or state changes in a participant's emotional state via an analysis of the molecular/chemical composition of a received exhale. Advantageously, the computing system may derive certain inferences from a breath's state changes (e.g., reactions to certain simulation events) which may be displayed to a user/operator/observer during and/or subsequent to a virtual reality simulation. A computing device in association with a breath sensor of the virtual reality participant may record aspects of the participant's breath content, rate, volume, and/or any changes and may store the actual sensor or data corresponding to the participant's sensor output to computer memory. Advantageously, an aspect of the computing system optionally enables an operator or a configured user to receive breath sensor data or inferences corresponding to the breath data in substantially real-time (e.g., whether the participant is relaxed and comfortable) including breath changes (e.g., an increase in a participant's breathing rate) which may not be presented in association with an avatar or easily discernable by a configured user and/or operator viewing an avatar representation of a participant. Optionally, breath sensor may be integrated into or affixed to a head mounted display of the user. Optionally, breath exhale sensor data may be received by the computing system wirelessly via a computing device of the user (e.g., a smartwatch, smartphone, etc.) Optionally, a breath sensor is portable and may be worn in, placed near, and/or placed in a participant's mouth for the duration of the simulation or a portion of the simulation. Optionally, breath sensor data may be received by the computing system via direct cabling (e.g., a local simulation participant sensor output connected to the computing system), via a local area network (e.g., a local simulation participant sensor output directed to a local computing device (e.g., a computing device of the user) connected to the computing system over a local area network), via a local wireless network (e.g., a local simulation participant sensor output to a wireless router associated with the computing system), via a wide-area data network including the Internet (e.g., receipt of sensor data from a remote participant's computing device (or a computing device of the computing system) wherein the sensor data is wirelessly transmitted to the computing device of the participant). Optionally, the local computing device determines certain breath-based inferences from the captured sensor data output in whole or in part, for example using breath sensor software analytics, and only transmits said data analysis and/or breath attributes to the computing system (e.g., via access to shared networked storage, sent via a data network, etc.) thereby reducing the amount of data sent over the data network from the remote site and so reducing network bandwidth utilization. This approach may reduce the need to have complex high performance networks.

As similarly described above with respect to head tracking, an aspect of the computing system enables an operator/configured user to receive participant breath data in substantially real-time which may not be provided to the operator/user. An aspect of the computing system enables an operator or a configured user to be presented with, for example, a breath state dashboard displayable in a portion of an operator's/user's display (e.g., head mounted display). Optionally, the dashboard displays aspects of the participant's breath and/or certain inferences based upon an analysis of the participant's breath data in conjunction with aspects of the simulation and/or receipt of other enhanced monitoring data. Optionally, the dashboard display is a representation of a designated participant's breathing rate (e.g., a sine wave graph corresponding to the breathing pattern of the participant). Optionally, if there are two or more participant breath displays, a participant identifier is displayed in association with the breath displays. An example of a breath inference may be inferring that a participant is pleased in response to determining from the sensor that the detected breathing rate is within a normal range for the participant. A further aspect of the computing system enables an operator or a configured user to select a participant, via a user interface control, in which breath exhale data may be received. Optionally, the system automatically provides breath exhale data to all users/operators/observers, and a user interface control may be optionally provided whereby each user may disable the presentation of the enhanced tracking data. Optionally, the breath exhale dashboard is visually presented in a portion of the screen to the user/operator with audio cues or exclusively via audio cues (e.g., using an audio tone indicating a participant's breath may have increased above a threshold or deviated from a recorded average of the participant). Optionally, received breath exhale data is first data analyzed and/or compared against stored breath data or breath tracking cues/signals/patterns in order to generating certain inferences as further described below before being made available to the operator or configured user. Optionally, the determined and/or received breath data analysis involves accessing historical breath data and/or breath pattern data from one or more internal or external data stores including over wide-area data networks such as the Internet. Optionally, inferences are derived from a comparison of stored breath state changes and/or breath state changes/patterns from stored historical simulations, generalized breath exhale monitoring analysis (including non-virtual reality simulation environments), and/or other heuristic breath exhale monitoring research results. A further optional aspect of the system enable the operator and/or user via a set of user interface controls to detect certain breath monitoring target options.

With respect to identifying participants in which enhanced breath monitoring may be received, optionally, a user interface control may be presented on a display of an operator/user, for example in response to a control selection by the user/operator. Optionally, in an enhanced breath monitoring selection mode state, all the participants in a simulation may be presented (e.g., by name, alias, and/or avatar) on the display and a user/operator may select a participant presented on the user/operator display. For example, the user/operator may select a participant via a mouse-like wand control, a head movement directed at a target user visible on the user/operator display (e.g., by a user/operator centering a session participant in a target on their screen and then selecting a control), a pull-down list of participants, by speaking the participant's name, using voice command(s), or other user interface control selection. Optionally, the computing system automatically defaults enhanced breath monitoring to an operator/administrator (e.g. a user initiating the simulation, a server user/administrator in a client-server configuration, a local user (versus a remote user), etc.).

With respect to the presentation of breath monitoring data in a display format, optionally, a dashboard or window display is projected on a portion of user/operator display (e.g., a head mounted display, computer monitor, etc.) of the user/operator which may displays certain breath monitoring data. Optionally, the user/operator may select a control to expand or shrink the size of the dashboard display. Optionally, the size of the dashboard display may increase or decrease in response to certain conditions detected by the computing system. Optionally, for example, the display dashboard/window size (e.g., in the vertical and horizontal dimensions, or just in the vertical dimension, or just in the horizontal dimension) may be automatically increased at least partly in response to a determination of a certain pattern of breath which may indicate, for example, a certain emotional state or comfort level of a participant. Optionally, the display window size may be increased at least partly in response to detection of certain breath state changes (e.g., content or rate) corresponding to an action of a designated target. Optionally, the display window size may be increased or decreased at least partly in response to the occurrence of certain timed events or lack of certain breath changes. Optionally, at least partly in response to a combination of one or more conditions and/or one or more timed events, the display window size may be increased or decreased. For example, the detection of a subject's breath not changing for a fixed period of time may cause the display window size to be increased. Certain state changes of the simulation itself may be visually taxing or may require more attention of the user/operator, and in response to detecting the foregoing, the computing system may decrease the window display size (e.g., automatically). Optionally, the dashboard may display a real-time view, for example, of the participant's breath rate as a number (e.g., 20 breaths per minute) and in association with a continuous graph of breath activity. Optionally, the dashboard may only display a real-time view of the participant's breath activity in response to a condition, such as a breath state change. Optionally, a user interface control may be provided which enables the user to configure the conditions (e.g., an increase or decrease of breath rate from a mean breath rate of the participant, breath rate greater than a threshold or less than a threshold, etc.) when a view of the participant's breath activity may be displayed and for how long. Optionally, a user interface control may be provided which enables the user to instruct that the display window is to be moved to different areas of the monitor. Optionally, the display window may be minimized in response to a user interface control selection, condition(s), and/or time period expiration. Optionally, breath monitoring audio cues may be presented to a user whether the dashboard display is minimized or not. Optionally, the user interface controls described herein include but are not limited to one or more of the following: a hand gesture (e.g., a hand/limb gesture detected by a tracking device), a hand selection by the user/operator of a control (e.g., a touch screen control, a wireless wand control, a computing device keyboard, etc.), a voice utterance control (e.g., an audio signal such as a whistle, grunt, etc.), a spoken word control (e.g., using a specific voice command such as "smaller" or "minimize"), a facial gesture (e.g., a wink or two consecutive winks, open mouth, etc.), etc. Optionally, audio/voice control commands are optionally muted in response to the user selecting or speaking a mute signal (by speaking the word "mute"), thereby preventing other simulation participants from hearing spoken commands from the user. Optionally, the computing system is configured with a configurable audio communication delay enabling the system to detect a control shift keyword (e.g., "Mute") before streaming speech from a user/operator over a communication channel with other simulation participants. Optionally, the system provides a whisper mode, wherein detection of whispered commands or spoken audio below a specified or determined volume threshold causes the system to prevent such whispered commands or spoken audio from being transmitted to other participants of the simulation.

Optionally, breath monitoring information is presented substantially in real-time to a user/operator in the form of a status indicator light. For example, if a simulation session participant is in a training session from which enhanced breath monitoring data is being received, a small red indicator light may be presented (e.g., in a portion of the user/operator's display) to a user in response to the computing system determining that the subject's (e.g. simulation participant's) breath activity is above a certain range or indicates a certain emotional state, for example, anger or excitement. Optionally, visual indicator cues may be provided by the computing system only in response to detecting certain specified breath variances and/or in the absence of certain breath variances. For example, in the use case above, the computing system may display a continuous visual cue, such as a green light indicator, in response to determining that a participant's breath may indicate the participant may be in a relaxed and/or happy state, and a red indicator may be displayed in response to determining that the participant's breath may be indicative of a tense or angry state.

With respect to breath monitoring audio cues, optionally, an audio alert may be generated in response to a breath monitoring state change. For example, in reference to the use case above, the system may generate a variance audio tone or whisper when the computing system determines a participant's breath activity may have changed from an indication of a participant's relaxed state to a tense or angry state. Optionally, a periodic (e.g., every 10 sec, 20 sec, 30 sec, 1 min, etc.) compliance audio cue/signal is played to the user/operator as long as the subject's breath may indicate, for example, a relaxed or happy state.

As described herein, the computing system optionally monitors breath state changes of a participant and subject to certain configured constraints/limitations the user/operator is alerted. For example, a user/operator may be alerted in substantially real-time in response to determining that the participant's breath is no longer in an expected state. For example, it may be determined that a participant breath are indicative of an unhappy or disappointed state during a presentation, the user/operator may be alerted to such state of the participant. Optionally, breath data may be continually compared against a knowledge base which may enable the computing system to infer certain characteristics/attributes of the participant's emotional state or state-of-mind. For example, in a training use case, a low rate of breath activity during a presentation may infer the session participant is relaxed and in general agreement with points being made by the presenter or may be bored. Alternatively, a high rate of breath activity may indicate a session participant is in disbelief with aspects of the presentation, excited, uneasy, tense, and/or angry. As the foregoing two examples illustrate, the breath data may be combined with other monitored activity (e.g., facial expressions) to determine the participant's emotional state or state-of-mind (e.g., a high breath rate combined with pursed lips may indicate disbelief in certain aspects of a presentation). Optionally, breath monitoring may be recorded during an entire simulation session. Optionally, breath monitoring may only be recorded during certain visual and/or audio events and/or conditions (e.g., in response to a state change in the simulation, an introduction of an element into the simulation, in response to a participant's breath change of state, etc.)

Optionally, enhanced breath monitoring data is recorded, stored, and data mined/analyzed subsequent to the simulation session. Optionally, participants are interviewed subsequent to the simulation session to determine state-of-mind, reactions, attitudes, physiological, and other psychological criteria to create a knowledge base of breath data in different contextual virtual reality simulations. Optionally, the breath readings may be integrated into a data store to create a knowledge base of breathing and/or breath attributes corresponding to a participant's state-of-mind and/or emotion during a simulation or other simulations. This knowledge base may be used to make certain direct inferences from breath monitoring data or indirect inferences when breath monitoring data may be combined with other aspects of the simulation (e.g., a likelihood of a product or service sale, expected social media feedback, etc.) Optionally, a created knowledge base from virtual reality enhanced breath monitoring and/or general research related to breath monitoring may be used to score a session wherein the score is associated with the likelihood the session participant may take a certain action (e.g., purchase a good or service). Optionally, the computing system records/logs related information associated with or at a time of a participant's breath state changes. In association with a detected participant's breath state change, the system may record some or all of the following information: the time and date, a continuous voice snippet/phrase spoken prior to or during the breath change by the participant or other user/participant in the simulation, other sensory detected attributes associated with the participant (e.g., expression, heart activity, perspiration, etc. as further described herein), other body and limb action and/or muscular reactions, etc. Optionally, the computing system converts received/recorded speech into text enabling improved data mining including search and compare. Optionally, the computing system stores in computer memory recorded speech and/or converted speech into text in association with a user/operator or participant identifier (e.g., a user name, account number, etc.)

Optionally, certain audio and/or visual information and/or cues may be provided to a user/operator if a selected participant's detected breath is determined by the system to change from a configured state. An optional aspect of the computing system enables a user/operator to designate a breath characteristic (e.g., a breath trace element/chemical compound content range) of a participant in which monitored feedback may be recorded and/or provided to the user/operator in substantially real-time. Optionally, a simulation is developed with specific breath states in which tracking may be associated (e.g., automatically). Optionally, the user/operator is presented with a list of breath tracking states/ranges prior to or at the launch of the simulation and may select a breath point or range and/or state via a user interface control (e.g., a pull down menu of likely breath rates and/or content ranges and/or states). Optionally, the user/operator may remove said selected options via a user interface control of the computing system.

Optionally, each participant (or a subset of participants) in a multi-user, virtual reality simulation session performs an initial calibration step. The computer system may utilize the calibration to determine, for example, breath rate and/or content baselines, from which the user's/participant's/subject's breath monitoring is tracked throughout the simulation session.

Monitor Hand/Limb

An optional aspect of an interactive, multi-user, virtual reality simulation is the utilization of hand/limb activity which may be collected using a sensor such as a tracking device and/or haptic glove tracking mechanism including a glove affixed with passive or active markers, and/or wearable passive or active markers. Hand/limb activity (e.g., clenched fist, hand force applied to a wand, finger pointing, scratching, nail biting, etc.) tracked during a simulation may be used by itself or in combination with other monitored factors (e.g., facial expressions) to determine aspects of the participant including, for examples, the emotional state, state-of-mind, and/or general well-being of a simulation participant. Conventionally, for example, a detected and/or determined clenched fist may be a factor indicating increased excitement and/or stress. A computing device in association with a hand/limb sensor and/or tracking device of the virtual reality participant may record aspects of the participant's perspiration and/or any changes and may store the actual sensor or data corresponding to the participant's sensor output and/or tracking device to computer memory. Advantageously, the computing system may derive certain inferences from a hand/limb activity and/or hand/limb activity state changes (e.g., in reactions to certain simulation events) which may be displayed to a user/operator/observer during and/or subsequent to a virtual reality simulation. Advantageously, an aspect of the computing system optionally enables an operator or a configured user to receive additional hand/limb activity data or inferences corresponding to the hand/limb activity data in substantially real-time (e.g., whether the participant is relaxed and comfortable) including hand/limb activity changes (e.g., a certain type of hand action such as a hand wave) which may not be easily discernable by a user/operator viewing an avatar representation of a participant. A computing device in association with a hand/limb activity sensor or tracking device of the virtual reality participant may record the participant's hand/limb activity and/or any changes and store said recordings to computer memory. Optionally, a hand/limb activity sensor is worn in the form of a glove or other mechanism attached to the participant's hand in a manner enabling the recording hand activity An example hand-held tracking device which emits trackable infrared light signatures is a wireless Precision Position Tracking (PPT) device, PPT Eyes™, from WorldViz LLC of Santa Barbara. The wand, used in conjunction with motion tracking cameras, provides interaction and navigation in immersive virtual reality systems and may include a joystick/pad and trigger enabling hand tracking and hand grabbing and/or moving of virtual objects.

Optionally, hand action data may be received by the computing system wirelessly via a computing device of the user (e.g., a smartwatch, smartphone, etc.) Optionally, hand/limb activity sensor/tracking data is received by the computing system via direct cabling (e.g., a local simulation participant sensor output connected to the computing system), via a local area network (e.g., a local simulation participant sensor output directed to a local computing device (e.g., a computing device of the user) connected to the computing system over a local area network), via a local wireless network (e.g., a local simulation participant sensor output to a wireless router associated with the computing system), via a wide-area data network including the Internet (e.g., receipt of sensor data from a remote participant's computing device (or a computing device of the computing system) wherein the sensor data is wirelessly transmitted to a local computing device of the participant). Optionally, the local computing device determines certain hand/limb activity-based inferences from the captured sensor/tracking data output in whole or in part, for example using hand/limb activity sensor/tracking software analytics, and only transmits said data analysis to the computing system (e.g., via access to shared networked storage, sent via a data network, etc.) thereby reducing the amount of data sent over the data network from the remote site and so reducing network bandwidth utilization. This approach may reduce the need to have complex high performance networks.

As similarly described above with respect to head tracking, an aspect of the computing system enables an operator/configured user to receive participant hand/limb activity data in substantially real-time which may not be provided to the operator/user. An aspect of the computing system enables an operator or a configured user to be presented with, for example, a hand/limb activity state dashboard displayable in a portion of an operator's/user's display (e.g., head mounted display). Optionally, the dashboard displays aspects of the participant's hand/limb activity and/or certain inferences based upon an analysis of the participant's hand/limb activity data in conjunction with aspects of the simulation and/or receipt of other enhanced monitoring data. Optionally, the dashboard display is a representation of a designated participant's hand/limb activity. Optionally, if there are two or more participant breath displays, a participant identifier is displayed in association with the breath displays. An example of a hand/limb activity inference is inferring that a participant is pleased in response to the computing system determining that he participant signaled a "thumbs up". A further aspect of the computing system enables an operator or a configured user to select a participant, via a user interface control, in which hand action data may be received. Optionally, the system automatically provides hand action data to all users/operators/observers, and a user interface control may be optionally provided whereby each user may disable the presentation of the enhanced tracking data. Optionally, the hand/limb activity dashboard is visually presented in a portion of the screen to the user/operator with audio cues or exclusively via audio cues (e.g., using an audio tone indicating a participant's hand/limb activity may have increased above a threshold or deviated from a recorded average of the participant). Optionally, received hand/limb activity data is first data analyzed and/or compared against stored hand/limb activity data or hand/limb activity tracking cues/signals/patterns in order to generating certain inferences as further described below before being made available to the operator or configured user. Optionally, the determined and/or received hand/limb activity data analysis involves accessing historical hand/limb activity and/or hand/limb activity pattern data from one or more internal or external data stores including over wide-area data networks such as the Internet. Optionally, inferences are derived from a comparison of stored hand/limb activity state changes and/or hand/limb activity state changes/patterns from stored historical simulations, generalized hand action monitoring analysis (including non-virtual reality simulation environments), and/or other heuristic hand action monitoring research results. A further optional aspect of the system enable the operator and/or user via a set of user interface controls to configure certain hand action monitoring target options or patterns.

With respect to identifying participants in which enhanced hand/limb activity monitoring may be received, optionally, a user interface control may be presented on a display of an operator/user, for example in response to a control selection by the user/operator. Optionally, in an enhanced hand/limb activity monitoring selection mode state, all the participants in a simulation may be presented (e.g., by name, alias, and/or avatar) on the display and a user/operator may select a participant presented on the user/operator display. For example, the user/operator may select a participant via a mouse-like wand control, a head movement directed at a target user visible on the user/operator display (e.g., by a user/operator centering a session participant in a target on their screen and then selecting a control), a pull-down list of participants, by speaking the participant's name, using voice command(s), or other user interface control selection. Optionally, the computing system automatically defaults enhanced hand/limb activity monitoring to an operator/administrator (e.g. a user initiating the simulation, a server user/administrator in a client-server configuration, a local user (versus a remote user), etc.).

With respect to the presentation of hand/limb activity monitoring data in a display format, optionally, a dashboard or window display is projected on a portion of user/operator display (e.g., a head mounted display, computer monitor, etc.) of the user/operator which may displays certain hand/limb activity monitoring data. Optionally, the user/operator may select a control to expand or shrink the size of the dashboard display. Optionally, the size of the dashboard display may increase or decrease in response to certain conditions detected by the computing system. Optionally, the display dashboard/window size (e.g., in the vertical and horizontal dimensions, or just in the vertical dimension, or just in the horizontal dimension) may be automatically increased at least partly in response to a determination of a certain pattern of hand/limb activity which may indicate, for example, a certain emotional state or comfort level of a participant. Optionally, the display window size may be increased at least partly in response to detection of certain hand/limb activity state changes corresponding to an action of a designated target. Optionally, the display window size may be increased or decreased at least partly in response to the occurrence of certain timed events or lack of certain hand/limb activity changes. Optionally, at least partly in response to a combination of one or more conditions and/or one or more timed events, the display window size may be increased or decreased. For example, the detection of a subject's hand/limb activity not changing for a fixed period of time may cause the display window size to be increased. Certain state changes of the simulation itself may be visually taxing or may require more attention of the user/operator, and in response to detecting the foregoing, the computing system may decrease the window display size (e.g., automatically). Optionally, the dashboard may display a real-time view, for example, of the participant's hand/limb or a virtual representation mirroring the participant hand/limb activity. Optionally, the dashboard may only display a real-time view of the participant's hand/limb activity in response to a condition, such as a hand/limb activity state change. Optionally, a user interface control may be provided which enables the user to configure the conditions (e.g., an increase or decrease of hand/limb activity from a mean hand/limb activity level of the participant, hand/limb activity greater than a threshold or less than a threshold, etc.) when a view of the participant's hand/limb activity may be displayed and for how long. Optionally, a user interface control may be provided which enables the user to instruct that the display window is to be moved to different areas of the monitor. Optionally, the display window may be minimized in response to a user interface control selection, condition(s), and/or time period expiration. Optionally, hand/limb activity monitoring audio cues may be presented to a user whether the dashboard display is minimized or not. Optionally, the user interface controls described herein include but are not limited to one or more of the following: a hand gesture (e.g., a hand/limb gesture detected by a tracking device), a hand selection by the user/operator of a control (e.g., a touch screen control, a wireless wand control, a computing device keyboard, etc.), a voice utterance control (e.g., an audio signal such as a whistle, grunt, etc.), a spoken word control (e.g., using a specific voice command such as "smaller" or "minimize"), a facial gesture (e.g., a wink or two consecutive winks, open mouth, etc.), etc. Optionally, audio/voice control commands are optionally muted in response to the user selecting or speaking a mute signal (by speaking the word "mute"), thereby preventing other simulation participants from hearing spoken commands from the user. Optionally, the computing system is configured with a configurable audio communication delay enabling the system to detect a control shift keyword (e.g., "Mute") before streaming speech from a user/operator over a communication channel with other simulation participants. Optionally, the system provides a whisper mode, wherein detection of whispered commands or spoken audio below a specified or determined volume threshold causes the system to prevent such whispered commands or spoken audio from being transmitted to other participants of the simulation.

Optionally, hand/limb activity monitoring information is presented substantially in real-time to a user/operator in the form of a status indicator light. For example, if a simulation session participant is in a training session from which enhanced hand/limb activity monitoring data is being received, a small red indicator light may be presented (e.g., in a portion of the user/operator's display) to a user in response to the computing system determining that the subject's (e.g. simulation participant's) hand/limb activity is above a certain range or indicates a certain emotional state, for example, exasperation. Optionally, visual indicator cues may be provided by the computing system only in response to detecting certain specified hand/limb activity variances and/or in the absence of certain hand/limb activity variances. For example, in the use case above, the computing system may display a continuous visual cue, such as a green light indicator, in response to determining that a participant's hand/limb activity may indicate the participant may be in a relaxed and/or happy state, and a red indicator may be displayed in response to determining that the participant's hand/limb activity may be indicative of a tense or angry state.

With respect to hand/limb activity monitoring audio cues, optionally, an audio alert may be generated in response to a hand/limb activity monitoring state change. For example, in reference to the use case above, the system may generate a variance audio tone or whisper when the computing system determines a participant's hand/limb activity may have changed from an indication of a participant's relaxed state to a tense or angry state. Optionally, a periodic (e.g., every 10 sec, 20 sec, 30 sec, 1 min, etc.) compliance audio cue/signal is played to the user/operator as long as the subject's hand/limb activity may indicate, for example, a relaxed or happy state.

As described herein, the computing system optionally monitors hand/limb activity state changes of a participant and subject to certain configured constraints/limitations the user/operator is alerted. For example, a user/operator may be alerted in substantially real-time in response to determining that the participant's hand/limb activity is no longer in an expected state. For example, it may be determined that a participant hand/limb activity is indicative of an unhappy or disappointed state during a presentation, the user/operator may be alerted to such state of the participant. Optionally, hand/limb activity data may be continually compared against a knowledge base which may enable the computing system to infer certain characteristics/attributes of the participant's emotional state or state-of-mind. For example, in a training use case, a low rate of hand/limb activity during a presentation may infer the session participant is relaxed and in general agreement with points being made by the presenter or may be bored. Alternatively, a high rate of hand/limb activity may indicate a session participant is in disbelief with aspects of the presentation, excited, uneasy, tense, and/or angry. As the foregoing two examples illustrate, the hand/limb activity may be combined with other monitored activity (e.g., facial expressions) to determine the participant's emotional state or state-of-mind (e.g., a high hand/limb activity combined with pursed lips may indicate disbelief in certain aspects of a presentation). Optionally, hand/limb activity monitoring may be recorded during an entire simulation session. Optionally, hand/limb activity monitoring may only be recorded during certain visual and/or audio events and/or conditions (e.g., in response to a state change in the simulation, an introduction of an element into the simulation, in response to a change in a participant's hand/limb activity, etc.)

Optionally, enhanced hand/limb activity monitoring data is recorded, stored, and data mined/analyzed subsequent to the simulation session. Optionally, participants are interviewed subsequent to the simulation session to determine state-of-mind, reactions, attitudes, physiological, and other psychological criteria to create a knowledge base of hand/limb activity in different contextual virtual reality simulations. Optionally, the hand/limb activity readings may be integrated into a data store to create a knowledge base of hand/limb activity and/or hand/limb activity attributes corresponding to a participant's state-of-mind and/or emotion during a simulation or other simulations. This knowledge base may be used to make certain direct inferences from hand/limb activity monitoring data or indirect inferences when hand/limb activity monitoring data may be combined with other aspects of the simulation (e.g., a likelihood of a product or service sale, expected social media feedback, etc.) Optionally, a created knowledge base from virtual reality enhanced hand/limb activity monitoring and/or general research related to hand/limb activity monitoring may be used to score a session wherein the score is associated with the likelihood the session participant may take a certain action (e.g., purchase a good or service). Optionally, the computing system records/logs related information associated with or at a time of a participant's hand/limb activity change of state. In association with a detected participant's hand/limb activity change of state, the system may record some or all of the following information: the time and date, a continuous voice snippet/phrase spoken prior to or during the hand/limb activity change by the participant or other user/participant in the simulation, other sensory detected attributes associated with the participant (e.g., expression, heart activity, perspiration, etc. as further described herein), other body and limb action and/or muscular reactions, etc. Optionally, the computing system converts received/recorded speech into text enabling improved data mining including search and compare. Optionally, the computing system stores in computer memory recorded speech and/or converted speech into text in association with a user/operator or participant identifier (e.g., a user name, account number, etc.)

Optionally, certain audio and/or visual information and/or cues may be provided to a user/operator if a selected participant's detected hand/limb activity is determined by the system to change from a configured state. An optional aspect of the computing system enables a user/operator to designate a hand/limb activity characteristic (e.g., praying hands) of a participant in which monitored feedback may be recorded and/or provided to the user/operator in substantially real-time. Optionally, a simulation is developed with specific hand/limb activity states in which tracking may be associated (e.g., automatically). Optionally, the user/operator is presented with a list of hand/limb activity tracking states/ranges prior to or at the launch of the simulation and may select a certain type/patter of hand/limb activity and/or amount of hand/limb activity via a user interface control (e.g., a pull down menu of likely hand/limb activity states). Optionally, the user/operator may remove said selected options via a user interface control of the computing system.

Optionally, each participant (or a subset of participants) in a multi-user, virtual reality simulation session performs an initial calibration step. The computer system may utilize the calibration to determine, for example, hand/limb activity rate and/or content baselines, from which the user's/participant's/subject's hand/limb activity monitoring is tracked throughout the simulation session.

Figure 4:
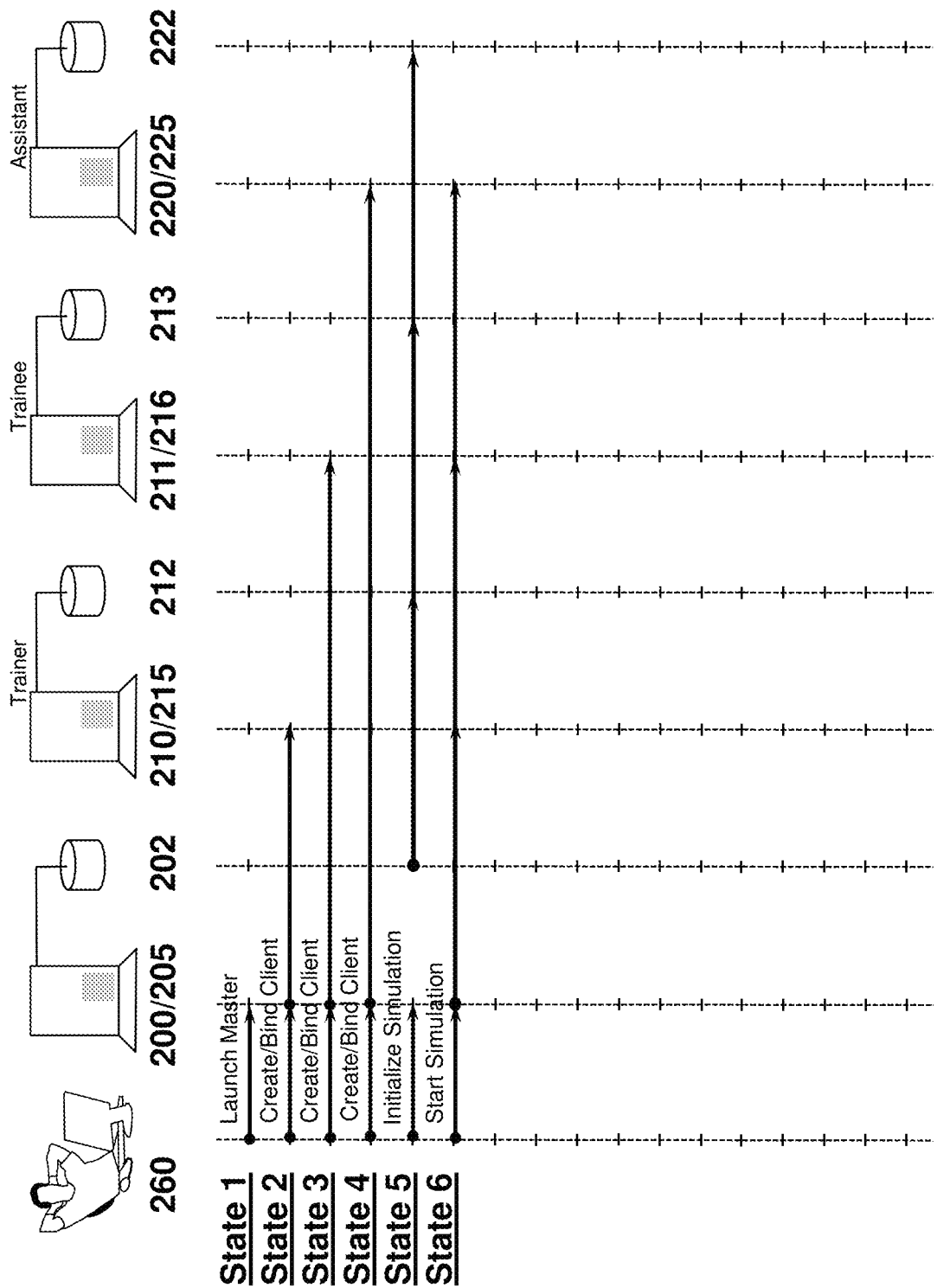
FIG. 4 and FIG. 5 illustrate an example process.
Figure 5:
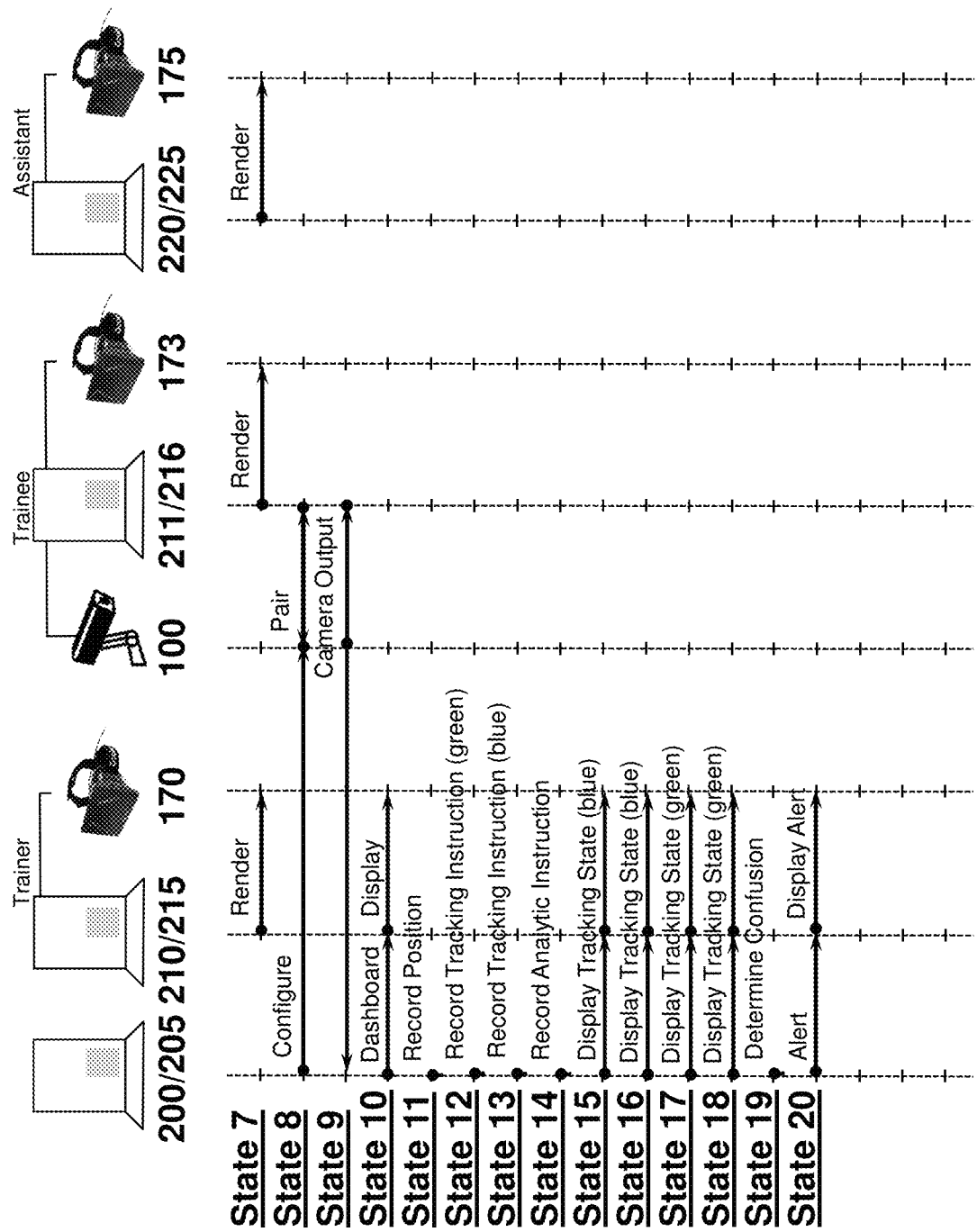

FIG. 4 and FIG. 5 illustrate an example process workflow of an example system discussed above. Process states are listed on the left and elements of the operating environment of FIGS. 1, 2, and 3 are listed across the top. In this example, a multi-user (three-member), virtual reality session occurs in which enhanced tracking is configured for a designated participant. A trainer is providing instructions to two participants on how to perform a certain repair on a new ACME automobile engine. One of the participants, the trainee, is expected to understand the repair task in a level of detail that the trainee may be able to repair an ACME engine without assistance. The second participant, assistant, generally provides assistance to the trainee in any repair task. The trainer, in additional to performing the role of trainer, also provides certain administrative tasks related to launching and configuring the VR simulation session. As this example is intended to illustrate certain aspects of enhanced tracking not each and every step in a conventional simulation initialization and/or simulation session is described.

State 1. An instance of a master server program 205 launches on the computing server/device 200 (e.g., in response to a launch command provided by the trainer via monitor 260).

State 2. The master server program 205 generates and provides for display a user interface on a console/monitor 260 that identifies the network connected computing devices 210, 211, and 220 (e.g., using differentiating identifiers, such as an alphanumeric name and/or an icon). The master server program 205 receives, via the user interface, a selection by the trainer of an add control, and in response, the master server program 205 creates an instance of a client 215 on the computing device 210 and binds (e.g., creates a client-server association/linkage enabling the master to send master initiated requests and data over a communication channel and receive client responses, client initiated requests, and data or other computer programming methods of software program/module association as known to those skilled in the art of data communications and/or software development) the created client 215 with the master server program 205.

State 3. The actions of State 2 are repeated to create and bind client 216 on the computing device 211 with the master server program 205.

State 4. The actions of State 2 are repeated to create and bind client 225 on the computing device 220 with the master server program 205.

State 5. The master server program 205 initializes the simulation (e.g., in response to determining that the trainer has selected an initialize control presented via a user interface of the master server program 205 presented on console/monitor 260), and downloads, over the network 250, to each client computing device's data store 212, 213, 222 executable code and resources to be used in the simulation. In States 1, 2, 3, or 4 (or in a separate state) the tracking cameras 310-340 are also initialized and calibrated (e.g., with respect to any marker tracking devices used in the simulation including, for example, a PPT eyes used for tracking head and body movements during the simulation). In addition, any unique infrared marker IDs (e.g., by each marker emitting a distinctive pattern) of the tracking devices are associated with trainer 150, trainee 155, assistant 160 and clients 215, 216, 225, respectively.

State 6. The simulation session begins (e.g., in response to detecting that the trainer 150 selected a user interface control of the master server program 205 presented in a display (e.g., a head mounted display or in the monitor 260)). In response to the control selection, the master server 200 initiates a simulation in each client 215, 216, 225 (e.g., via a sync call/command/instruction).

State 7. In response to the VR simulation launch, a display/scene in a Room is rendered (or caused to be rendered) in the head mounted display 170, 173, 175 of each user 150 (trainer), 153 (trainee), 155 (assistant) via the client software 215, 216, 225. In this example, the trainer's 150 viewpoint/display includes avatars (e.g., a virtual representation) of the trainee 153 and of the assistant 155. The trainee's 153 viewpoint/display includes avatars of the trainer 150 and of the assistant 155. The assistant's 155 viewpoint/display includes avatars of the trainer 150 and of the trainee 153.

State 8. The master server program 205 designates the trainee 153 as an enhanced tracking candidate (e.g., in response to determining the trainer 150 has selected a control presented via a user interface of the master server program 205 presented on console/monitor 260), causing at least in part a camera 100 (illustrated in FIG. 1 outside of the head mounted display but in this example embedded within the head mounted display 173 to enable the camera to record the eye/gaze of trainee 155) used for eye/gaze tracking associated with the trainee 153 to be paired (e.g., via a wireless Bluetooth® connection) with the client software program 216 and hosting computing device 211.

State 9. The master server software program 205 receives an alert/notification from the client software program 216 of the eye/gaze tracking camera 100 pairing and establishes a virtual data communication path between the eye/gaze tracking camera 100 and the master server 200 enabling the master server software program 205 to receive tracking camera 100 output. In this example embodiment, the master server software program 205 receives raw/unprocessed video output. Optionally, the video output is stored in the data store 202. In the following illustrative states, the eye/gaze tracking camera 100 video output continually received by the master server software program is not shown in the process flows of FIG. 5.

State 10. The master server software program 205 causes the client 215 to display an enhanced tracking dashboard 300 in a portion of the trainer's display 170 (e.g., a head mounted display). The dashboard displays the eye/gaze tracking camera 100 view of the trainee's 153 eyes. This enables the operator to confirm the camera 100 video output is being received. Optionally, the tracking camera 100 video output is mirrored to client computing device 211 and the master server computing device 220 in order to reduce and/or eliminate display latencies. The trainer 150 calibrates the eye/gaze tracking camera 100 and master server program 205 by verbally instructing the trainee 153 to direct their attention to the displayed ACME engine in the trainee's 153 head mounted display 173.

State 11. The master server software program 205 records the eye/gaze position of the trainee 153 (e.g., in response to detecting that the trainer 150 selected a user interface control (e.g., by a PPT wand control selection)) subsequent to the verbal instruction of State 10. The position is stored in computer memory and data store 202.

State 12. The master server software program 205 records (e.g., in response to determining the trainer 150 having selected a control presented via a user interface of the master server program 205 presented on console/monitor 260 (e.g., a pull down menu of items of items associated with the simulation)) that the trainer 150 is to be provided an alert monitor indicator 310 (e.g., a green indicator in a portion of the trainer's display 170 (e.g., head mounted display)) when the trainee's gaze is determined by the master server program 205 to be directed at the ACME engine (e.g., a specific object of the simulation). In this example, the alert monitor indicator 310 remains in a portion of the screen (e.g., dashboard display) for the duration of the period in which the master server program 205 determines the trainee's eye/gaze is directed towards the ACME engine. (In this example embodiment, the alert monitor indicator 310 may be continually displayed with certain status during the simulation including when the enhanced tracking display dashboard is minimized. Optionally, the alert monitor indicator 310 does not include a border as illustrated in FIG. 3.)

In this example embodiment of enhanced tracking, the computing system (e.g., the master server program 205 and computing device 200) determine the trainee's gaze is directed at an object of interest (e.g., the ACME engine) by using received eye position data from the eye/gaze tracking camera 100 (e.g., direction of gaze of the pupils of the participant in the X and Y coordinate space) in conjunction with received head/body position tracking data in 6 degrees of freedom as determined from received marker tracking cameras 310-340 video output. For example, if an object of interest is displayed in the center of the participant's display as determined by the participant's head/body position and the participant's eye/gaze position is similarly directed at the center of the participant's display, then the computing system may indicate the participant is gazing at the object of interest. In another example, if an object of interest is displayed in the far right of the participant's display as determined by the head/body position (e.g., the participant is looking away to the far left of the object) and the participant's eye/gaze position is directed at the center of the participant's display, then the computing system may indicate the participant is gazing away from and/or not at the object of interest. In another example embodiment of enhanced tracking, the computing system (e.g., the master server program 205 and computing device 200) may determine the participant's gaze is directed at an object of interest by using received eye position data from the eye/gaze tracking camera 100 (e.g., direction of gaze of the pupils of the participant in the X and Y coordinate space) and the known (e.g., known by the computing system) displayed position/coordinates of the object of interest on the trainee's head mounted display 170.

State 13. The master server software program 205 records (e.g., in response to determining the trainer 150 has selected a control presented via a user interface of the master server program 205 presented on console/monitor 260 (e.g., a pull down menu of items associated with the simulation)) that the trainer 150 is to be provided with an alert (e.g., a blue indicator in a portion of the trainer's display) when the master server determines the trainee's gaze is determined by the master server program 205 to be directed at the trainer (e.g., a participant of the simulation).

State 14. The master server software program 205 records (e.g., in response to determining the trainer 150 has selected a control presented via a user interface of the master server program 205 presented on console/monitor 260 (e.g., a pull down menu of items associated with the simulation)) that the trainer 150 is to be alerted (e.g., via an alerting tone) if certain real-time eye/gaze analytics executing on the master server 200 (or other computing server such as computing server 230) determine, based in part on the trainee's eye/gaze pattern, that the trainee 153 may be confused.

State 15. After the configuration and initialization steps, the trainer 150 starts the training session and begins by presenting introductory remarks. During these introductory remarks, the computing system (e.g., master server program 205 and computing device 200) determines from the X-Y coordinates of the trainee's eye/gaze from the tracking camera 100 and/or head position coordinates as determined in part from the tracking cameras 310-340 output, that the trainee's eye/gaze is directed at the trainer 150. Based at least in part on the gaze determination, the computing system causes the alert indicator 310 to display a blue alert. Optionally, the time of, and period of time in which, the trainee's gaze is directed at the trainer 150 is similarly logged as an enhanced tracking event to the data store 212, 213 and/or data store 202.

State 16. In the course of presenting introductory remarks the trainer 150 notices the trainee 153 appears to be directing their gaze towards her based on a visual observation of the head position of an Avatar corresponding to the trainee 153. The trainer 150 confirms the trainee 153 is gazing towards her by observing the blue alert indicator 310 displayed in the enhanced tracking dashboard display.

State 17. The trainer 150 continues the training session after introductory remarks by describing certain components of the ACME engine. During the ACME engine remarks, the computing system (e.g., master server program 205 and computing device 200) determines from the X-Y coordinates of the trainee's eye/gaze from the tracking camera 100 and/or head position coordinates as determined in part from the tracking cameras 310-340 output, that the trainee's eye/gaze is directed at the displayed ACME engine. Based at least in part on the gaze determination, the computing system causes the alert indicator 310 to display a green alert. Optionally, the time of, and period of time in which, the trainee's gaze is directed at the ACME engine is similarly logged as an enhanced tracking events to the data store 212, 213 and/or data store 202.

State 18. During the ACME engine remarks, the trainer 150 notices the trainee gaze appears to be directed towards the ACME engine by virtue of a visual observation of the head direction of the Avatar corresponding to the trainee 153. The trainer 150 confirms the trainee 153 is gazing towards the ACME engine based on an active green indicator displayed in the enhanced tracing dashboard display.

State 19. During an important step in the training session relating to the ACME engine repair, the master server 200 determines, for example via real-time software analytics corresponding at least in part to the eye/gaze pattern of the trainee 153, that the trainee 153 may be currently experiencing some confusion. Illustrative examples of eye/gaze analytic confusion may include, for examples: tracking eye/gaze activity directed to elements of the ACME engine which may not be relevant to the repair step, tracking eye/gaze directional pattern not expected based upon a comparison of historic eye/gaze activity for the given repair step(s), recorded eye movement rates higher than a threshold level, directional eye/gaze tracking directed between the trainer 150, ACME engine, and/or assistant 155 with a high frequency, etc.

State 20. In response to the determination of potential confusion, the master server program 205 generates an audio notification to the trainer 150 (e.g., a short duration audible tone) and, in this example, causes the display of the enhanced tracing dashboard (e.g., presented from a minimized state) in a portion of the trainer's display 170 (e.g., head mounted display) via computing device 210 and client 215. The dashboard displays a message/notice/alert that the trainee 153 may be currently experiencing confusion. The trainer 150 repeats the training step at a slower pace. Optionally, the time of the confusion alert is logged as one or more enhanced tracking events to the data store 212, 213, and/or data store 202 along with other information which may have preceded the alert including the training step, audio preceding the alert, eye/gaze position and activity, etc.

Thus, as described above, an example multi-user virtual reality simulation may be provided via a client/server architecture with enhanced tracking. Advantageously, the enhanced tracking informs an operator/designated user/observer of certain attributes and/or characteristics of a one or more participant regarding the simulation experience and/or certain aspects of the simulation. In addition, the simulation data may be collected over a series of simulations in order to create a data store of participant activities, attributes, and/or characteristics which may be data analyzed in real-time or subsequent to a simulation to determine additional aspects regarding a participant, a participant's emotional state, a participant's state-of-mind, and/or their simulation experience.

Collaborative Virtual Reality

An aspect of this disclosure relates to systems and methods for enabling a multi-user virtual reality and/or augmented reality experience, such as, by way of example, those described in U.S. patent application Ser. No. 14/971,720, filed on Dec. 16, 2015, the contents of which are incorporated herein by reference in their entirety.

SUMMARY

An aspect of the disclosure relates to an example cluster computing system configured to interface and work in conjunction with a tracking system, to provide a high quality multi-user, virtual and/or augmented reality experience.

DETAILED DESCRIPTION

An aspect of this disclosure relates generally to devices and methods for enabling a multi-user virtual or augmented reality experience, and in particular, to a cluster computing system which works in conjunction with a motion capture tracking element.

An aspect of the disclosure relates to an example cluster computing system configured to interface and work in conjunction with a tracking system, to provide a high quality multi-user, virtual and/or augmented reality experience, with significantly reduced human-perceptible latencies. Optionally, the example cluster computing system further enables content providers to create single-user virtual and/or augmented reality experiences, where the cluster computing system extends the single-user virtual and/or augmented reality experience via a cooperative distributed and centralized computing architecture to a multi-user virtual and/or augmented reality experience (e.g., by having a master server generating and enabling the of rendering the different viewpoints for each client in a multi-user VR simulation the clients. Optionally, the cluster computing system further manages via abstraction the intricacies of interworking in a multi-user environment with various hardware components from various hardware manufacturers.

Advantageously, virtual reality and/or simulated environments as described herein can be used in a number of application areas including but not limited to: real estate, architecture, product design, human behavior analysis, user training, gaming, product and marketing evaluation, design verification, data visualization, teleoperation, and telepresence or any physical environment that for reasons of, for example, cost or potential harm to a user can be simulated rather than directly experienced. In addition, virtual reality as described herein may also be used in augmented reality environments, including for example, in an automotive augmented reality environment.

Conventionally, VR and AR environments have been oriented to a single-user environment. Recently, multi-user VR environments/worlds have been created which enable users to collaborate and share a virtual world experience. A number of technical challenges arise in the implementation of a multi-user VR environments. Generally, users are on separate computing platforms connected by a Local-Area-Network or in some cases a Wide-Area-Network (e.g., if the VR participants are geographical separated) and these networks are subject to inherent communication delays, which may result in an unrealistic simulation of views and actions. Another key challenge of multi-user VR systems is the timely synchronization and rendering of a VR participant's action from the viewpoint (e.g., correct perspective) of each participant in the simulation. Further, each VR participant may be configured with different hardware including but not limited to different: computing platforms, displays, trackers, and input devices. Thus, there is a need to enable a dynamic and real-time (or near real-time) immersive, multi-user virtual reality environment in which user actions and scenes are synchronized across varying hardware devices with minimal programmatic and configuration effort on the part of virtual reality content creators. Advantageously, embodiments of the virtual/augmented reality cluster system achieve some or all these objectives via a client-server architecture which enables certain client contextual processing and certain centralized server processing and synchronization control in order to provide a multi-user virtual user experience which seems lifelike to all participants of the simulation.

Aspects of the disclosure relates to an example cluster computing system configured to interface and work in conjunction with a tracking system, to provide a high quality multi-user, lifelike, virtual and/or augmented reality experience, with significantly reduced human-perceptible latencies. Thus, aspects of the disclosure herein relate to a multi-user VR/AR environment that may be configured to enable both timely user actions in a display in the first person (that is, the system's rendering of a user action in the viewpoint of the user, optionally, on a computing device local and/or associated with a user) and the view of a user's action by other participants of the simulation (optionally, rendered on a computing device local and/or associated with a user). Aspects of the disclosure further relate to systems and processes that provide timely synchronization (for example, via a master computing device) and an enabled rendering of a VR participant's action from the viewpoint (e.g., the correct perspective) of each participant in the simulation. Further, aspects of the disclosure relate to systems and processes that provide a dynamic and real-time (or near real-time) immersive, multi-user virtual reality environment in which user actions and scenes are synchronized across varying hardware devices, optionally with minimal programmatic and configuration effort on the part of virtual reality content creators/operators/participants.

A given embodiment may include some or all of the features, functionality, systems and methods described herein.

An example embodiment provides a cluster system, comprising: a master computing device; a first computing device configured as a first client computing device, the first client computing device associated with a first user; a second computing device configured as a second client computing device, the second client computing device associated with a second user; a plurality of motion tracking cameras, wherein the plurality of motion tracking cameras are configured to reside in a physical space coincident with the first user, the plurality of motion tracking cameras configured to detect infrared light and to communicate position data derived from detected infrared light to the first computing device and to the master computing device; a first marker, attachable to a head mounted display associated with the first user, the first marker configured to emit a first repetitive pattern of infrared light pulses, the first marker associated with one or more privileged operations that are to be performed locally by the first computing device; a second marker, attachable to the head mounted display associated with the first user, the second marker configured to emit a second repetitive pattern of infrared light pulses distinct from the first repetitive pattern of infrared light pulses, the second marker associated with one or more privileged operations that are to be performed locally by the first computing device; a third marker, wearable or holdable by the first user, the third marker configured to emit a third repetitive pattern of infrared light pulses distinct from the first repetitive pattern of infrared light pulses and distinct from the second repetitive pattern of infrared light pulses, wherein the third marker is associated with one or more non-privileged operations that are to be performed remotely by the master computing device; non-transitory media that stores instructions readable by the cluster system, that when executed by the cluster system, cause the cluster system to: access configuration information comprising information indicating what types of operations are privileged and what types of operations are non-privileged; receive, at the first computing device from one or more of the plurality of motion tracking cameras, position data corresponding to the first marker and position data corresponding to the second marker; at least partly in response to the receipt by the first computing device of the position data corresponding to the first marker and the position data corresponding to the second marker and on the accessed configuration information, determine that a privileged operation is to be performed by the first computing device and not by the master computing device, the privileged operation enabling an orientation of a first scene of a simulation to be rendered in the head mounted display associated with the first user in synchronization with movement of the head mounted display in at least five degrees of freedom; transmit, from the first computing device to the master computing device, a position of the first user in the physical space and provide a first instruction by the master computing device enabling an image corresponding to the first user to be rendered at a first virtual position in a display device associated with the second user, wherein the first virtual position is based at least in part on the position of the first user in the physical space and on a viewpoint of the second user; receive, at the master computing device from one or more of the plurality of motion tracking cameras, position data corresponding to the third marker; and at least partly in response to receipt of the position data corresponding to the third marker and on the accessed configuration information, determine that a non-privileged operation is to be performed by the master computing device and not by the first computing device, wherein the non-privileged operation comprises enabling: synchronized movement of a virtual representation of the third marker from a viewpoint of the first user corresponding to received position changes associated with the third marker to be rendered in the head mounted display associated with the first user and synchronized movement of a virtual representation of the third marker from a viewpoint of the second user corresponding to received position changes associated with the third marker to be rendered in the head mounted display associated with the second user; and, optionally wherein the plurality of motion tracking cameras are configured to detect infrared light and to communicate position data derived from detected infrared light to the second computing device; and, optionally wherein the third marker is attached to a limb of the first user; and, optionally wherein the third marker is attached to or included as a component of a handheld tracking device; and, optionally wherein the first repetitive pattern of infrared light pulses comprise light intensity state transitions; and, optionally wherein the plurality of motion tracking cameras are configured to derive the identity of a marker from a detected repetitive pattern of infrared light pulses; and, optionally wherein the cluster system is configured to enable, via a user interface of the master computing device, a third user to indicate what types of operations are privileged and what types of operations are non-privileged; and, optionally wherein the virtual marker representation of the third marker comprises a virtual representation of a glove.

An example embodiment provides a cluster system, comprising: a master computing device; a plurality of motion tracking cameras, wherein the plurality of motion tracking cameras configured to reside in a physical space coincident with the first user, the plurality of motion tracking cameras configured to detect infrared light and to communicate position data derived from detected infrared light to the master computing device; a marker, wearable or holdable by the first user, configured to emit a repetitive pattern of infrared light pulses, wherein the marker is associated with one or more non-privileged operations that are to be performed remotely by the master computing device; non-transitory media storing instructions readable by the cluster system, that when executed by the cluster system, cause the cluster system to: access configuration information comprising information indicating what types of operations are privileged and what types of operations are non-privileged; receive at the master computing device, a position of the first user in the physical space and provide a first instruction by the master computing device enabling an image corresponding to the first user to be rendered at a first virtual position in a display device associated with a second user, wherein the first virtual position is based at least in part on the position of the first user in the physical space and on a viewpoint of the second user; receive, at the master computing device, from one or more of the plurality of motion tracking cameras, position data corresponding to the marker; and at least partly in response to the receipt of the position of the marker and on the accessed configuration information, determine that a non-privileged operation is to be performed by the master computing device and not by another computing device associated with the cluster system, wherein the non-privileged operation comprises enabling: synchronized movement of a virtual representation of the marker from a viewpoint of the first user corresponding to received position changes associated with the marker to be rendered in the head mounted display associated with the first user and synchronized movement of the virtual representation of the marker from a viewpoint of the second user corresponding to received position changes associated with the third marker to be rendered in the head mounted display associated with the second user; and, optionally wherein the marker is configured to be attached to a limb of the first user; and, optionally wherein the marker is attached to or included as a component of a handheld tracking device; and, optionally wherein the first repetitive pattern of infrared light pulses comprise light intensity state transitions; and, optionally wherein the plurality of motion tracking cameras are configured to derive the identity of a marker from a detected repetitive pattern of infrared light pulses; and, optionally wherein the cluster system is configured to enable, via a third user interface of the master computing device, a user to indicate what types of operations are privileged and what types of operations are non-privileged.

An example embodiment provides a cluster system, comprising: a first computing device configured as a first client computing device, the first client computing device associated with a first user; a second computing device configured as a second client computing device, the second client computing device associated with a second user; a plurality of motion tracking cameras, wherein the plurality of motion tracking cameras are configured to reside in a physical space coincident with the first user, the plurality of motion tracking cameras configured to detect infrared light and to communicate position data derived from detected infrared light to the first computing device; a first marker, attachable to a head mounted display associated with the first user, the first marker configured to emit a first repetitive pattern of infrared light pulses, the first marker associated with one or more privileged operations that are to be performed locally by the first computing device; a second marker, attachable to the head mounted display associated with the first user, the second marker configured to emit a second repetitive pattern of infrared light pulses distinct from the first repetitive pattern of infrared light pulses, the second marker associated with one or more privileged operations that are to be performed locally by the first computing device; a third marker, wearable or holdable by the first user, the third marker configured to emit a third repetitive pattern of infrared light pulses distinct from the first repetitive pattern of infrared light pulses and distinct from the second repetitive pattern of infrared light pulses, wherein the third marker is associated with one or more non-privileged operations that are to be performed remotely by a computing device other than the first computing device; non-transitory media that stores instructions readable by the cluster system, that when executed by the cluster system, cause the cluster system to: access configuration information comprising information indicating what types of operations are privileged and what types of operations are non-privileged; receive, at the first computing device from one or more of the plurality of motion tracking cameras, position data corresponding to the first marker and position data corresponding to the second marker; at least partly in response to the receipt by the first computing device of the position data corresponding to the first marker and the position data corresponding to the second marker and on the accessed configuration information, determine that a privileged operation is to be performed locally by the first computing device and not by a computing device other than the first computing device, the privileged operation enabling an orientation of a first scene of a simulation to be rendered in the head mounted display associated with the first user in synchronization with movement of the head mounted display in at least five degrees of freedom; transmit, from the first computing device to a master computing device, a position of the first user in the physical space; receive, at the second computing device, a first instruction enabling: an image corresponding to the first user to be rendered at a first virtual position in a display device associated with the second user, wherein first virtual position is based at least in part on the position of the first user in the physical space and on a viewpoint of the second user; receive, at the first computing device, a first non-privileged instruction enabling: synchronized movement of a virtual representation of the third marker from a viewpoint of the first user corresponding to received position changes associated with the third marker to be rendered in the head mounted display associated with the first user; and receive, at the second computing device, a second non-privileged instruction enabling: synchronized movement of a virtual representation of the third marker from a viewpoint of the second user corresponding to received position changes associated with the third marker to be rendered in the head mounted display associated with the second user; and, optionally wherein the plurality of motion tracking cameras are configured to detect infrared light and to communicate position data derived from detected infrared light from detected infrared light to the second computing device; and, optionally wherein the plurality of motion tracking cameras are configured to detect infrared light and to communicate position data derived from detected infrared light to a computing device other than the first computing device or the second computing device; and, optionally wherein the third marker is configured to be attached to a limb of the first user; and, optionally wherein the third marker is attached to or included as a component of a handheld tracking device; and, optionally wherein the at least five degrees of freedom comprise X-axis, Y-axis, Z-axis, yaw, and roll; and, optionally wherein the first repetitive pattern of infrared light pulses comprise light intensity state transitions; and, optionally wherein the plurality of motion tracking cameras are configured to derive the identity of a marker from a detected repetitive pattern of infrared light pulses.

Example features will now be described with reference to the figures.

Figure 7:
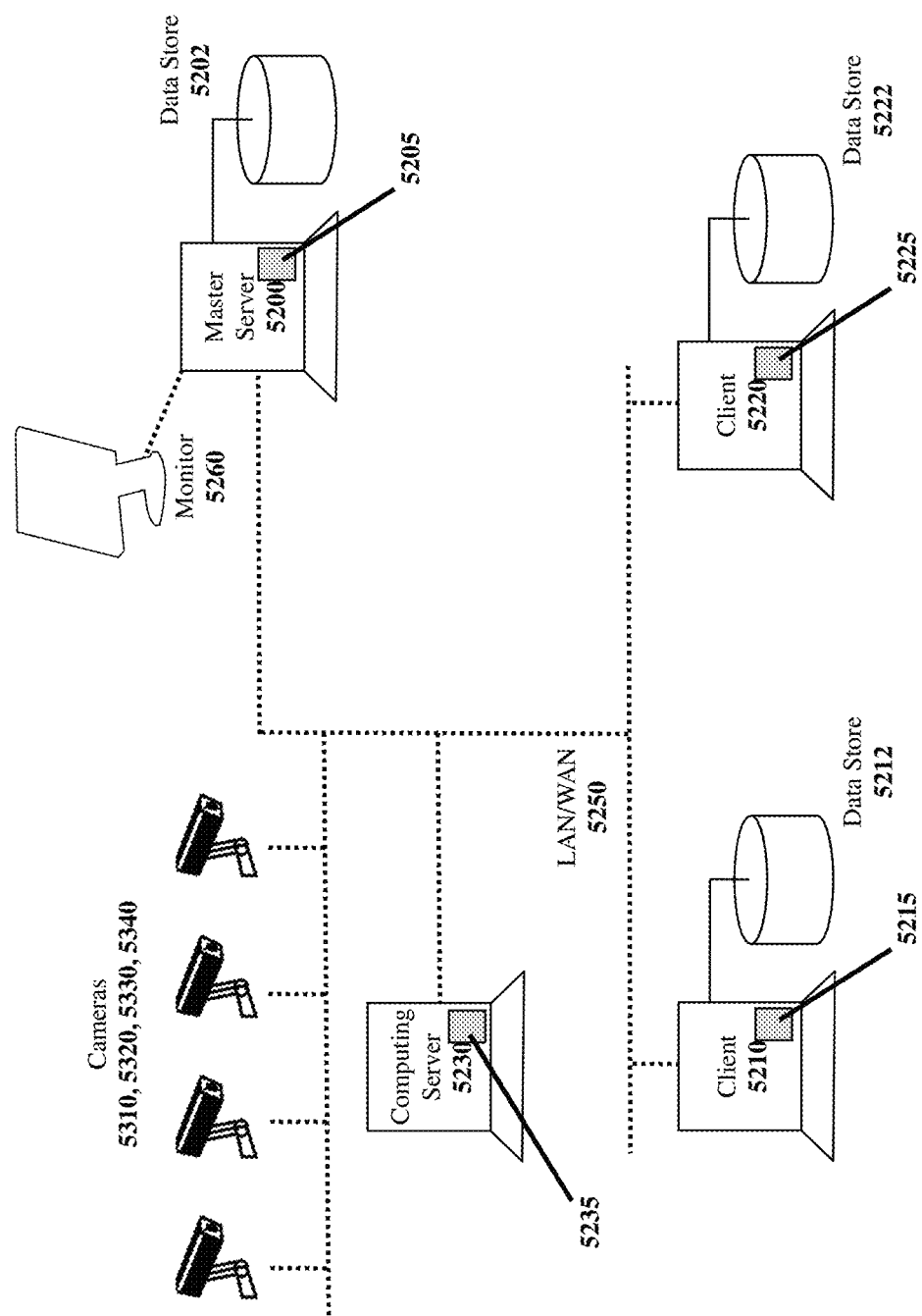
FIG. 7 illustrates an example operating environment of a clustered system with a master server and multiple clients.

FIG. 7 illustrates an example operating environment of a clustered system with a master server and multiple clients. As described herein, the illustrated system architecture can be used to facilitate a virtual and/or augmented reality experience, and in particular, a multi-user virtual and/or augmented reality experience. The system may be configured to perform some or all of the following: image capture and tracking functions, video/image processing, marker identification (e.g., LED marker identification), user/object position calculations, action synchronization, and/or dynamic rendering of virtual worlds in an optimized (e.g., in substantially real-time and/or minimal rendering delays) manner to create a lifelike experience. For clarity, the description herein may refer to virtual reality, which is intended to encompass both virtual reality and augmented reality, unless the context indicates otherwise.

As illustrated in FIG. 7, a master server computing device 5200 (e.g., a general purpose computer, a tablet computer, a cloud-based server, a smart phone, a graphics processing unit, etc.) is coupled to a plurality of client computing devices 5210, 5220 over a data network 5250 (e.g., a local area network, a wide-area network, the Internet, a private network, a public network, etc.). Optionally, the master server 5200 may be directly connected to a console/monitor 5260 (or over the data network 5250 to a console/monitor 5260) which displays a user interface via master server software 5200 for a user/participant or operator to provision, designate, and/or configure the master server 5200 (e.g., download and/or upgrade software, provision data communication interfaces, configure accounts, administer security, edit files, etc.). Optionally, the master server 5200 also provides a computing platform for compiling and/or executing certain programs and/or programmatic scripts (e.g., simulations), receiving and sending certain communications, performing video/image processing tasks, performing math computations, displaying/rendering certain images (e.g., rendering virtual worlds), providing client synchronization, hosting a client application, etc.

Figure 11:
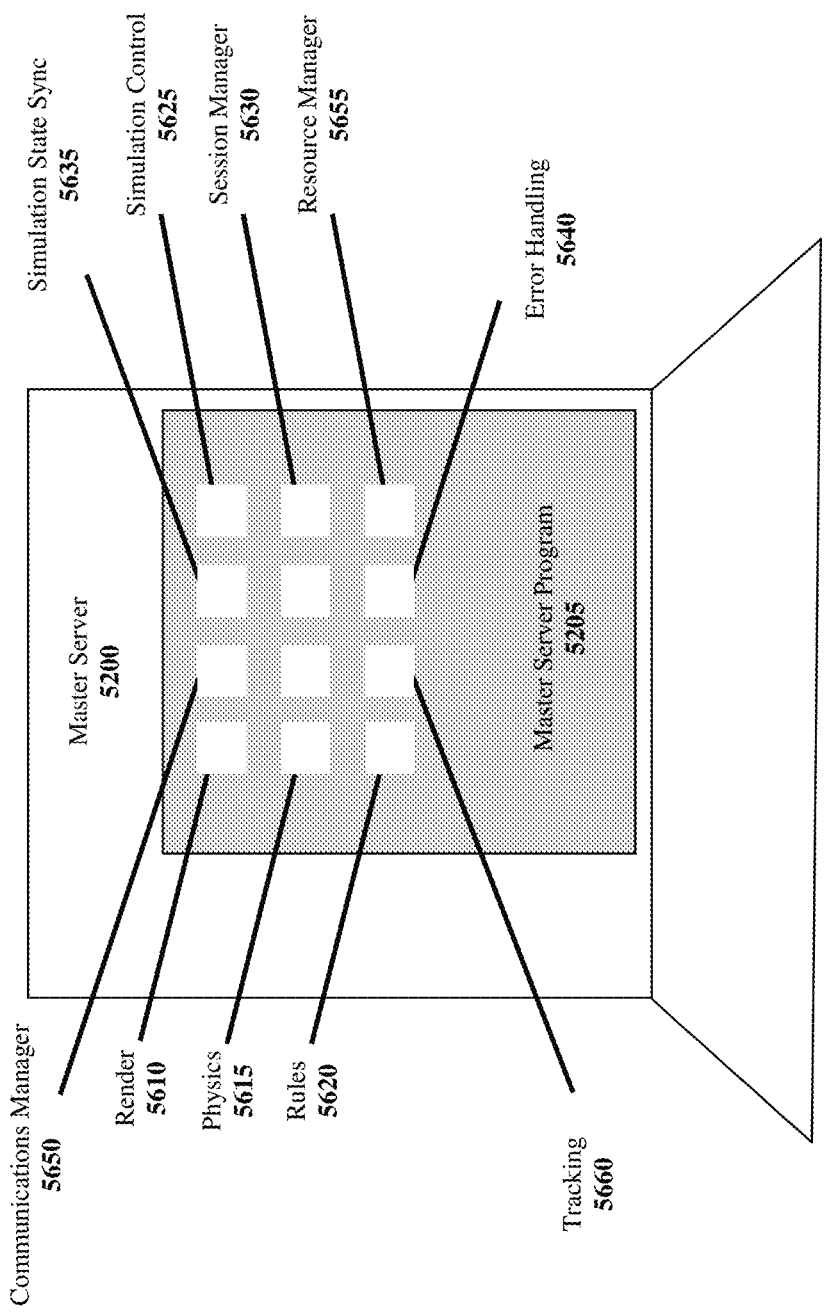
FIG. 11 illustrates an example configuration of software modules of a clustered system.

A given computing device 5200, 5210, and 5220 may be further configured with a data store 5202, 5212, and 5222, respectively, enabling the server to store in memory data associated with the VR session, simulations, models, objects, images, certain parameters, executable scripts/code, local event logs, error logs, etc. Thus, for example, the master server computing device 5200 may host a master server software program 5205, as illustrated in FIG. 11, comprising a single software program or a plurality of software programs or software modules including, for example, a render engine 5610 configured to render and/or enable the rendering of VR scenes, a physics engine 5615 (e.g., that provides a simulation of physical systems, such as rigid and soft body dynamics, collision detection, and fluid dynamics, and that provides an interface that hides the low-level details of the physics needed in virtual reality applications to enable application/game developers to focus on the higher-level functionalities of the application), a rules engine 5620, a simulation control engine 5625 (that coordinates simulation execution), a session manager 5630, a simulation state synchronizer engine 5635 (that, for example, synchronizes associated client viewpoints) and/or an error handling 5640, a client-server communications manager 5650 (that, for example, manages client server communications including over a data communication network (e.g., a low latency data communication network)), resource manager 5655 (that, for example, manages resources, including shared resources (e.g., simulation objects, scenes, etc.), virtual reality tracking and marker identification software 5660 (e.g., the Vizard VR™ toolkit and PPT Studio software from WorldViz LLC of Santa Barbara) by way of example.

The master server computing device 5200 may include cluster nodes (e.g., companion computing devices) that handle gameplay/simulation logic, tracking software, and one or more additional servers that process communications from client computing device. The master server computing device 5200 may include a login server, including a client/user identity and access authentication engine, that manages login sessions with client computing devices, validates client computing devices (e.g., by checking password and device identifiers), and if the client computing devices are validated, enables the devices to access the master computing device 5200 and/or cluster nodes. The data store 5202 associated with the master server computing device 5200 may store user account information such as password information, user/device identifiers, status of game/simulation play which may be stored upon a user suspending a game/simulation or other virtual/augmented reality activity and which may be accessed and utilized when the activity is restarted to provide a continuous experience, user usage information (e.g., time and duration of virtual/augmented reality activity), other users the user may be linked to (e.g., other users the user has interacted with when engaging in virtual/augmented reality activities), etc.

The master server computing device 5200 may further comprise multiple servers distributed over a broad geographic area to reduce latency with respect to interactions with client server devices, wherein a given server (or servers) may serve client computing devices in its geographical area. The various master server computing devices may include network interfaces and may be interconnected via high speed data networks to further reduce latencies. The cluster nodes may include dedicated high speed graphic processors to process virtual/augmented reality graphic tasks. The master server computing device 5200 may include one or more administrator terminals.

Similarly, as illustrated in FIG. 7, one or more client computing devices 5210, 5220 (e.g., a general purpose computer, a tablet computer, a cloud-based server, a smart phone, a graphics processing unit, a game console, etc.) are coupled to the master server 5200 over a data network 5250 (e.g., a local area network, a wide-area network, the Internet, a private network, a public network, etc.). Optionally, each client device 5210, 5220 can connect with other client devices via the data network 5250 (e.g., in a peer-to-peer manner). Optionally, a given client computing device 5210, 5220 may be connected directly or over a network to a console which displays a user interface via client software 5215, 5225 to a user/participant or operator and which can be used to provision, designate, and configure the given client computing device 5210, 5200 (e.g., download and/or upgrade software, provision data communication interfaces, configure accounts, administer security, edit files, etc.). Optionally, a given client computing device 5210, 5200 provides a computing platform for compiling and/or executing certain programs and/or programmatic scripts, receiving and sending certain communications, performing video/image processing tasks, identifying distinct markers from recorded infrared light, calculating marker positions in space, performing math computations, enabling the displaying/rendering of certain images (e.g., rendering virtual worlds or augmented images), etc. For example, a given client computing device 5210, 5200 may include a 3D rendering engine, a 3D sound engine, a virtual reality execution engine, an avatar engine, a simulation state synchronizer engine, a session manager engine and/or a network interface.

Figure 8:
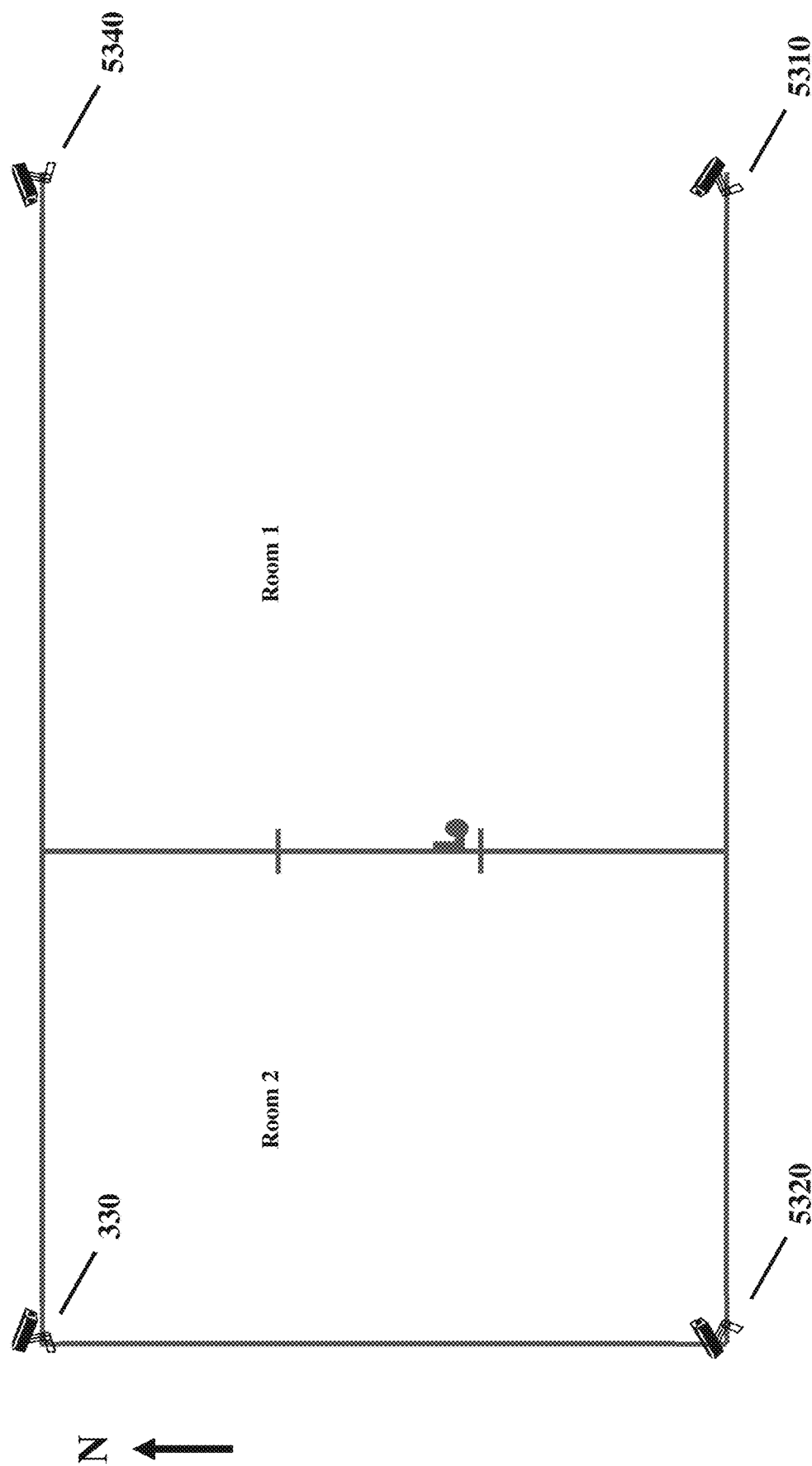
FIG. 8 illustrates an example operating environment of a precision positioning tracking motion capture system of a clustered system.

FIG. 7 also illustrates an optional element of the cluster system, a plurality of motion capture cameras 5310, 5320, 5330, and 5340. Motion tracking is a crucial component of most virtual reality systems. By tracking the position and orientation of the user, the cluster system can control the simulation's viewpoint such that the user can navigate through the virtual world just as naturally as they would navigate through the physical world. In addition, tracked movements of an individual in the physical world may be mapped onto certain movements of an avatar in the virtual world. Optionally, these motion capture cameras 5310-5340 are connected physically via cabling or wirelessly to the data network 5250 and/or directly to the master server 5200, client 5210, and/or client 5200. Optionally, the video output and/or detected marker identities and marker positions are streamed from the cameras 5310-5340 to the master server computing device 5200 and/or the client computing devices 5210,5200 as further described herein below. Optionally, a plurality of motion capture cameras are positioned above and/or reside within a staging area in which VR session users participate in a simulation. FIG. 8 illustrates an example camera positioning in a simulation. By way of example, multiple (e.g., 2, 4, 6, 8, 9, 10, 11, 12) tracking cameras (e.g., precision position tracking (PPT) cameras, such as the PPT X™ precision motion tracking cameras from WorldViz LLC of Santa Barbara) may stream live video to a master server computing device 5200, or a client computing device 5210, 5200, which are provisioned with virtual reality tracking software (e.g., the Vizard VR™ toolkit or PPT Studio from WorldViz LLC of Santa Barbara; dll for Windows; C source library for Linux) capable of image processing live video images in substantially real-time.

Optionally in addition or instead, a dedicated computing device 5230 (e.g., a laptop, PC, smartphone, server, etc.) may be optionally provisioned with the virtual reality tracking software (e.g., Vizard VR and/or PPT Studio from WorldViz LLC of Santa Barbara) capable of processing the received live camera output stream in substantially real-time. Optionally, the motion capture cameras record image data including emitted infrared light in a tracking area.

Optionally, the recorded image data is provided (e.g., streamed) to the computing device 5230 or other computing device via a data network (e.g., 5250). Optionally, the computing device receiving the image data has certain software (e.g., PPT Studio software from WorldViz LLC of Santa Barbara) capable of determining from the image data, a position and identity for each infrared marker in the field of view/tracking area of the motion capture cameras.

Optionally, the calculated/determined/derived marker position and identity information (e.g., tracking data) may be used (e.g., by the computing device) to render a change in a scene or orientation of a scene as viewed by a user (e.g., in a head mounted display or other display). For example, infrared markers may comprise light emitting devices (LED) which may be configured to be attached to or mounted on an item worn by the user (e.g., headgear). Optionally, a marker device can be attached to articles of clothing and/or strapped or otherwise attached to or physically associated with a user. Optionally, an infrared marker tracking device includes two or more light emitting components attached to one or more items worn by the user and the system tracks the light source in three dimensions to determine the user's movements in time. Optionally, head movement tracking data is collected in substantially real-time and can be used, for example, in a virtual reality display in which some or all of the displayed images are modified coincident with the tracked movement of the user. For example, if the tracking system detects sideways movement of the user, the perspective and/or the displayed image viewed by the user may be modified to simulate the sideways movement of the user (e.g., displaying an image behind a tree which was obstructing the user's view prior to the user's sideways movement).

For example, the virtual reality tracking software 5660 may incorporate a visual tool for configuring devices that the VR tracking software supports, including displays (e.g., head-mounted displays, multi-screen projection walls, consumer 3D monitors), trackers (head trackers, gloves, full body motion capture), and input devices (e.g., wands, steering wheels, gamepads, joysticks, etc.). The VR tracking software may enable editing of transform nodes (e.g., position, rotation, scale), clone/copy nodes, rename nodes, delete nodes, insert new group/transform nodes, and add/remove/modify descriptors. The VR tracking software may enable the layout of a virtual scene by combining and arranging multiple independent 3D models. The VR tracking software may enable a given virtual reality scene or objects to react to a user's natural body motions. Thus, for example, the VR tracking software may enable a user to interact with head, hands, and feet with virtual objects in a manner similar to real objects to provide a convincing sensation of telepresence. The VR tracking software optionally provides full body motion capture technology that delivers full human presence for both first person point of view and third person points of view experiences. The VR tracking software optionally enables the integration of live full feature avatars.

Other optional features of the PPT X cameras of the clustered system may include some or all of the following: charge-couple device camera sensors; three degrees-of-freedom positioning; six degrees-of-freedom (X, Y, Z, yaw, pitch, roll) positioning with an optional sensor; approximately 5 meter, 15 meter, 30 meter camera range and a recommended tracking space of approximately 10 meters by 10 meters by 10 meters, or other tracking space; multiple (e.g., 2, 4, 6, 8, 9, 10, 11) independent three degrees-of-freedom tracking targets (where, for a marker to be tracked, preferably the marker is visible by two or more cameras); tracking precision of approximately less than 0.5, 1, 2, or 5 millimeters over a 3 meter by 3 meter by 3 meter volume; optical sensor precision may be about 1:10,000, 1:20,000, 1:30,000 arc at 75 percent; tracking accuracy of approximately less than a 0.1, 0.5, or 1 centimeter over a 3 meter by 3 meter by 3 meter volume; a field of view of 60, 68, 75, or 80 degrees horizontal (standard) and 80, 88, 95 degrees horizontal (wide) for each camera (and not, for example, the resulting trackable space of the system of cameras); less than 30 seconds, one minute, or two minutes calibration using a digital calibration rig; a 30 HZ, 60 Hz, or 120 Hz update rate; a centralized computing device for image processing; a maximum cable length to cameras of approximately 15 meter, 30 meters 50, meters, or 75 meters; analog camera interface; minimum latency of 10, 18, or 30 milliseconds; interface options (e.g., RS-232, USB, Bluetooth, WiFi, etc.), 115.2 kilobits per second, streamed or polled and Ethernet; and, ambient conditions utilizing indoor fluorescent or other lighting; camera size of 160 by 70 by 60 millimeters and weighting 500 grams. It is understood that dimensions, ranges, and components, other than those recited above, may be used.

Optionally, high performance precision position tracking (PPT) cameras (e.g., 1-32 high performance Precision Position Tracking cameras, such as the PPT E™ precision motion tracking cameras from WorldViz LLC of Santa Barbara) configured to record image data, detect infrared light, and determine the identity and position of detected infrared markers and output stream two dimensional centroid coordinates of the detected infrared markers in the camera field of view (e.g., as similarly described above for the PPT X but via onboard camera image/video processing in the case of PPT E), among other features, to the master server computing device 5200 and/or the client computing device 5210, 5200. Optionally, the marker position data (e.g., tracking data) may be used (e.g., by the computing device) to render a change in a scene or orientation of a scene as viewed by a user (e.g., in a head mounted display or other visible display). Other features of the PPT cameras of the clustered system may include some or all of the following: color or black and white complementary metal-oxide-semiconductor camera sensors; three degrees-of-freedom positioning; six degrees-of-freedom (X, Y, Z, yaw, pitch, roll) positioning with an optional sensor; approximately 5, 10, or 20 meter camera range or other working camera range, and a recommended tracking space of approximately 20 meters by 20 meters by 10 meters, or other tracking space (where, for a marker to be tracked, preferably the marker is visible by two or more cameras). Overall tracking space dimensions may be determined by the camera range, camera layout, and background lighting. Other optional features may include 1-32 independent three degrees-of-freedom tracking targets; tracking precision of approximately less than one-quarter of a millimeter over a 3 meter by 3 meter by 3 meter volume; optical sensor precision is 1:20,000 arc at 75 percent; tracking accuracy of approximately less than a quarter of a centimeter over a 3 meter by 3 meter by 3 meter volume; a field of view for a given camera of 79 degrees horizontal (standard) and 98 degrees horizontal (wide) for each camera (and not, for example, the resulting trackable space of the system of cameras); less than one minute calibration using a digital calibration rig; 180 Hz update rate; centralized computing device for image processing; maximum cable length to cameras of approximately 200 meters; analog camera interface; minimum latency of approximately 20 milliseconds; interface options include Ethernet, using VRPN (Virtual-Reality Peripheral Network); compatibility with certain ambient conditions (e.g., indoor fluorescent lighting); and camera size of 45 by 32 by 92 millimeters and weighting 145 grams. It is understood that dimensions, ranges, and components other than those recited above, may be used, such as those discussed with respect to other embodiments.

As previously described herein, the motion tracking cameras 5310-5340 record emitted infrared light pulses (e.g., emitted infrared light pulses) from tracking emitter devices associated with a VR participant. An example tracking device which emits trackable infrared light signatures is a wireless Precision Position Tracking (PPT) device, PPT Eyes™, from WorldViz LLC of Santa Barbara. The PPT Eyes is a motion tracker mountable to 3D glasses or VR head mounted displays which provides wide-area tracking and can be integrated with or attached to display headgear enabling the tracking of a user's head and/or body movements when combined with virtual reality tracking software. The tracking software, which optionally executes on board the camera 5310-5340, on the master server 5200, a stand-alone computing device/server 5230, and/or client computing device 5210, 5200, is capable of identifying via the streaming camera video the one or more markers of the PPT devices.

Other features of a head mountable wireless PPT device may include some or all of the following features: a power button on top (or elsewhere) for easy user access; a housing imprinted with LED identifiers (e.g., LED1:1 and LED2:R) for clarity with signal identifier codes; a rechargeable (e.g., lithium ion) battery with an optional endurance of 4, 6, or 8 hours (with low intensity setting) with a range of more than 20 meters (with high intensity setting) without impacting performance; optionally factory or self-mounted onto commercially available passive and active 3D glasses; automatic "go-to-sleep" mode if not moved for a first period of time (e.g., 30 seconds), and turn off after a second period of times (e.g., 10 minutes) to save on battery power; user switchable between USB charge mode and USB power mode; easily reprogrammable device settings (sleep mode and turn-off timer periods, LED Identifiers, LED light intensity) via a simple application (or via software toolkit from WorldViz LLC of Santa Barbara) wherein the device is connected to a user's computer via a wired or wireless interface (e.g., a micro USB port); compatible with a plurality of protocols (e.g., TrackD, VRPN, WorldViz PPT Studio™, etc.); six degrees-of-freedom (X, Y, Z, yaw, pitch, roll) enabling the full determination of left/right eye locations needed for stereoscopic viewing; angular range of a full 360 degrees—all axis; tracking precision of approximately less than a quarter of a millimeter over a 3 meter by 3 meter by 3 meter volume with a rotation precision of 0.09 degrees; position accuracy of approximately less than a quarter of a millimeter over a 3 meter by 3 meter by 3 meter volume with a rotation accuracy of one degree RMS yaw, one quarter of a degree RMS roll; update rate of 180 Hz); latency of no more than 20 milliseconds; light weight 30 grams (with two infrared red diffusion balls); device size of 203 by 14 by 32 millimeters; active LED mode (PPT Marker IDs). It is understood that dimensions, ranges, and components, other than those recited above, may be used, such as those discussed with respect to other embodiments.

Optionally, the motion tracking cameras record emitted infrared light pulses from tracking devices held by a user. An example handheld tracking device which emits trackable infrared light signatures may be a wireless Precision Position Tracking (PPT) Wand™ from WorldViz LLC of Santa Barbara. The PPT Wand is a wireless, battery powered wand. The wand provides interaction and navigation in immersive virtual reality systems and may include a joystick/pad and trigger enabling hand tracking and hand grabbing and/or moving of virtual objects. Other optional features of a handheld wireless tracking device may include some or all of the following: a rechargeable (e.g., lithium ion) battery endurance of 8 hours with a range of more than 20 meters without impacting performance; an ergonomic one-handed design, vibrant button touch, and a multitude of input modes; automatic "go-to-sleep" mode if not moved for one minute, and turn off after 10 minutes to save on battery power; user switchable between USB charge mode and USB power mode; easily reprogrammable wand settings (sleep mode and turn-off timer periods, LED Identifiers, LED light intensity) via a simple application (or via software toolkit from WorldViz LLC of Santa Barbara) wherein the wand is connected to a user's computer (e.g., wirelessly, via a micro USB port, or via other interface); compatible with a plurality of protocols including TrackD, VRPN, and WorldViz native PPT protocol; six degrees-of-freedom (X, Y, Z, yaw, pitch, roll); angular range of a full 360 degrees—all axis; tracking precision of approximately less than a quarter of a millimeter over a 3 meter by 3 meter by 3 meter volume with a rotation precision of 0.03 degrees; position accuracy of approximately less than a quarter of a millimeter over a 3 meter by 3 meter by 3 meter volume with a rotation accuracy of one degree RMS yaw, one quarter of a degree RMS in pitch and roll; update rate of 180 Hz with PPT E series); latency of 20 milliseconds with PPT E series; light weight 196 grams; wand size of 239 by 65 by 110 millimeters; passive and active LED mode (PPT Marker IDs). It is understood that dimensions, ranges, and components, other than those recited above, may be used, such as those discussed with respect to other embodiments.

Other optional motion tracking features which can be employed in the clustered system include but are not limited to: inertial-based motion tracking, magnetic-based motion tracking, optical motion tracking, motion capture suits, and/or other motion tracking systems that may be utilized in virtual reality applications.

In the example clustered system, certain input devices may be provided for a user to manipulate (e.g., by one or more of the following: grasping, placing an object, finger flexion, abduction between fingers, thumb crossover, palm arch, wrist flexion, wrist abduction, etc.) the environment during a virtual reality session. For example, the input device may include one or more of the following examples: gamepads, joysticks, mouse, keyboard, haptic glove, wand, and/or other input devices used to manipulate an environment that may be utilized in a virtual reality application.

In the example clustered system, certain displays may be employed to present a virtual reality experience to a user including but not limited to: stereophonic displays (e.g., Oculus), a Cave Automatic Virtual Reality (CAVE) 3-dimension projector system with single display wall, a 2-dimension monitor, a 3-dimension monitor, and/or other display devices that may be utilized in a virtual reality application. Optionally, the cluster system integrates motion tracking to enable certain displays, including 2-dimensional displays, to render the worlds appropriately so that users feel as though they're looking beyond the wall into the virtual world (e.g., the images adapt to movement so that users feel more like they are looking through a window than looking at a picture).

Example Multi-User Embodiment

An example of a collaborative Virtual Reality (VR) session illustrates certain optional features and advantages of the system in which user actions and display of such actions are synchronized across varying hardware devices with minimal programmatic and configuration effort on the part of VR developers/content creators. Advantageously, because the example clustered system manages the underlying communications, the simulation execution and control, and the Avatar positional changes for each participant in a multi-user simulation, the system enables VR creators to focus their efforts on the content of a simplified simulation scenario/environment (including for example, a single-user simulation). Further, this example embodiment illustrates a novel approach to a multi-user simulation environment which enables local contextual computing in association with each VR participant in order to present certain aspects, for example participant's actions of a first type, of the simulation in substantially-real time (e.g., with minimal display delays and/or communication latencies, such as those that would not be perceived by a user) to the VR participant. By contrast, certain other aspects of the simulation, for example participant's actions of a second type, are only partially processed in a local context or are not processed at all in the local context but rather are processed in a remote context. Tracking data associated with the second type of participant's action may be transmitted to and received at a master server for centralized processing (e.g., at a master server) and then scene rendering content changes are performed by the master server and distributed, over a communication medium (e.g., a data network), to each client participant in the multi-user session. Therefore, in certain simulations, the data sent between the master and clients is primarily limited to the position and orientation of the participants of the simulation.

Figure 6:
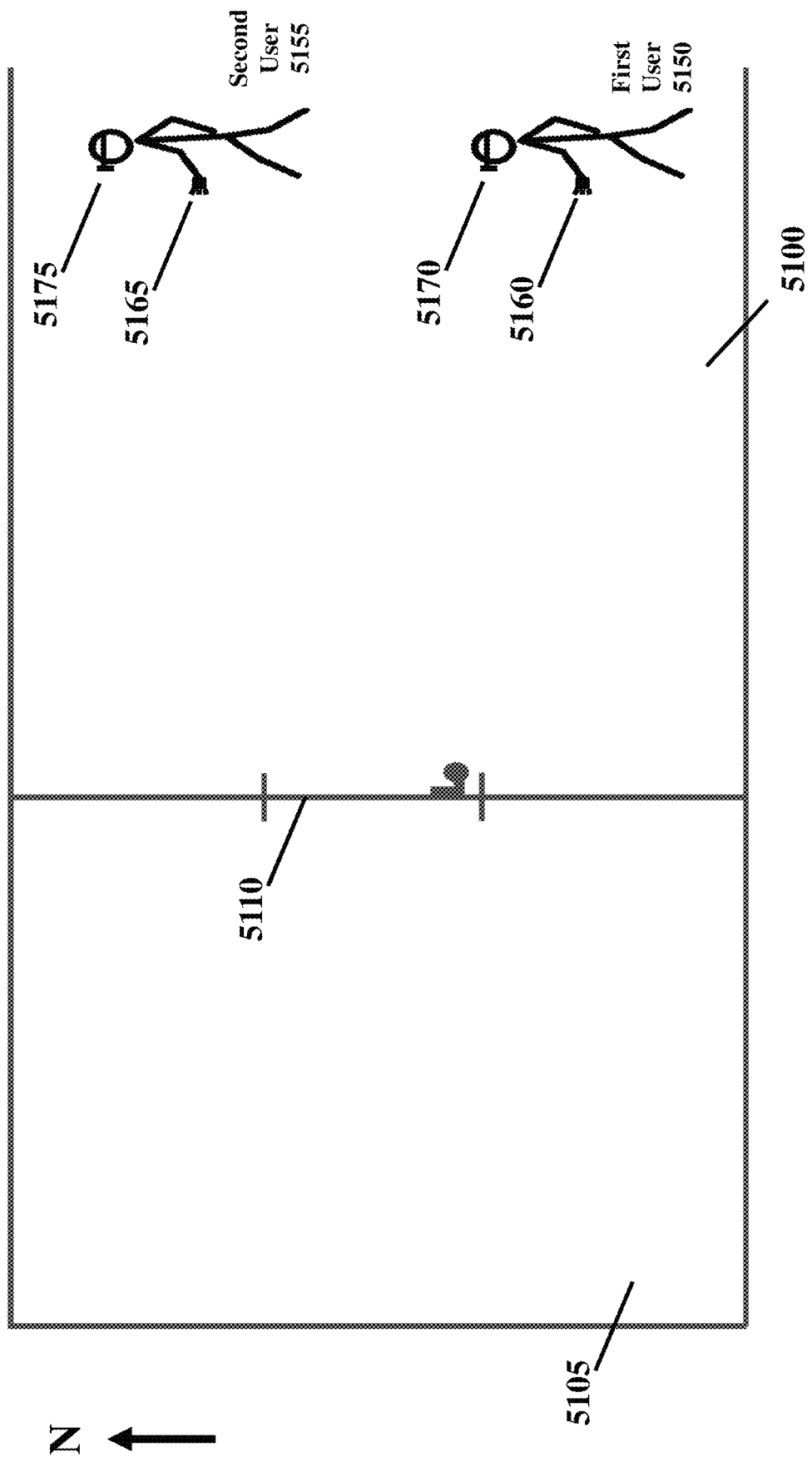
FIG. 6 illustrates an example virtual reality scenario.

In this illustrative example, and with reference to FIG. 6, two users experience an interactive VR session (hereinafter referred to as a simulation or VR simulation) in which the users begin in a first room and one user walks into a second room (it is understood that this example assumes two users for clarity, although other scenarios may have more than two users). FIG. 6 illustrates a configuration of the two rooms 5100, 5105 of the simulation. Room 5100 is configured with a sliding door 5110 which enables a user to walk from Room 5100 to Room 5105 upon opening the sliding door 5110. In this example, the sliding door 5110 and the wall separating Room 5100 and Room 5105 are merely a simulation as there is no physical wall separating Room 5100 and Room 5105 in the real world (although Rooms 5100 and 5105 may be physical, real world rooms). Further in this example, Room 5105 is configured with the adjoining sliding door 5110 and a physical chair facing the door 5110. In addition, in this example, the sliding door 5110 slides opens in response to the application of a left-to-right hand movement from a user and automatically closes from right-to-left when no pressure is applied to the door or door handle. In this example, a first user 5150 is initially positioned to the left of a second user 5155 and, correspondingly, the second user 5155 is positioned to the right of the first user 5150. Both users begin the VR session/simulation at the eastern portion of the room, each facing west towards the sliding door 5110.

In this example, a system of four tracking cameras 5310-5340 (e.g., a motion capture system including, for example, a PPT X camera system running at 60 Hz or a PPT E camera systems running at 180 HZ, both from WorldViz, LLC of Santa Barbara, Calif.) are configured in the VR session in order to track certain user movements of the first 5150 and second 5155 users via a set of trackable infrared LED markers attached to or configured in association with each user, see also FIG. 8. For example, a precision positioning tracking device, such as the PPT Eyes tracking device from WorldViz, may be affixed to a wearable head mounted display 5170, 5175 of each user to track each user's head and body movements/travel. In this example, each user's right hand is configured with a haptic glove 5160 and 5165 respectively, where the haptic glove is configured to simulate a touch sensation when a user interacts with an object in the simulation to enable a wearer to "feel" a virtual object as if it really existed, and wherein the glove further includes a one or more trackable infrared LEDs and/or finger movement sensors.

In this example, at least four separate computing devices and/or computing servers 5200, 5210, 5200, and 5230 are employed in the simulation as previously described herein, see also FIG. 7. In this example, computing server 5200 is configured as a master computing server and is provisioned in association with server program software 5205 (e.g., WorldViz cluster master from WorldViz LLC of Santa Barbara). In this example, computing device 5210 (e.g., a Graphic Processing Unit (GPU), a processing unit to provide rapid visual/display processing) is provisioned in association with a software client 5215 (e.g., a WorldViz cluster client from WorldViz LLC of Santa Barbara) and wherein the client is configured in a client-server relationship with master server software 5205, as further described herein below. Similarly, in this example, computing device 5200 (e.g., a GPU) is provisioned in association with a software client 5225 (e.g., a WorldViz cluster client from WorldViz of Santa Barbara) and wherein the client is configured in a client-server relationship with master server software 5205, as further described herein below. Each of the three computing devices are interconnected via a local-area or wide-area data communication network 5250 as further described above.

In the example embodiment, the cluster system performs a set of initialization and/or connection acts, such as a simulation launch, followed by the actual simulation. These initialization and launch acts, and the simulation of the example embodiment are further described below.

In this example, the master server 5205 and clients 5215, 5225 initialization precedes the client-server connection process. Optionally, the connection process precedes the initialization process. Optionally, the initialization process may be manually performed by a user (as opposed to being automatically performed by the system) and occurs independent from any client-server binding/association.

Virtual Reality Initialization

As previously mentioned herein, clustering environments enable the distribution of computational tasks across multiple computing resources within a network of computers, thus, enabling the simulation of computationally expensive virtual/augmented reality worlds. To avoid bogging down the network (e.g., creating network latencies) during a simulation the amount of data that each computer transmits and receives is minimized. This is accomplished by, for example, loading the virtual world on each computing device and then pass only the data that is unique to the local/client computer. In this example, the master server 5200 and each client 5210, 5200 are initially seeded with a set of identical copies of executable programmatic code and associated data (e.g., resource files and modules), which is loaded during the initialization process or during runtime. This limits the primary communications between the master server 5205 and clients 5215, 5225 during the VR session to synchronization calls which keep the viewpoint and scene-graph states identical across all clients in the multi-user VR simulation. The synchronization may be performed in substantially real time (so that any delay is not perceptible or is barely perceptible, to users). Optionally, resources, such as models, textures, and audio files are not generally transmitted from the master to clients during the VR session.

Optionally, the resources needed for the simulation in this example are downloaded from the master server's data store 5202 to the clients and stored in each client's data store 5212, 5222, wherein the data stores comprise computer memory and can be configured as a general purpose file system, tables, flat databases and/or SQL databases by way of non-limiting illustrative example. Optionally, to avoid distributing/downloading/uploading files and/or copies of files across computing servers and computing devices, a file sharing network with a common data store may be employed with absolute, full network paths (e.g., beginning with a drive letter followed by the rest of the path) or relative paths (a path relative to the current directory) to the stored resources specified at each participating computing server and/or computing device.

Optionally, the simulation initialization is initiated in response to a user/administrator selection (e.g., the first user 5150, the second user 5155, or a third user) of a control at the master server 5205. The master server 5205 downloads to each client computing device 5210, 5200 the executable code and resources to be used in the VR simulation. Upon receipt of the executable code and resources, each networked client 5215, 5225 loads their respective data store 5212, 5222. Optionally, the code and resources are downloaded directly by the master into the data store 5212, 5222). Optionally, any problems and/or detected errors in loading the code and resources are reported to the administrator/user who initiated the download such that the administrator/user can take corrective action. Optionally, each client in the network of clients (e.g., 5215, 5225) independently requests (e.g., via a user interface control of the software clients 5215, 5225) the master server 5205 to initialize each client's respective data store 5212, 5222. Optionally, any or certain detected errors in client initialization are displayed to the associated client administrator/user and/or the administrator/user of the master server 5205 in order to take corrective action. When initialization completes (e.g., without fatal errors), the clients 5215, 5225 are data store synchronized with the master server 5205 and the initialization step is complete.

Cluster Connection Management

The cluster client software program enables a client computing device to receive signals/requests/messages to launch a simulation (e.g., to receive a signal from an associated/bound master server software program) and synchronize user actions during a launched simulation (e.g., via a synchronous (sync) update from an associated/bound master server program). In this example, the users 5150, 5155 launch their respective client software programs 5215, 5225.

The master server software program enables a master computing device/server to send signals/requests/messages to launch simulations (e.g., to send a signal to one or more associated/bound clients) and synchronize user actions across the associated/bound client programs. In this example embodiment, a user (e.g., users 5150, 5155) or an operator launches an instance of the master server software program 5205 on the computing server 5200. Optionally, the master server program 5205 displays, via a user interface, the computing devices 5210, 5200 that are connected over a communication medium (e.g., a local-area or wide-area data network) and that are running the cluster client software programs 5215, 5225. Optionally, the master server program 5205 user interface displays the IP address of the data connected computing devices/servers and the name of each client 5215, 5225. Optionally, the server program 5205 provides an add control (e.g., a check box control) by which a user 5150, 5155 or an operator of the cluster computing system can associate/bind a given client with the master server in the network of connected clients. Optionally, more than one instance of the client software program can be launched per computing device/computing server, including the master server 5200. Optionally, the master server program 5205 enables, via a user interface, a user/operator to specify a data communication port (e.g., a TCP/IP port) in which the associated/bound master server and client programs can communicate over a local-area or wide-area data network. Optionally, the master server program 5205 enables, via a user interface, a user/operator to refresh the list of connected clients by, for example, broadcasting a message to the cluster clients and waiting for their response.

Optionally, the master server program 5205 provides certain cluster synchronization processes to ensure the multi-user VR session is reliably and timely synchronized across all clients. If for example, a client were to fall behind with respect to rendering or enable rendering in a multi-user session, the VR experience for the lagging client, and other participants viewing the client, might seem sub-optimal, unrealistic and/or sluggish. These processes optionally include but are not limited to: sync frames, sync draw, and sync resources. Optionally, if the sync frames process is enabled via a user interface of the master cluster 5205, each client computing device/server blocks (e.g. delays a period of time, delays until a condition is satisfied, delays until a signal is received, delays until a routine completes, delays until a message is received, etc.) at the end of each frame until all other computing devices/servers finish processing their updates for that frame (as determined by the master server program 5205 by, for example, receiving a frame update complete message from each client or its equivalent (e.g., a function call unblocks)). For example, in a blend screen simulation configuration, it may be the case that a client would prefer a drop in frame rate rather than ever seeing a discrepancy (e.g., a screen tear) across blended or butted displays. Optionally, if sync draw is enabled and sync frames is enabled, in addition to blocking until all updates are complete, the client computing device/servers 5215, 5225 will optionally also block until all other client computing device/servers 5215, 5225 finish rendering their respective frame. Optionally, if the sync resources function is enabled, all resources in a script/executable code folder are automatically synchronized with the connected clients when running a VR simulation/session. Optionally, when the resource syncing function is enabled, a resource filter can be configured/programmed by the user/operator to block certain file types from being synced from the master with the clients. For example, a user can exclude log files from being sent to a specified client or all clients (e.g., to reduce network congestion and latencies). Optionally, multiple filters can be configured/programmed to restrict more than one type of resource (e.g., models, textures, etc.) synchronization with connected clients.

Optionally, the master server program 5205 executing on the master server provides certain cluster session timer controls to ensure the multi-user VR session is adequately synchronized across all clients. A synchronization timeout or series of synchronization timeout events may cause an operator or user of the VR session to halt the VR session and take corrective action to repair the troublesome client(s).

Optionally, the master server program 5205 enables a user/operator to change a default time period (e.g., 100 milliseconds, 500 ms, 1 sec, etc.) the cluster master and client program will wait after a timeout occurs before attempting to establish a data connection (e.g., a TCP/IP data connection) to attempt synchronization. Optionally, in the event of a timeout, the cluster master 5205 and/or client program 5215, 5225 will automatically retry synchronization a configurable number of automatic retries before determining that the problem that caused the timeout is not correctible without further action. Optionally, a failed retry and/or a failed connection attempt is reported to the user/operator of the client and/or master server as an alarm/error (e.g., via a user interface displayed on a display and/or via an audible alert) and/or logged as an error to an error log file.

Optionally, the master server program 5205 enables a user/operator to change, via a user interface, a default time period which the cluster master 5205 and client program 5215, 5225 will wait to finish sending/receiving messages for each frame in a VR session (e.g., 100 milliseconds, 500 ms, 1 sec, etc.). Optionally, in the event message sending and/or receiving for a frame exceeds a specified default time limit, a failed frame alarm/error may be reported to the user/operator of the client and/or master server (e.g., via a user interface displayed on a display and/or via an audible alert) and/or logged as an error to an error log file.

Optionally, the master server program 5205 enables a user/operator to change a default time period the cluster master 5205 and client 5215, 5225 programs will wait for synchronization to complete at the end of each frame (e.g., 100 milliseconds, 500 ms, 1 sec, etc.). Optionally, in the event the synchronization for a frame exceeds the specified default time limit, a failed frame alarm/error may be reported to the user/operator of the client and/or master server (e.g., via a user interface displayed on a display and/or via an audible alert) and/or logged as an error to an error log file.

Optionally, during the initialization and/or connection process, an exchange of resource types and/or hardware component types and capabilities occur between the master server program 5205 and associated clients programs 5215, 5225. For example, the resource and hardware exchange can include the manufacturer and model of the client head mounted display, the pixel resolution of the client display, the make and model of the graphic processing unit, the make and model of a hand held wand used in association with a client, etc.

Virtual Reality Rendering Startup

In this example, after the initialization and connection processes are complete, the master initiates a second command or sequence of commands to cause the clients to load the executable code of the VR scene in the render engine of each client computing server 5210, 5200. Optionally, any problems and/or detected errors in loading the VR scene into the render engine are reported to the first user 5150 and second user 5155 via the user's head mounted display 5170 and 5175, respectively, and/or a separate console/monitor of the client computing server 5210, 5200. Optionally, any detected problems and/or detected errors are mirrored to and/or exclusively provided to the master server program 5205. Optionally, any detected errors are logged to the master server's data store 5202 and/or displayed via a console/monitor to an operator of the master server 5200. Optionally, the master server program 5205 takes certain automatic action to repair detected errors, including for example, reloading the render engine of the client 5210, 5200, optionally, with certain modified parameters. Optionally, the master server program 5205 waits for a repair action to be initiated by the operator. Optionally, each client in the network of clients independently loads their respective render engine. After each client's render engine is loaded, the multi-user simulation is ready to begin.

Virtual Reality Simulation

The cluster system is used to share the rendering of a scene across multiple image generators and/or display screens. The cluster system, and in particular the master server software 5205, manages the viewpoint, or the rendered view, of each connected client, for example, by sending a sync command with certain position and orientation matrices of one or more avatars associated with the VR scene. By having the master perform certain computational tasks as described herein, the client's computational load is reduced enabling the clients to run more efficiently. Advantageously, as previously described herein, the rendered view is optionally further converted by the master server program 5205 to a set of commands/formats compatible with the hardware of a given client based on an identification of the client hardware/software obtained during initialization or registration (e.g., the pixel resolution of the client display, the display type, etc.). Further, because the cluster system as a whole performs the motion capture tracking, image processing, position calculations, etc., and converts the received input into perspectively correct renderings for each client's view, the VR program creator is divorced from these low level technicalities and instead interfaces with an abstracted view of the cluster system, and can thus focus on other aspects of the simulation (e.g., the simulation model, training tasks to be achieved by the simulation, the simulation scripting, etc.).

As previously described, the cluster system may optionally cause the rendering of certain aspects of the VR simulation to occur on the computing device/server of the client (e.g., computing in a local context), independent from, and not immediately synchronized with other participants in the VR session. This local context position determination and image rendering will hereinafter be referred to as "privileged." Privileged operations and/or rendering enables the cluster system to provide immediate display/action feedback to the user (this can also be characterized as "high frequency" feedback) with little or no human perceptible latency (e.g., less than 10 ms, less than 5 ms, less than 1 ms), thereby enabling the simulation to feel as lifelike as possible.

An example of an action that may be treated as privileged is a rotation of a user's viewpoint display (e.g., a user wearing a head mounted display, configured with PPT emitters, looking to the right, left, up, down, etc.). It has been determined through research that if latencies in a visual rendering of a scene in response to a head movement exceed approximately 10 milliseconds, then the rendering of the virtual scene is no longer indistinguishable from a real scene from a participant's perspective. Depending on the individual and the task at hand, the discrepancy from a real scene as detected by the human visual system may lead to disorientation or sub-optimal performance. Therefore, in many types of simulations this action type may be configured to be privileged. Another example of an action which may be treated as privileged is tracked travel (e.g., walking) of a user. In both of these example privileged actions, the received tracking and positioning/orientation change data of the user are processed and rendered substantially immediately in a local context by the client computing device associated with the user.

Notably, the cluster system enables a first party to the system (e.g., a user, a participant, an operator, a content creator, and/or a developer/scripting agent, etc., or any combination thereof) to define/configure/program/designate the system to cause certain aspects or elements of the VR simulation to be rendered in a privileged manner. Optionally, the cluster system recommends to the first party, via a user interface displayed on a display, which aspects/elements should be privileged based at least in part on certain predefined, detected, and/or measured criteria including, for example, a measured latency of a network connecting the computing devices and/or tracking cameras that exceeds a specified threshold, or based at least in part on a measured processing latency of a connected computing device exceeding a threshold as determined, for example, by having the computing device perform certain computational operations. Optionally in addition or instead, the cluster system recommends to the first party which aspects/elements should be privileged based at least in part on the mass/size of a moveable virtual object and certain physics associated with an object (e.g., a large rock on a hill or a key in a lock). Optionally, in addition or instead, the cluster system recommends to the first party that certain predefined aspect/elements should be considered privileged such as head tracking, user travel, user limb movement, etc. Optionally in addition or instead, the cluster system recommends to the first party which aspects/elements of the system should be privileged based at least in part on the identification/detection of certain haptic devices (including, device make and/or model) on initialization wherein, generally, haptic devices are configured as privileged.

Optionally, the cluster system automatically configures for the first party certain aspects/elements of the system as privileged or not privileged based at least in part on one or more criteria described herein (e.g., measured latencies, measured processing capabilities, physics, haptic device outputs, etc.). For example, if the system measures a network latency between a master computing device 5200 and a slave/client computing device 5210, 5200 that exceeds 10 milliseconds (or other specified threshold) the computing device may be automatically configured to operate in a privileged manner with respect to certain functions/portions of the simulation (e.g., previously identified as critical or potentially privileged) to thereby provide relatively reduced latencies.

Optionally, the system may provide a user interface via which the first party may define/configure/program/designate the system to cause certain aspects of the VR simulation and/or elements of the simulation to be rendered in a privileged manner dependent upon the type of application. The system may receive and act on the information and commands provided via the user interface. For example, in a multi-user sport training simulation, ball physics may be privileged to each user client. In another example, in a flight vehicle simulator certain responses, say control yoke and side-stick, need to be privileged in order to provide a low latency, realistic experience, whereas the attitude and position of the virtual flight vehicle do not need to be privileged as some latency (e.g., up to 200 ms or other threshold), will not adversely affect the realism of the virtual reality experience. As described herein, head movement and travel may optionally be generally configured as privileged operations. Limb movements, may be generally configured as privileged operations but can also be configured as non-privileged given measured network latencies and computing device processing capabilities.

Taste and smell are not generally rendered visually per se and, therefore, may be categorized as non-privileged in the client-server cluster configuration domain (which may optionally categorize which aspects may be privileged and which aspects are never to be treated as privileged). However, with respect to sound in multi-user simulations, there are certain situations in which it may be advantageous for sound to be rendered in a local context or privileged operation. Optionally, sound rendering intended to convey accurate angular and distance cues (e.g., gunshots, car engine and tire sounds, the sound of an object striking a surface, a person speaking, a dog barking, a door opening or closing, footsteps, etc.) may need to be privileged operations (and so are categorized as potentially privileged) because they are susceptible to latency and may be closely synchronized with a corresponding visual rendering. Ambient sound, such as, for example, background noise or music with no pinpoint localization needed, can be configured as non-privileged operations (e.g., processed by a master server or enabled by a communication channel via the master server).

In the cluster system, once a position matrix (which may include orientation information) of an action (e.g., of a user, part of a user, or object, etc.) is derived from the received tracking data by a client 5215, 5225 for a privileged action, the position matrix is sent to the master server program 5205. Optionally, a client 5215, 5225 performs and transmits the position and orientation determination for each frame (or set series of frames) in order that the master server program 5205 has as much information coming in as possible about the privileged operation. The position matrix received from the client 5215, 5225, coupled with the position data of the other simulation users (e.g., previously stored position data or position data determined/derived from tracking data), enables the master server program 5205 to provide scene rendering information to each client 5215, 5225 wherein each client 5215, 5225 is configured to receive over the network scene position and orientation data suitable for local rendering (e.g., by a head mounted display or other display) and wherein the received client rendering information includes actions taken by other simulation users in a perspectively correct viewpoint. By way of illustration, an example of a perspectively correct viewpoint is where a virtual wall of the simulation may obstruct an observer's view of another user when the user travels, in the simulation, behind the virtual wall. In an illustrative example, the master server program 5205 may provide client 5225 position and orientation for the first user in a data array in response to certain conditions (e.g., frame event, time out event, set series of frames (e.g., 2, 3, 4, 5 frames, etc.), etc.) for local scene rendering. Similarly, the master server program 5205 may provide client 5215 with position and orientation for the second user.

Certain other VR actions may be considered and processed by the cluster system as non-privileged (e.g., remote or not in a local processing context). For example, the movement of a tracking wand or the movement of a user's hand may be categorized and treated as non-privileged. Non-privileged user action tracking data (e.g., marker tracking identity and position data received from motion tracking camera(s) or tracking computing server 5230) is processed by the master server program 5205 and positional scene changes/actions are identified for each connected client 5215, 5225 and downloaded (e.g., via a sync operation) to the connected clients for local context rendering (e.g., wherein each client 5215, 5225 is configured to receive over the network scene position and orientation data suitable for local rendering, including the client/user from which the action originated (as further described below).

In this example, each user is wearing a head mounted display 5170, 5175 with an attached PPT emitter (e.g., LED equipped PPT Eyes). Each user 5150, 5155 in this example, is also wearing a right-hand glove 5160, 5165 configured with finger motion sensors and one or more infrared LEDs. The LED(s) associated with the PPT emitter and glove may each emit a unique infrared light pattern/code (e.g., marker Identification (ID)) which is recorded by the tracking cameras. The light patterns emitted by the LEDs uniquely identify a user's head movement, user travel, and user's right hand movement. The PPT tracking camera output (e.g., either PPT X indirect output wherein the output may be processed by, for example, using PPT studio software using an intermediate computing device 5230 (e.g., a dedicated computing device or a shared computing device such as the server 5230 or PPT E direct output)) is received by the master server program 5205 and client programs 5215, 5225. The output from the intermediate computing device 5230 or direct output in the case of PPT E provides infrared marker identify and space position of the LED markers. The client programs 5215, 5225 similarly receive glove 5160, 5165 marker ID and finger movement sensor data.

Figure 9:
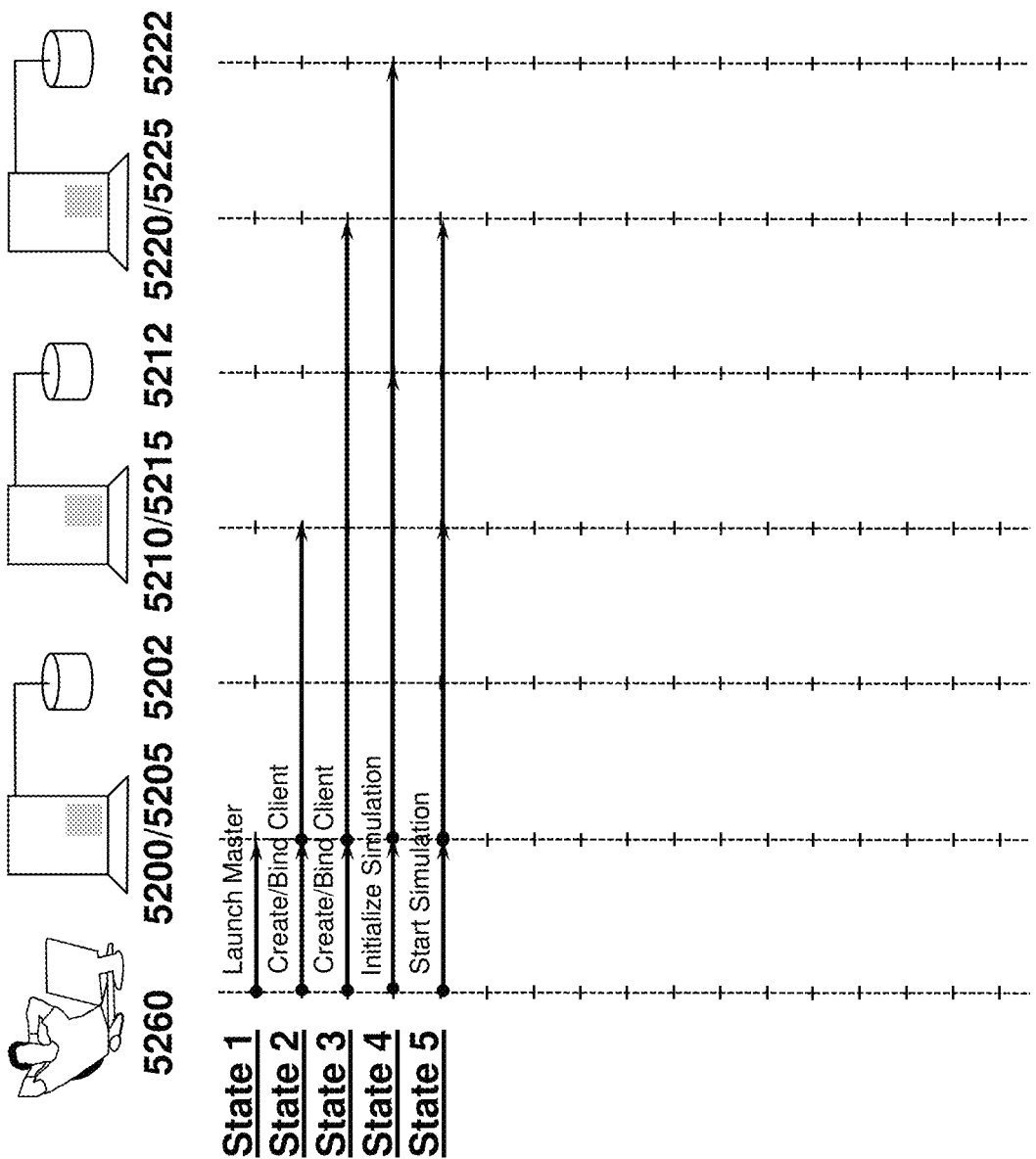
FIGS. 9 and 10 illustrate a process of a multi-user virtual reality example embodiment.
Figure 10:
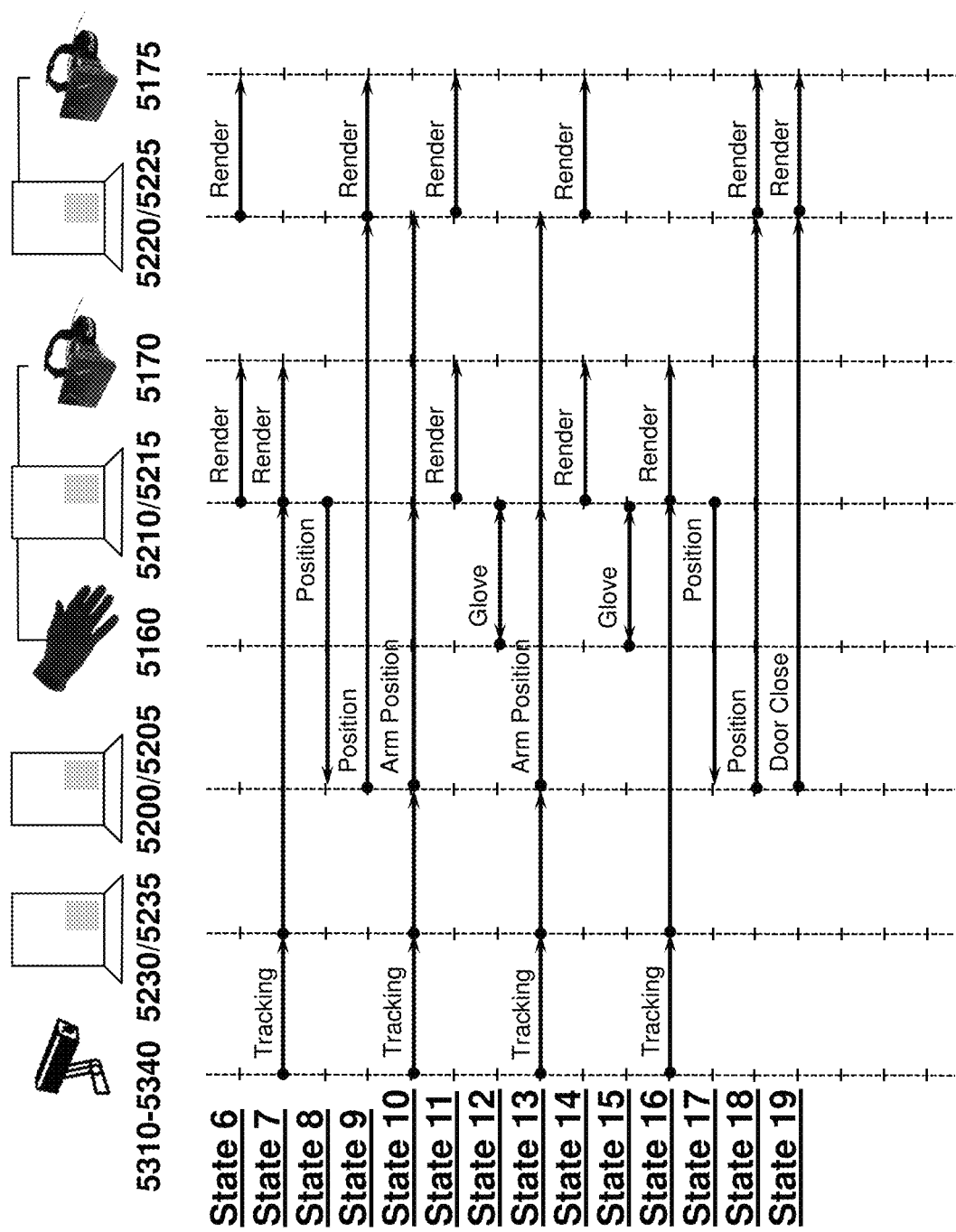

FIG. 9 and FIG. 10 illustrate a first example process workflow of the example clustered system discussed above. Process states are listed on the left and elements of the operating environment of FIGS. 1, 2, and 3 are listed across the top.

State 1 of FIG. 9. An instance of the master server program 5205 launches on the computing server 5200 (e.g., in response to a launch command provided by a system administrator via monitor 5260).

State 2 of FIG. 9. The master server program 5205 generates and provides for display a user interface on a console/monitor 5260 that identifies the network connected computing devices 5210 and 5200 (e.g., using differentiating identifiers, such as an alphanumeric name and/or an icon). The master server program 5205 receives, via the user interface, a selection by the system administrator of an add control, and in response, the master server program 5205 creates an instance of a client 5215 on the computing device 5210 and binds (e.g., creates a client-server association/linkage enabling the master to send master initiated requests and data over a communication channel and receive client responses, client initiated requests, and data or other computer programming methods of software program/module association as known to those skilled in the art of data communications and/or software development) the created client 5215 with the master server program 5205. In this state or an earlier or later state the configured clients 5215,5225 and master server access configuration information indicating what types of operations associated with the simulation are privileged and what types of operations are non-privileged.

State 3 of FIG. 9. The actions of State 2 are repeated to create and bind client 5225 on the computing device 5200 with the master server program 5205.

State 4 of FIG. 9. The master server program 5205 initializes the simulation (e.g., in response to determining that the system administrator has selected an initialize control presented via a user interface of the master server program 5205 presented on console/monitor 5260), and downloads, over the network 5250, to each client computing device's data store 5212, 5222 executable code and resources to be used in the simulation. In States 1, 2, 3, or 4 (or in a separate state) the tracking cameras 5310-5340 are also initialized and calibrated (e.g., with respect to the marker tracking devices used in the simulation). In addition, the unique infrared marker IDs (e.g., by each marker emitting a distinctive pattern) of the tracking devices are associated with users 5150, 5155 and clients 5215, 5225, respectively.

State 5 of FIG. 9. The simulation session begins (e.g., in response to detecting that the administrator selected a user interface control of the master server program 5205 presented on console/monitor 5260 initiating a virtual world script on the master server 5205). In response to the control selection, the master server 5200 initiates a simulation in each client 5215, 5225 (e.g., via a sync call/command/instruction).

State 6 of FIG. 10. In response to the VR launch, a display/scene of Room 5100 is rendered (or caused to be rendered) in the head mounted display 5170, 5175 of each user 5150 (first user), 5155 (second user) via the client software 5215, 5225. In this example, the first user's viewpoint/display includes an avatar (e.g., a virtual representation) of the second user. The second user's viewpoint/display includes an avatar of the first user.

State 7 of FIG. 10. First user 5150 walks from the front (East side) of Room 5100 to the sliding door 5110. The PPT motion tracking cameras 5310-5340 (e.g., PPT X cameras) record the first user's 5150 steps, including in this example, the infrared light signal emitted by the tracking markers (e.g., a left marker and a right marker of a PPT Eyes tracking device) affixed to the Head Mounted Display (HMD) 5170. In this example, a computing device 5230 hosting a motion tracking software program 5235 (e.g. PPT Studio) performs certain operations on the camera video output, including but not limited to, one or more of the following: an analog to digital conversion of the captured video (using an analog to digital conversion device and/or conversion software), identification of marker patterns and from the marker patterns identifies each marker in the camera field of view, calculations of two dimensional centroids of marker positions, determine the center point position between the two markers of the tracking device (e.g., PPT Eyes tracking device), etc.

At least partly in response to accessing the privileged operation configuration information, the client 5215 executing on the computing device 5210 receives the tracking data from computing device 5230 and performs certain calculations with respect to the infrared markers associated with the first user 5150 to create a series of position matrices corresponding to the first user movement (e.g., wherein a given matrix may express the position/orientation coordinates in space of the first user 5150 in 5 degrees of freedom, x, y, z, yaw, roll, or other degrees of freedom) and a new viewpoint is rendered (and/or causes a new viewpoint to be rendered) in the client/display 5215, 5170 (e.g., via a local context privileged rendering operation as previously described herein).

The process of State 7 may be continually repeated as the first user 5150 travels/walks to the sliding door 5110 with the first user's head mounted display 5170 displaying an expanding view of the wall separating Room 5100 from Room 5105 and the sliding door 5110 (e.g., a scene of the simulation). Optionally, PPT E motion tracking cameras are used in place of or in addition to PPT X cameras, in which case the camera output includes marker identification and associated marker position data (including each marker position and/or a center point positon between two markers of a two marker tracking device) eliminating the need for the standalone computing device 5230 to perform the operations.

State 8 of FIG. 10. Once each new first user position matrix is determined/generated for the first user in State 7, the new position matrix is sent/streamed by the client 5215 over the data network 5250 to the master server program 5205. Optionally, the master server program 5205 receives the new position matrix in response to a server request/calling function.

State 9 of FIG. 10. With respect to the master server program 5205, the master server program 5205 receives the position matrices from the client 5215. With each received position matrix corresponding to the first user movement, the master server program 5205 generates, based at least in part on and taking into consideration the current position data (e.g., including head position and body location) of the second user 5155, a new orientation/position of the first user avatar (referred to hereinafter as avatar1). This new orientation/position of avatar1 is downloaded (e.g., via a synchronize call/operation/instruction) from the master server program 5205 to the second client 5225 (and/or client computing device 5200) for rendering in the head mounted display 5175 of the second user 5155. As each synchronized update is received from the server 5205, the associated avatar1 positioning in the scene is rendered by the client/display 5225, 5175. The second user views in their head mounted display 5175 avatar1 walking towards the sliding door 5110.

As illustrated with respect to States 7-9 of this example, the cluster system manages the technicalities discussed herein associated with the substantially real-time communications between client and server and server and clients (e.g. real-time in nature but subject to certain processing and network transmission delays/latencies). In addition, this example illustrates how the cluster system manages/enables the various avatar renderings to occur in their perspectively correct views for each user in the multi-user system, wherein the user's view or viewpoint of each avatar/participant in the simulation is based in part on positional changes of each avatar/participant in the simulation (optionally including the extremities of each avatar/participant) together with positional changes from which each user views the simulation. Thus, because the cluster system manages the technicalities, the simulation content creator/developers may concentrate their creative efforts on the simulation application itself rather than having to code/develop programs to deal with such technicalities.

State 10 of FIG. 10. Upon reaching the sliding door 5110, the first user 5150 in this example reaches out with the gloved hand to grab a handle on the sliding door 5110. In this example, arm movement is treated as a non-privileged operation (e.g., a remote server operation). The PPT motion tracking cameras 5310-5340 record the first user's 5150 hand reaching towards the handle via the identified infrared light signal emitted by the LED marker(s) attached to, for example, the glove 5160. At least partly in response to accessing the privileged operation configuration information, the master server program 5205 executing on the computing device 5200 receives the glove tracking data from computing device 5230 and performs certain calculations with respect to the received infrared marker(s) associated with the first user's hand to create a series of hand position matrices (e.g., where a given position matrix expresses the position coordinates of the first user's hand). The resulting one or more position matrices are downloaded (e.g., via a synchronize command/operation/instruction) from the master server program 5205 to the clients 5215, 5225.

State 11 of FIG. 10. Upon receipt by the client 5215 of the hand tracking position data, a new position of the first user's hand is rendered (or caused to be rendered) in the first user's head mounted display 5170. Upon receipt by the client 5225 of the hand tracking position data, a new position of the first user's hand in Avatar1 is rendered in the second user's head mounted display 5170. The position calculation sequence is repeated by the master server program 5205 and rendering by the clients 5215, 5225 is repeated as the gloved hand of the first user reaches for the sliding door handle.

State 12 of FIG. 10. In this example, first user 5150 grasps with the gloved hand the handle on the sliding door 5110. From the received light emitted from the glove markers of the first user (e.g., the infrared light recorded by one or more of the cameras 5310-5340), and at least partly in response to accessing the privileged operation configuration information, the master server 5205 identifies by way of the output from computing device 5230 that the first user's right hand has made contact with the sliding door handle (e.g., via a position in space of the first user's extended right hand) of the simulation (note, in this virtual reality simulation embodiment there is no physical door or handle).

In this example, the master server 5205 instructs (e.g., via a non-privileged master server synchronize command/operation/instruction directed only to client 5215 using, for example, a masking synchronous command/operation/instruction) the client 5215 to create a sense of touch in the gloved hand of the first user, by for example, causing via an instruction/operation the inflating of a collection of air pockets in the glove 5160 on the palm side to create pressure force against the user's hand. Thus, optionally, touch feedback is processed/caused as a non-privileged operation.

Alternatively or in addition, optionally the cluster system uses the sensors in the glove 5160 (rather than the determined position of the glove hand) of the first user to detect a grasp action by the user (this example privileged operation is illustrated in FIG. 10 rather than a non-privileged operation described herein above). At least partly in response to accessing the privileged operation configuration information, the client 5215, upon detecting the glove grasp (e.g. fingers closing), in a client privileged operation, instructs the glove to create a sense of touch as previously described herein.

State 13 of FIG. 10. In this example, first user 5150 opens the door 5110 with a left to right movement of the gloved hand. The master server 5205 generates a series of hand position matrices (e.g., via the received tracking data from computing device 5230 as previously described and at least partly in response to accessing the privileged operation configuration information, for example, with respect to State 10). A series of new arm position movements are determined and downloaded (e.g., via a synchronize commands/operations/instructions) from the master server 5205 to the clients 5215, 5225.

State 14 of FIG. 10. Upon receipt by the client 5215 of the hand tracking position data, a new position of the first user's hand and the door 5110 is rendered (or caused to be rendered) in the first user's head mounted display 5170. Upon receipt by the client 5225 of the hand tracking position data, a new position of the first user's hand in Avatar1 and the door movement 5110 is rendered in the second user's head mounted display 5175. The position calculation sequence is repeated by the master server program 5205 and rendering by the clients 5215, 5225 as the gloved hand of the first user opens the sliding door 5110.

State 15 of FIG. 10. First user 5150 releases the door handle, which in this example, is treated as a privileged client operation, and so is processed locally by the client 5215. At least partly in response to accessing the privileged operation configuration information, the client 5215 upon detecting the handle release via sensors in the glove (e.g., by detecting the opening of the user's hand), instructs the glove 5160 to remove the pressure force (e.g., by deflating the collection of air pockets in glove 5160.)

Optionally, the door handle release action is neither identified nor received in this example by the master server program 5205, and consequently, the action is not rendered in the client 5225. Optionally, the cluster system enables one or more clients 5215, 5225 to send/receive communications between each other. Optionally, client-to-client communication is enabled via the master server program 5205. Optionally, client-to-client communication is enabled via user interface control(s) of the client and is not enabled via the master server program 5205. Optionally, the handle release action of this example is communicated directly from the client 5215 to the client 5225 in a peer-to-peer communication (i.e., not via the master server program 5205). Optionally, the receipt of the handle release action by the client 5225 causes the avatar1's right hand as viewed by the second user 5155 to be colored an unnatural skin color (e.g., green) via customized software of the clients 5215, 5225. Thus, as illustrated in this example, the cluster system facilitates/enables client communications and through these communications, customized software of the simulation can be developed/incorporated to provide certain simulation effects specific to one or a plurality of clients.

State 16 of FIG. 10. First user 5150 walks through the door opening. The PPT motion tracking cameras 5310-5340 record the first user's 5150 steps through the simulated door 5110 via the infrared light emitted by the tracking markers affixed to the head mounted display 5170. At least partly in response to accessing the privileged operation configuration information, the client 5215 executing on the computing device 5210 receives from the computing device 5230 tracking data and performs certain calculations with respect to the infrared markers associated with the first user 5150 to create a series of position matrices corresponding to the first user movement (e.g., as previously described with respect to, for example, State 7), and a new viewpoint is rendered (or caused to be rendered) by the client/display 5215, 5170 for each new position/orientation matrix (e.g., via a local context privileged rendering operation as previously described herein). The image capture, processing, and client 5215 rendering sequence is continually repeated as the first user 5150 walks through the sliding door with the first user's head mounted display 5170 displaying a view of the inside of Room 5105.

State 17 of FIG. 10. As similarly described with respect to State 8, after each new first user position matrix is determined/calculated in State 16, the new position matrix is sent by the client 5215 over the data network 5250 to the master server program 5205.

State 18 of FIG. 10. With respect to the master server program 5205, the master server program 5205 receives the generated position matrices corresponding to the first user from the client 5215. For a given received position matrix from the client 5215, the master server 5200 creates, based at least in part on and taking into consideration the current position data (including head position and body location) of the second user 5155, a new orientation/position of avatar1. This new avatar1 positioning data is downloaded (e.g., via a synchronize call/operation/instruction) from the master server program 5205 to the second client 5225 (and/or client computing device 5200) for rendering in the head mounted display 5175 of the second user 5155 (see also State 9). As each synchronized update is received from the server 5205, the associated avatar1 positioning in the scene is rendered by the client/display 5225, 5175. The second user views in their head mounted display 5175 avatar1 walking through the sliding door. In this example embodiment, at least a portion of the front part of the avatar's body is concealed by the wall as the first user enters the second room (Room 5105).

State 19 of FIG. 10. When the master server program 5205 determines that the first user 5150 has cleared the door passage, the master server program 5205 simulates the door 5110 closing behind the first user. The master server program 5205 determines the first user 5150 has cleared the door passage based on the at least in part on the received position matrices from the client 5215 or, optionally, by independently identifying first user 5150 marker data from the tracking data output of the computing device 5230. The master server program 5205 downloads (e.g., via a synchronize call/operation/instruction) to the client 5225 an update to the VR scene wherein the sliding door closes and/or provides the client with instructions to close the door in the VR scene. The client/display 5225, 5175 renders (or causes the rendering) a view of the door closing scene(s) behind the avatar1 in the viewpoint of the second user's head mounted display 5175.

Thus, as described above, an example clustered system provides a multi-user virtual reality simulation via a client/server architecture. Advantageously, the client/server architecture enables timely viewing of certain privileged user actions and server-based synchronization of non-privileged user actions to create a lifelike simulation experience. In addition, many of the technical details of rendering avatar representations of simulation participant in the viewpoint of each user is derived by the server and made available to the clients in a format compatible with the hardware used by each participant.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or nonvolatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals and other computing devices described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method, comprising:
 accessing configuration information from computer readable memory, the configuration information comprising information indicating what types of operations are locally privileged and what types of operations are non-privileged;
 based at least in part on the accessed configuration information comprising the information indicating what types of operations are locally privileged and what types of operations are non-privileged, causing at least one operation to be performed locally and at least one operation to be performed non-locally;
 receiving position data from a first motion tracking camera in a first physical space and a second motion tracking camera in a second physical space, the first motion tracking camera configured to detect infrared light providing position data corresponding to a position of a first user in the first physical space, and the second motion tracking camera configured to detect infrared light providing position data corresponding to a position of a second user in the second physical space;

causing, using a master computing device, an image corresponding to the first user to be rendered at a first virtual position in a display device associated with the second user, wherein the first virtual position is determined at least in part on the position data corresponding to the position of the first user in the first physical space and on a determined viewpoint of the second user;

causing, using the master computing device, an image corresponding to the second user to be rendered at a second virtual position in a display device associated with the first user, wherein the second virtual position is based at least in part on the position data corresponding to the position of the second user in the second physical space and on a determined viewpoint of the first user;

receiving, at the master computing device, heart rate data from a heart rate sensor associated with the second user; and at least partly in response to receiving the heart rate data of the second user, causing a corresponding indication to be rendered in the display device associated with the first user.

2. The computer-implemented method of claim 1, wherein the heart rate data comprises a heartbeat rate.

3. The computer-implemented method of claim 1, wherein the first physical space is geographically separate from the second physical space and, the method further comprising transmitting from the master computing device at least a portion of the position data corresponding to the position of the first user over an Internet connection.

4. The computer-implemented method of claim 1, wherein the second user comprises a plurality of users, to the method further comprising causing the indication corresponding to the heart rate data to be rendered in the display device associated with the first user at least partly in response to determining that at least a threshold number of users in the plurality of users have a heartbeat change that satisfies one or more conditions, the threshold number greater than one.

5. The computer-implemented method of claim 1, wherein the indication corresponding to the heart rate data is not rendered in the display device associated with the second user.

6. A computer-implemented method, comprising:
accessing configuration information from computer readable memory, the configuration information comprising information indicating what types of operations are locally privileged and what types of operations are non-privileged;

based at least in part on the accessed configuration information comprising the information indicating what types of operations are locally privileged and what types of operations are non-privileged, causing at least one operation to be performed locally and at least one operation to be performed non-locally;

receiving, at a computing device, heart rate data from a heart rate sensor associated with a second user;

storing in the computer readable memory, the heart rate data in association with other received monitored data corresponding to the second user;

receiving position data from at least one motion tracking camera configured to detect infrared light providing position data corresponding to a position of a first user in a physical space and receiving position data from at least one motion tracking camera configured to detect infrared light providing position data corresponding to a position of the second user in the physical space;

causing, using the computing device, an image corresponding to the first user to be rendered at a first virtual position in a display device associated with the second user, wherein the first virtual position is determined at least in part on the position data corresponding to the position of the first user in the physical space and on a determined viewpoint of the second user; and causing, using the computing device, an image corresponding to the second user to be rendered at a second virtual position in a display device associated with the first user, wherein the second virtual position is based at least in part on the position data corresponding to the position of the second user in the physical space and on a determined viewpoint of the first user.

7. The computer-implemented method of claim 6, wherein the heart rate data is stored in the computer readable memory in a cloud data storage configuration.

8. The computer-implemented method of claim 6, wherein the other received monitored data corresponding to the second user comprises eye tracking data, facial expression data, body temperature data or any combination thereof.

9. The computer-implemented method of claim 6, wherein the computer readable memory comprises a cloud data storage configuration, and wherein the other received monitored data corresponding to the second user is stored in the cloud data storage configuration.

10. The computer-implemented method of claim 6, wherein the physical space comprises a first physical space and a second physical space, wherein the first physical space is geographically separate from the second physical space and the first user is located at the first physical space and the second user is located at the second physical space, the method further comprising transmitting, using the computing device, at least a portion of the position data corresponding to the position of the first user over an Internet connection.

11. The computer-implemented method of claim 6, the method further comprising ascertaining an emotional state of the second user from the heart rate data.

12. The computer-implemented method of claim 6, wherein the second user comprises a plurality of users.

13. The computer-implemented method of claim 6, wherein the heart rate data is received over a wireless connection.

14. A computer-implemented method, comprising:
accessing configuration information from computer readable memory, the configuration information comprising information indicating what types of operations are locally privileged and what types of operations are non-privileged;

based at least in part on the accessed configuration information comprising the information indicating what types of operations are locally privileged and what types of operations are non-privileged, causing at least one operation to be performed locally and at least one operation to be performed non-locally;

receiving position data from motion tracking cameras configured to detect infrared light providing position data corresponding to a position of a first user in a physical space and detect infrared light providing position data corresponding to a position of a second user in the physical space;

receiving, at a computing device, blood pressure data from a blood pressure monitor associated with the second user;

storing, in the computer readable memory, the blood pressure data;

causing, using the computing device, an image corresponding to the first user to be rendered at a first virtual position in a display device associated with the second user, wherein the first virtual position is determined at least in part on the position data corresponding to the position of the first user in the physical space and on a determined viewpoint of the second user; and causing, using the computing device, an image corresponding to the second user to be rendered at a second virtual position in a display device associated with the first user, wherein the second virtual position is based at least in part on the position data corresponding to the position of the second user in the physical space and on a determined viewpoint of the first user.

15. The computer-implemented method of claim 14, wherein the blood pressure data is stored in the computer readable memory in a cloud data storage configuration.

16. The computer-implemented method of claim 14, wherein the physical space comprises a first physical space and a second physical space, wherein the first physical space is geographically separate from the second physical space and the first user is located at the first physical space and the second user is located at the second physical space, the method further comprising transmitting, using the computing device, at least a portion of the position data corresponding to the position of the first user over an Internet connection.

17. The computer-implemented method of claim 14, the method further comprising ascertaining an emotional state of the second user from the blood pressure data.

18. The computer-implemented method of claim 14, wherein the blood pressure data is received at the computer device over a wireless connection.

19. The computer-implemented method of claim 14, wherein the second user comprises a plurality of users.

* * * * *